United States Patent
Sugaya et al.

(10) Patent No.: US 7,505,197 B2
(45) Date of Patent: Mar. 17, 2009

(54) OPTICAL AMPLIFIER PROVIDED WITH CONTROL FUNCTION OF PUMPING LIGHT, AND OPTICAL TRANSMISSION SYSTEM USING THE SAME

(75) Inventors: Yasushi Sugaya, Kawasaki (JP); Etsuko Hayashi, Kawasaki (JP); Masato Nishihara, Kawasaki (JP); Shinichirou Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 10/798,267

(22) Filed: Mar. 12, 2004

(65) Prior Publication Data

US 2004/0196158 A1    Oct. 7, 2004

(30) Foreign Application Priority Data

| Mar. 13, 2003 | (JP) | ............................. 2003-068289 |
| Mar. 25, 2003 | (JP) | ............................. 2003-081796 |
| Mar. 28, 2003 | (JP) | ............................. 2003-092873 |

(51) Int. Cl.
H04B 10/17 (2006.01)
H04B 10/12 (2006.01)

(52) U.S. Cl. ..................................................... 359/334
(58) Field of Classification Search .................. 359/334
See application file for complete search history.

(56) References Cited

U.S. PATENT DOCUMENTS

| 6,292,288 B1* | 9/2001 | Akasaka et al. ............. 359/334 |
| 6,344,922 B1* | 2/2002 | Grubb et al. ................. 359/334 |
| 6,452,715 B1* | 9/2002 | Friedrich .................... 359/334 |
| 6,462,861 B2 | 10/2002 | Ohshima et al. |
| 6,501,593 B2 | 12/2002 | Akasaka et al. |
| 6,510,000 B1 | 1/2003 | Onaka et al. |

(Continued)

FOREIGN PATENT DOCUMENTS

CN         1385747 A     12/2002

(Continued)

OTHER PUBLICATIONS

"Observation of Catastrophic Self-Propelled Self-Focusing In Optical Fibres", Electronic Letters, vol. 24, No. 1, pp. 48-49, Jan. 1988.

(Continued)

Primary Examiner—Eric Bolda
(74) Attorney, Agent, or Firm—Staas & Halsey LLP

(57) ABSTRACT

In an optical transmission system according to one aspect of the present invention, for transmitting a WDM light from a transmission station to a reception station, utilizing a Raman amplifier, the Raman amplifier comprises an optical amplification medium; a pumping light source generating a plurality of pumping lights having wavelengths different from each other; an optical device introducing the plurality of pumping lights to the optical amplification medium; and control means for controlling the pumping light source, the transmission station sends out a plurality of reference lights having wavelengths at which respective Raman gain obtained by the plurality of pumping lights reach peaks or wavelengths close to the above wavelengths, and the control means controls the plurality of pumping lights based on the optical powers of the plurality of reference lights. Thus, it becomes possible to accurately manage the optical power balance of the WDM light and the optical power of the entire WDM light.

15 Claims, 28 Drawing Sheets

U.S. PATENT DOCUMENTS

| | | | |
|---|---|---|---|
| 6,611,370 B2 | 8/2003 | Namiki et al. | |
| 6,636,344 B2 | 10/2003 | Akasaka et al. | |
| 6,690,504 B1* | 2/2004 | Nagel et al. | 359/334 |
| 6,738,132 B2 | 5/2004 | Sobe et al. | |
| 6,823,107 B2* | 11/2004 | Muro et al. | 385/27 |
| 6,934,016 B2 | 5/2005 | Sobe et al. | |
| 2001/0019448 A1 | 9/2001 | Yokoyama | |
| 2001/0046083 A1 | 11/2001 | Akasaka et al. | |
| 2002/0012161 A1 | 1/2002 | Tsuzaki et al. | |
| 2002/0044336 A1 | 4/2002 | Tanaka et al. | |
| 2002/0186456 A1* | 12/2002 | Inoue et al. | 359/334 |
| 2003/0117694 A1* | 6/2003 | Sobe et al. | 359/334 |
| 2004/0160664 A1* | 8/2004 | Sobe et al. | 359/334 |

FOREIGN PATENT DOCUMENTS

| | | |
|---|---|---|
| CN | 1402073 A | 3/2003 |
| EP | 1 376 905 A2 | 1/2004 |
| EP | 1 385 280 A2 | 1/2004 |
| JP | 09-064446 | 3/1997 |
| JP | 2000-98433 | 4/2000 |
| JP | 2002-40496 | 2/2002 |
| JP | 2002-072262 | 3/2002 |
| JP | 2002-76482 | 3/2002 |
| JP | 2002-296145 | 10/2002 |
| JP | 2004-240278 | 8/2004 |
| WO | WO 02/21203 | 3/2002 |
| WO | WO 02/21204 | 3/2002 |

OTHER PUBLICATIONS

D.P. Hand, et al., "Solitary Thermal Shock Waves And Optical Damage In Optical Fibers: The Fiber Fuse," Optics Letters, vol. 13, No. 9, pp. 767-769, Sep. 1988.

M. Wegmuller, et al., "Distributed Gain Measurements In Er-Doped Fibers With High Resolution and Accuracy Using An Optical Frequency Domain Reflectometer," Journal of Lightwave Technology, vol. 18, No. 12, pp. 2127-2132, Dec. 2002.

J.P. von der Weid, et al., "On the Characterization of Optical Fiber Network Components with Optical Frequency Doman Reflectometry," Journal of Lightwave Technology, vol. 15, No. 7, pp. 1131-1141, Jul. 1997.

Communication from the Japanese Patent Office in the related Japanese Patent Application No. 2003-081796 mailed on Apr. 22, 2008.

Communication from the Japanese Patent Office in the related Japanese Patent Application No. 2003-068289 mailed on Apr. 30, 2008.

Communication from the Chinese Patent Office in the related Chinese Patent Application No. 200410028680.4 mailed on Jun. 6, 2008.

* cited by examiner

DIAGRAM EXPLAINING ARRANGING METHOD OF REFERENCE LIGHT

BLOCK DIAGRAM OF TRANSMISSION STATION

EXAMPLE OF TRANSMISSION CIRCUIT IN CASE WHERE DATA IS TRANSMITTED UTILIZING REFERENCE LIGHT

BLOCK DIAGRAM OF CONTROL CIRCUIT PROVIDED IN EACH REPEATER STATION

DIAGRAM EXPLAINING EFFECT OF OPTICAL TRANSMISSION SYSTEM ACCORDING TO EMBODIMENT 1-1

EMBODIMENT OF REPEATER STATION OPERATING BASED ON OPTICAL POWER OF WDM LIGHT

FIG.8
(a)
OPTICAL DETECTION IN CONVENTIONAL TECHNIQUE
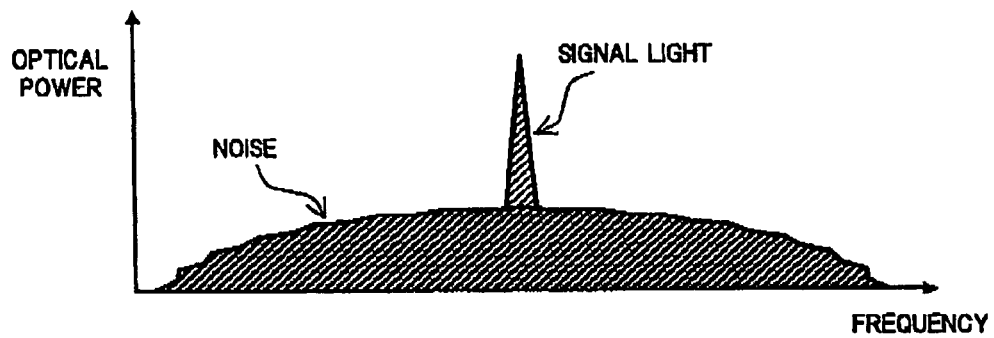
(b)
DIAGRAM EXPLAINING OPTICAL DETECTION IN EMBODIMENT 1-1
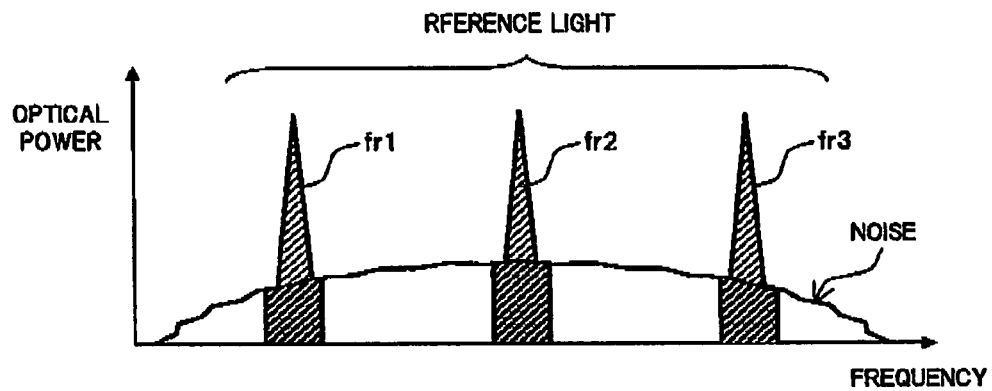

BLOCK DIAGRAM OF REPEATER STATION OF OPTICAL TRANSMISSION SYSTEM ACCORDING TO EMBODIMENT 1~2

DIAGRAM EXPLAINING RELATION BETWEEN RAMAN AMPLIFIER AND EDFA

EMBODIMENT OF APPARATUS FOR DETECTING OPTICAL POWER OF REFERENCE LIGHT

MODIFIED EXAMPLE OF DETECTING CIRCUIT SHOWN IN FIG. 11

PROCESSING OF OBTAINING SETTING VALUE OF PUMPING LIGHT POWER FOR OBTAINING OUTPUT SIGNAL LIGHT WITH DESIRED WAVELENGTH CHARACTERISTIC

BASIC CONFIGURATION OF EMBODIMENT 3 OF PRESENT INVENTION

CONFIGURATION OF EMBODIMENT 3-1 OF PRESENT INVENTION

TYPICAL OTDR MEASURING SYSTEM

FIG.27
APPLICATION EXAMPLE OF OTDR MEASURING SYSTEM
(A)
LOSS DISTRIBUTION IN LONGITUDINAL DIRECTION
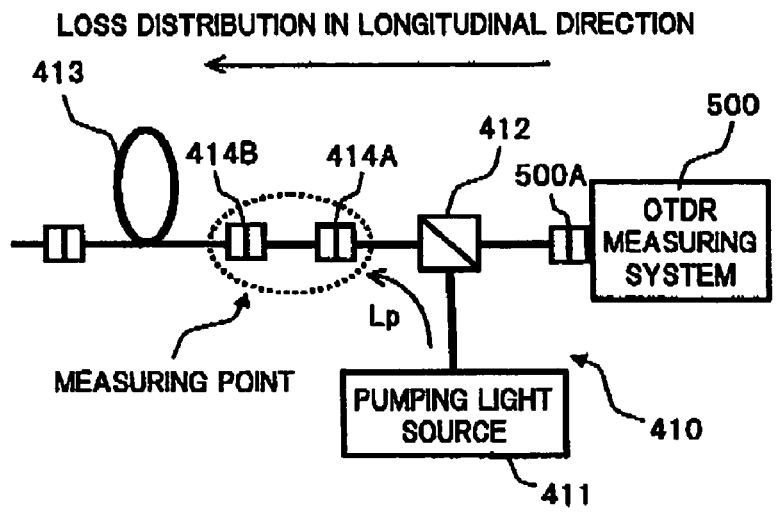
(B)
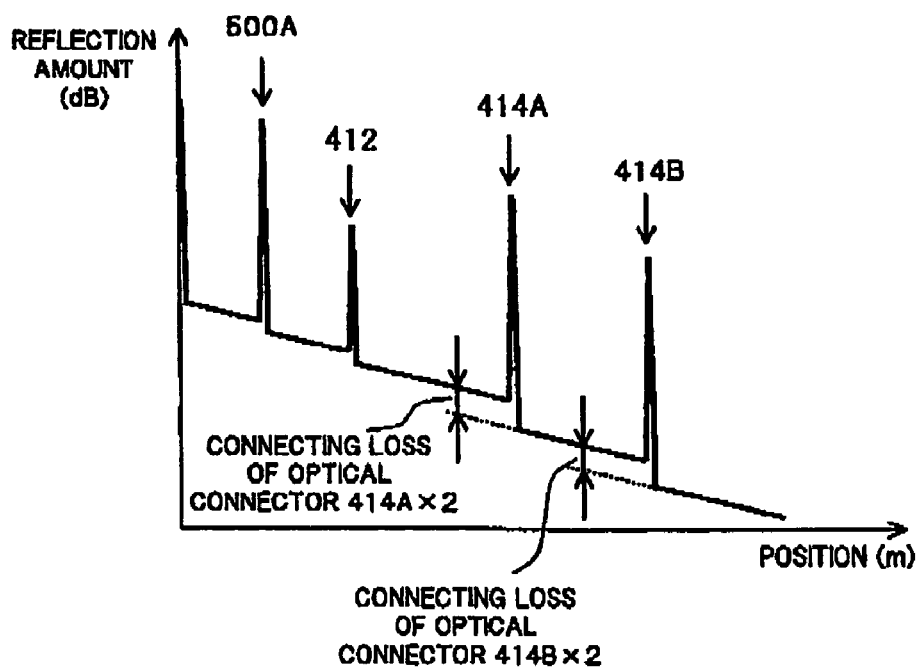

CONFIGURATION OF EMBODIMENT 3-2 OF PRESENT INVENTION

TYPICAL OFDR MEASURING SYSTEM

CONFIGURATION OF EMBODIMENT 3-3 OF PRESENT INVENTION

CONFIGURATION OF EMBODIMENT 3-4 OF PRESENT INVENTION

TO PUMPING LIGHT SOURCE AND THE LIKE

CONFIGURATION OF EMBODIMENT 3-5 OF PRESENT INVENTION

OPTICAL AMPLIFIER PROVIDED WITH CONTROL FUNCTION OF PUMPING LIGHT, AND OPTICAL TRANSMISSION SYSTEM USING THE SAME

BACKGROUND OF THE INVENTION

1. Field of the Invention

The present invention relates to an optical amplifier which supplies a pumping light to an optical amplification medium to amplify a signal light, and an optical transmission system using the same, and in particular, to a technology for controlling a supply condition of pumping light in the optical amplifier.

2. Related Art

Recently, there has been introduced a wavelength division multiplexing (WDM) technology for achieving a large capacity and a high speed in a trunk optical transmission. Further, as a core technique of WDM transmission technology, an optical amplification technique, such as a rare-earth element doped fiber optical amplifier, a Raman amplifier and the like, has been in practical use.

FIG. 38 is a block diagram of an optical transmission system using typical optical amplifiers. In this system, a plurality of repeater stations are disposed between a transmission station (Tx) 1101 and a reception station (Rx) 1102, and a WDM light is transmitted via these repeater stations. In each repeater station, Raman amplification is performed. Further, each repeater station is provided with a discrete optical amplifier, such as, an erbium-doped fiber optical amplifier (EDFA).

A transmission path fiber 1001 is an optical transmission medium propagating the WDM light therethrough, and also functions as an optical amplification medium by being supplied with a pumping light. A pumping light source (LD) 1002, which is formed by multiplexing by a multiplexer or the like, for example, transmission light from a laser diode or a plurality of laser diode, generates a pumping light for amplifying the WDM light. Here, the pumping light generated in the pumping light source 1002 contains a plurality of lights having wavelengths different from each other. A WDM coupler 1003 introduces the pumping light generated in the pumping light source 1002 to the transmission path fiber 1001.

In the above optical transmission system, the WDM light sent out from the transmission station 1101 is transmitted up to the reception station 1102 while being amplified by each transmission path fiber 1001. At this time, in each repeater station, the power of the entire WDM light is managed, and also the balance of the optical powers of a plurality of signal lights contained in the WDM light is managed. Namely, the pumping light source 1002 is controlled so that, for example, the output power of the entire WDM light is maintained at a previously set predetermined value and the optical powers of the plurality of signal lights contained in the WDM light are equalized, in each repeater station (refer to Japanese Unexamined Patent Publication No. 2002-72262 (FIGS. 3, 3 to 5 pages), Japanese Unexamined Patent Publication No. 2000-98433 (FIG. 1, paragraphs 0070 to 0072), and Japanese Unexamined Patent Publication No. 2002-76482 (FIG. 10, paragraphs 0162 to 0177)). Further, other than the output constant control or the control of wavelength dependence of gain as described above, a shutdown control at a signal light interruption is also performed by monitoring the output power of the WDM light. Note, the shutdown control is generally provided in the optical amplifier, as a function for, when a pumping light of high power is leaked to outside by the system crash, the optical fiber cutting and the like due to a surge, avoiding the radiation of the pumping light to a human body.

However, in the existing optical transmission system as described above, there is a problem in that it is difficult to accurately monitor the balance (optical power tilt) of the output powers of the plurality of signal lights contained in the WDM light. For example, in the above mentioned Japanese Unexamined Patent Publication No. 2002-72252, a signal light band is divided into a plurality of blocks, and a control of optical power tilt is performed utilizing the optical power detected for each block. However, in this case, when the signal lights are not arranged equally in each block, since the optical power tilt cannot be detected accurately, it is impossible to equalize the WDM light. Note, such a problem is not generated only in the system described in the above described Japanese Unexamined Patent Publication No. 2002-72262, but also generated in the case where the signal lights are arranged unevenly on a specific wavelength region in the signal light band, even if the optical powers of the plurality of signal light contained in the WDM light are detected individually.

Further, in the case where the output power of the entire WDM light is detected using a photodiode or the like, the photodiode receives lights over a wide band. Therefore, when the number of signal lights contained in the WDM light is small, a noise light caused by ASE (amplified spontaneous emission) or the like becomes dominant, (that is, a ratio of noise light power to the total optical power becomes relatively high). Therefore, there is also a problem in that the optical power of a main signal light (that is, the WDM light which is to transmit signals) cannot be detected accurately.

Here, there will be described in detail a monitoring value of signal light utilized for the control of pumping light as described above.

Generally, in the optical transmission system using the Raman amplifier as shown in FIG. 38 described above, for example, as shown in FIG. 39, since the noise light due to Raman amplification is generated within the signal light amplification band in the transmission path fiber being the optical amplification medium, a monitor of output signal light receives simultaneously the signal light containing noise components accumulated in the repeating intervals until the former stage, and the noise light due to Raman amplification. The above noise light due to Raman amplification is a noise light, which is also generated in the case where only the pumping light is input to the optical amplification medium in a state where the signal light is not input to the optical amplification medium. In this specification, the noise light generated in the Raman amplifier is called an amplified spontaneous Raman scattering (ASS) light, to an ASE light generated in the rare-earth element doped fiber amplifier, such as EDFA or the like.

As a conventional technique for monitoring the signal light output power of the Raman amplifier, for example, as shown in FIG. 40, there has been known a method of calculating the ASS optical power generated in the Raman amplifier based on the power of pumping light supplied to the optical amplification medium, to perform a correction by subtracting the ASS optical power from a monitoring value of an actually received output light (refer to the pamphlet of International Publication No. 02/1204). Further, as means for separating the signal light power from the ASS optical power, there has been known a method using a simplified optical spectrum analyzer. However, the simplified optical spectrum analyzer has a disadvantage in that the monitoring accuracy becomes lower and also an expensive monitor system is needed.

The following problem exists in the above conventional techniques. For example, in the optical amplifier in which the optical amplification medium is managed, such as, the rare-earth element doped fiber amplifier or the concentrated Raman amplifier, it is possible to accurately calculate the noise light power by the known method as described above. However, in the case of a disputed Raman amplifier in which the transmission path fiber is the optical amplification medium, since a fiber parameter of the transmission path fiber is unknown in many cases, there is considered that a predicted fiber parameter value is significantly different from an actual value, or an unexpected loss exists, resulting in a possibility of large error in the calculation value of ASS light.

Specifically, in the case where the ASS optical power is estimated to be larger than the actual value, in the shutdown control described above, since the supply of the pumping light is stopped although the transmission of signal light is able to be performed, the transmission of signal light is suspended. Further, in the output constant control described above, since the signal light is output at the power level higher than the required power, the signal waveform deterioration or the like due to an increase of non-linear effect is resulted, and thus there is a possibility that the system performance is lowered. On the other hand, in the case where the ASS light power is estimated lower than the actual value, in the shutdown control, the pumping light is output although the signal light is in the interrupted state, and in a situation of signal interruption caused by the fiber cutting or the like, there may be a possibility that the pumping light of high power is radiated to outside, to harmfully affect the human body. In the output constant control, since the signal light is output at the power level lower than the required power, the OSNR deterioration is resulted.

Moreover, consideration is made on the case where the wavelength dependence of gain is controlled as described above, for example in the system proposed in Japanese Unexamined Patent Publication No. 2002-72262, a relation between the pumping light power and the signal light output power is expressed by a determinant, and using an inverse matrix of the determinant, the setting of pumping light power is performed so that the required signal light output power can be obtained in each wavelength. However, as in the case of the calculation of ASS light described above, since the fiber parameter of the optical fiber being the optical amplification medium is unknown in many cases, there is a possibility of large error in the setting value of the pumping light power. In addition, in the case where the determinant used for the control does not correspond to an actually laid fiber, it takes a time until the control converges, or the control becomes divergent, resulting in a problem in that the pumping light power is not fixed.

The optical transmission system using the conventional optical amplifier has the following problem, other than the above described problems related to the monitoring of the output power of signal light. Namely, as shown in the description of the shutdown control, since a high power light is output from the optical amplifier, such as the rare-earth element doped fiber amplifier or the Raman amplifier, there is a possibility that the high power light is emitted to the outside air to injure a human body, due to for example, the detachment of an optical connector positioned on an output end of the optical amplifier, the cutting of the optical path connected to an optical output end, or the like.

As a conventional technique for preventing the occurrence of such a situation, there has been known a technique for adding, to the optical amplifier, for example, a function of measuring a reflected return light from an output side optical connector of the optical amplifier and an optical path connected therewith, and based on the measurement result, detecting whether or not an output light from the optical amplifier is emitted to the outside air (refer to Japanese Unexamined Patent Publication No. 9-64446).

An optical connector of a typical physical contact (PC) connection system is deteriorated in the common performance thereof due to impurities (for example, dust, oil film or the like) attached on a ferrule end surface, or scar on the ferrule end surface. It has been reported that, if a high power light is transmitted through the optical connector which is deteriorated in its connection performance, there occurs the breakage of optical fiber, called a fiber fuse (FF) phenomenon, due to energy convergence by multiple reflection (refer to D. P. Hand et al., "Solitary thermal shock waves and optical damage in optical fibers: the fiber fuse", Optics Letters, Vol. 13, No. 9, pp. 767 to 769, September 1988, or R. Kashyap et al., "Observation of Catastrophic Self-propelled Self-focusing in Optical Fibers", Electronics Letters, Vol. 24, No. 1, pp 47 to 49, January 1988)

The above FF phenomenon will be described briefly. For example, as shown in FIG. 41, in the case where impurities or scars are present on an end surface of a ferrule 2001 of an optical connector 2000, a light being propagated through an optical fiber 2002 is diffusely reflected due to the impurities or scars. At this time, if the power of the light diffusively reflected is high, the temperature rise of epoxy resin adhesive 2003 adhering the ferrule 2001 and the optical fiber 2002 becomes higher due to light absorption, leading to an unstable adhesion condition. As a result, the PC connection of the optical connector 2000 becomes unstable, which is one factor causing the FF phenomenon. Accordingly, for the optical connector through which the high power light passes, a particularly careful management of connecting loss becomes necessary.

However, in the conventional optical amplifier disclosed in Japanese Unexamined Patent Publication 9-64446, since the reflected return light of the output signal light, that is, a Fresnel reflected light generated on the connector end surface when the optical connector on the output side is detached, is measured, to detect whether or not the optical connector is detached, there is a problem in that it is impossible to reliably detect up to the optical fiber breakage due to the FF phenomenon which occurs in the optical connector in the insufficient connection state as described above.

Specifically, sometimes the impurities attached on the end surface of the optical connector become absorbers of the light passing through the optical connector. Therefore, there is a possibility that the temperature of optical connector rises due to the light absorption, resulting in the breakage of optical fiber. Since the reflected light is not generated from such absorbers attached on the end surface of the optical connector, in the conventional system utilizing the reflected return light, it is not possible to detect the breakage of optical fiber as described in the above. In the optical connector for when the breakage of optical fiber occurs, since a connecting loss is increased, a desired transmission characteristic cannot be obtained. Further, if the breakage of optical fiber further progresses so that the high power light is emitted to the outside air, there is a possibility of injury to a human body.

Further, the above conventional optical amplifier is constituted to detect the detachment of the output side optical connector, the optical path cutting or the like, based on the measurement result of reflected return light on the output side. Consequently, there is a problem in that it is difficult to cope with the Raman amplifier, in which the pumping light of high power is given from the input side. Namely, for example, in a Raman amplifier 2010 of a configuration shown in FIG. 42, in order to obtain the desired output power, a pumping light Lp having high power of several hundreds mW to several W is output from a pumping light source 2011 to a transmission path fiber 2013 via a WDM coupler 2012. Therefore, it becomes important to supervise a connection state of an input side optical connector 2014. Then, the deterioration of connection state is found, it is necessary to stop or reduce the supply of the pumping light.

However, in the above described conventional optical amplifier, the configuration thereof does not cope with the detachment of input side optical connector, and further, as well as the case of the above described output side optical connector, it is difficult to detect up to the breakage of optical fiber due to the FF phenomenon occurring in the input side optical connector.

SUMMARY OF THE INVENTION

The present invention aims at providing an optical amplifier capable of solving the respective problems in conventional techniques as described above, and a system using the same. Specifically, one object of the present invention is to accurately manage the optical power balance of a WDM light and the optical power of the entire WDM light in a system using a Raman amplifier. Another object of the present invention is to calculate with high accuracy the power of an amplified spontaneous Raman scattering light to correct a monitoring value of an output signal light, and to reliably control a supply condition of a pumping light. A further object of the present invention is to accurately detect the deterioration of a connection state at a connecting point on an optical path, to reliably control power of a light passing through the connecting point in an optical amplifier provided with a connecting loss detecting function.

In order to achieve the above objects, according to the present invention, there is provided an optical amplifier for supplying a pumping light to an optical amplification medium to amplify a signal light, wherein a light different from the signal light is given on an optical path including the optical amplification medium, and based on a state of the light or a state of another light generated on the optical path by the light, a supply condition of the pumping light to the optical amplification medium is controlled.

An optical transmission system as one aspect of the present invention is for transmitting a WDM light from a transmission station to a reception station, utilizing the above optical amplifier. In this system, the optical amplifier is a Raman amplifier comprising: an optical amplification medium; a pumping light source generating a plurality of pumping lights having wavelengths different from each other; an optical device introducing the plurality of pumping lights to the optical amplifying medium; and control means for controlling the pumping light source. The transmission station sends out a plurality of reference lights having wavelengths at which respective Raman gains obtained by the plurality of pumping lights reach peaks or wavelengths close to the above wavelengths. Then, the control means controls the plurality of pumping lights based on the optical powers of the plurality of reference lights.

In the above optical transmission system, since the pumping lights are controlled based on the reference lights, the optical powers of the pumping lights are always controlled properly not depending on the number or arrangement of signal lights contained in the WDM light. Thus, it becomes easy to manage the tilt of Raman gain or the output power.

In the above optical transmission system, the transmission station may transmit information to the reception station utilizing at least a part of the plurality of reference lights. In this case, since the information is transmitted utilizing the reference light, communication sources (especially, wavelength or band) are effectively utilized.

Further, in the above optical transmission system, the configuration may be such that there is further provided detecting means for detecting the optical powers of the plurality of reference lights contained in the WDM light at the control means controls the optical powers of the plurality of pumping lights so that the optical powers of the plurality of reference lights detected by the detecting means are equalized. Here, the detecting means may comprise reflecting means for selectively reflecting the plurality of reference lights, and light receiving means for converting the reference light by the reflecting means into an electric signal.

Moreover, in the above optical transmission system, the control means may control the plurality of pumping lights based on an average value of the respective optical powers of the plurality of reference lights. In this case, since an influence of noise light is suppressed, the optical power of the WDM light can be monitored accurately.

Further, in the case where the optical transmission system is provided with a discrete optical amplifier amplifying the WDM light, and the reference light, a part of the plurality of reference lights, is positioned outside a gain band of the discrete optical amplifier, an auxiliary light having a wavelength same as that of the reference light positioned outside the gain band of the discrete optical amplifier, may be multiplexed with the WDM light. In this configuration, the optical power of the reference light the is not amplified by the discrete optical amplifier is becomes weaker than the optical power of the reference light that is amplified by the discrete optical amplifier. Therefore, by supplying the auxiliary light, the optical power of the reference light positioned outside the gain band of the discrete optical amplifier is compensated.

An optical amplifier as another aspect of the present invention is a Raman amplifier amplifying signal lights due to a Raman effect occurring in an optical amplification medium. The Raman amplifier comprises a pumping light supply section, an output light monitoring section, an amplified spontaneous Raman scattering light processing section, a storing section, an amplified spontaneous Raman scattering light calculating section and a pumping light control section. The pumping light supply section supplies pumping lights to the optical amplification medium. The output light monitoring section measures the power of a light, which is propagated through the optical amplification medium to be output. The amplified spontaneous Raman scattering light processing section supplies, in the preparation state before starting the operation, the pumping lights to the optical amplification medium to be actually used In the operation time, to measure the power of an amplified spontaneous Raman scattering light generated in the optical amplification medium, and based on the power of the measured amplified spontaneous Raman scattering light, obtains a coefficient of a modeling formula for calculating the power of the amplified spontaneous Raman scattering light after starting the operation. The storing section stores the coefficient obtained by the amplified spontaneous Raman scattering light processing section. The amplified spontaneous Raman scattering light calculating section calculates, in accordance with the modeling formula to which the coefficient stored in the storing section is applied, the power of the amplified spontaneous Raman scattering light generated after starting the operation, according to the powers of pumping lights supplied to the optical amplification medium from the pumping light supply section. The pumping light control section corrects the output light power measured by the output light monitoring section using the power of the amplified spontaneous Raman scattering light calculated by the amplified spontaneous Raman scattering light calculating section, to control an operation of the pumping light supply section based on the corrected output light power.

In the Raman amplifier of such a configuration, as the processing of field investigation and the like in the preparation stage before starting the operation, the amplified spontaneous Raman scattering light is measured using the optical amplification medium to be used actually at the operation time, and based on the measurement result, the coefficient of the modeling formula for calculating the amplified spontaneous Raman scattering light power is obtained, to be stored in the storing section. Then, after starting the operation, in accordance with the modeling formula to which the above coefficient is applied, the amplified spontaneous Raman scattering light power is obtained by the calculation, according to the powers of pumping lights supplied to the optical amplification medium, and the power of the amplified spontaneous Raman scattering light to the output light power measured by the output light monitoring section is corrected, using the calculation result, so that an operation control of the pumping light supply section is executed based on the corrected power. Thus, it becomes possible to correct the amplified spontaneous Raman scattering light corresponding to actual operation situations. Therefore, it becomes possible to perform reliably various controls of the Raman amplifier, for example, an output-constant control, a shutdown control, a control of wavelength characteristic deviation and the like.

An optical amplifier as a further aspect of the present invention comprises: a pumping unit supplying pumping light to an optical amplification medium; a connecting loss measuring section that inputs a measuring light different from a signal light to an optical path between the pumping unit and the optical amplification medium, and based on a reflected light and a backward scattering light of the measuring light, which are generated in the optical path, measures connecting loss at one or more connecting points existing on the optical path; and a control section that controls the supply condition of the pumping lights by the pumping unit, according to the connections loss measured by the connecting loss measuring section.

In the optical amplifier of such a configuration, the connecting loss at one or more connecting points existing between the pumping unit and the optical amplification medium, is measured based on the reflected light and the backward scattering light, and according to the measuring result, which are different from the signal light, the supply condition of the pumping lights is controlled by the control section. As a result, it becomes possible to detect with accuracy not only the detachment of an optical connector at the connecting point but also an abnormality of connection condition due to a FF phenomenon, which leads to the breakage of optical fiber, so that the powers of pumping lights passing through the connecting points can be reliably controlled.

Further, in the above optical amplifier, a specific configuration of the connecting loss measuring section may be such that, utilizing the optical time domain reflectometry or the optical frequency domain reflectometry, the loss distribution in a longitudinal direction of the optical path between the pumping unit and the optical amplification medium is measured. Moreover, a specific configuration of the pumping unit may be such that pumping lights capable of amplifying, due to the Raman effect the signal lights being propagated through the optical amplification medium, are generated, to be supplied to the optical amplification medium.

Furthermore, in the connecting loss measuring section of the above optical amplifier, a pumping light generated by switching a pumping light source drive system included in the pumping unit to a drive system different from that at the normal operation time, is used as the measuring light. In such a configuration, since the pumping light source is utilized as a measuring light source, it becomes possible to achieve the simplification of optical amplifier configuration and the low cost.

Other objects, features and advantages of the present invention will become clear from the following description of the embodiments, in conjunction with the appended drawings.

BRIEF DESCRIPTION OF THE DRAWINGS

FIG. 8 is a diagram for explaining optical detections, in which (a) shows the optical detection in a conventional technique, and (b) shows the optical detection in the embodiment 1-1.

FIG. 27 is a diagram showing an example in the case where the loss distribution of a typical optical amplifier is measured by applying the OTDR measuring system in FIG. 26.

DETAILED DESCRIPTION OF THE INVENTION

Figure 1:
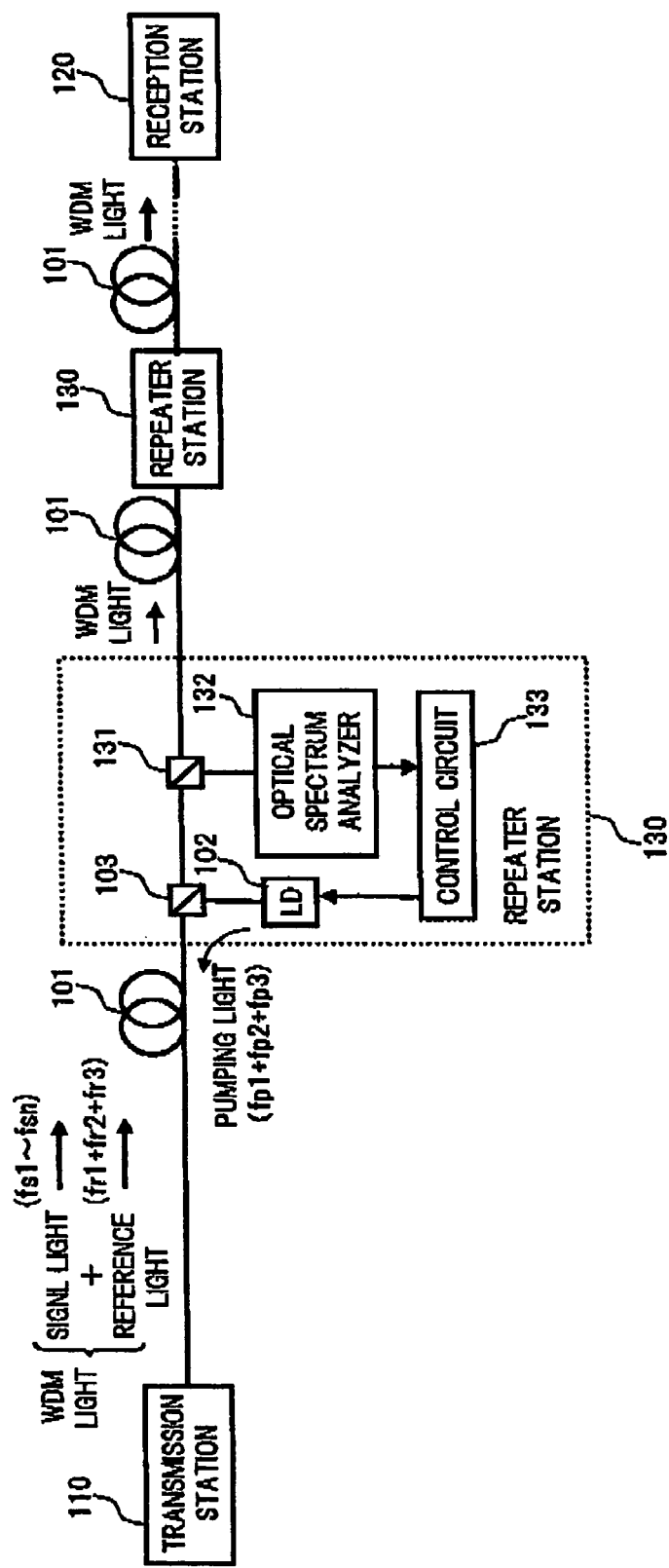
FIG. 1 is a block diagram of an optical transmission system according to an embodiment 1-1 of the present invention.

Hereinafter, embodiments of the present invention will be described with reference to drawings. In this description, same reference numerals denote same or corresponding parts throughout all figures.

FIG. 1 is a block diagram of an optical transmission system according to an embodiment 1-1 of the present invention. Here, in this system, a plurality of repeater stations 130 is provided between a mission station 110 and a reception station 120. A WDM light is transmitted via the repeater stations 130, and further, Raman amplification is performed in each repeater station 130.

The transmission station 110 generates the WDM light containing signal light and reference light, to send out. Here, the signal light consists of a plurality of signal lights fs1 to fsn of wavelengths different from each other. Further, the reference light consists of a plurality of reference lights fr1 to fr3 of wavelengths different from each other. Note, the wavelengths or frequencies of the reference lights fr1 to fr3 are determined, respectively, based on the wavelengths or frequencies of pumping lights fp1 to fp3 to be described later.

Between the transmission station 110 and a first stage repeater station 130, between the respective repeater stations 130, and between a light stage repeater station 130 and the reception station 120, are connected via transmission path fibers 101. Here, each transmission path fiber 101 is an optical transmission medium propagating therethrough the WDM light, and also functions as an optical amplification medium by receiving the pumping lights.

Each repeater station 130 comprises a pumping light source (LD) 102, a WDM coupler 103, a branching coupler 131, an optical spectrum analyzer 132 and a control circuit 133. Here, the pumping light source 102 includes a plurality of laser diodes, to generate a plurality of pumping lights of wavelength different from each other. Herein, three pumping lights fp1 to fp3 are generated. Then, the WDM coupler 103 leads to pumping lights fp1 to fp3 generated by the pumping light source 102 to the transmission path fiber 101. As a result, the transmission path fiber 101 is supplied with the pumping lights fp1 to fp3, to function as the optical amplification medium for Raman amplification. Namely, the transmission path fiber 101, the pumping light source 102 and the WDM coupler 103 function as a Raman amplifier amplifying the WDM light.

The branching coupler 131 branches a part of the WDM light that has been amplified in the transmission path fiber 101, to lead it to the optical spectrum analyzer 132. The optical spectrum analyzer 132 monitors the optical power of each wavelength contained in the WDM light, and then, detects the optical powers of the reference lights fr1 to fr3 contained in the WDM light.

The control circuit 133 drives the pumping light source 102, based on the optical powers of the reference lights fr1 to fr3 detected by the optical spectrum analyzer 132 That is, the control circuit 133 adjusts the optical powers of the pumping lights fp1 to fp3, based on the optical powers of the reference lights fr1 to r3. To be specific, the optical powers of the pumping lights fp1 to fp3 are adjusted, so that, for example, the average optical power of the reference lights fr1 to fr3 is held to a predetermined value and also the optical powers of the reference lights fr1 to fr3 are equalized.

Figure 2:
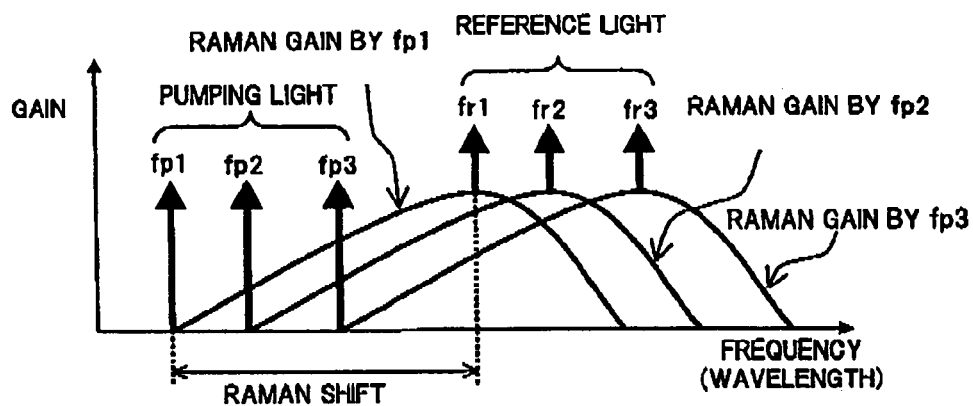
FIG. 2 is a diagram for explaining an arrangement method of reference lights in the embodiment 1-1.

FIG. 2 is a diagram for explaining an arrangement method of the reference lights. The frequencies (or wavelengths) of the reference lights fr1 to fr3 are determined based on the frequencies (or wavelengths) of the corresponding pumping lights fp1 to fp3. For example, the light fr1 is allocated with a frequency, which is shifted from the pumping light fp1 by a Raman shift frequency. Here, although not primarily, "Raman shift frequency" means "a difference between the frequency of the given pumping light and the frequency at which a Raman gain obtained caused by the pumping light reaches a peak". Then, this Raman shift frequency is about 13.2THz in the case where a silica-based optical fiber is used for the transmission path fiber 101. Further, if the Raman shift frequency is converted into the wavelength, it corresponds to about 100 nm in a 1.3 to 1.55 μm band. Namely, the reference light fr1 is arranged in a wavelength at which a Raman gain caused by the pumping light fp1 reaches a peak. In other words, the reference light fr1 is allocated with a frequency lower than the frequency of the pumping light fp1 by about 13.2 THz. Further, in turn, the reference light fr1 is allocated with a wavelength longer than the wavelength of the pumping light fp1 by about 100 nm.

Similarly, the reference light fr2 is arranged in a wavelength at which a Raman gain caused by the pumping light fp2 reaches a peak. Further, the reference light fr3 is arranged in a wavelength at which a Raman gain caused by the pumping light fp3 reaches a peak.

In the manner as described above, the reference fights fr1 to fr3 are arranged in the wavelengths at which the Raman gains caused by the corresponding pumping lights fp1 to fp3 reach peaks, respectively. However, the reference lights fr1 to fr3 do not need to be accurately arranged in the wavelengths at which the Raman gains caused by the corresponding pumping lights fp1 to fp3 reach peaks, respectively, and may be arranged in wavelengths close to the wavelengths at which the Raman gains caused by the corresponding pumping lights fp1 to fp3 reach peaks, respectively.

Further, in the case where the signal lights fs1 to fsn are on previously determined frequency grids to be transmitted, the reference lights fr1 to fr3 are also arranged on the frequency grids to be transmitted. At this time, the reference lights fr1 to fr3 are arranged on the frequency grids closest to frequency at which the Raman gains caused by the pumping lights fp1 to fp3 reach peaks. Such frequency grids are defined in an ITU-T. In the definition in ITU-T, recommended values of a reference frequency (anchor frequency) and frequency intervals (50 GHz, 100 GHz) are indicated.

Figure 3:
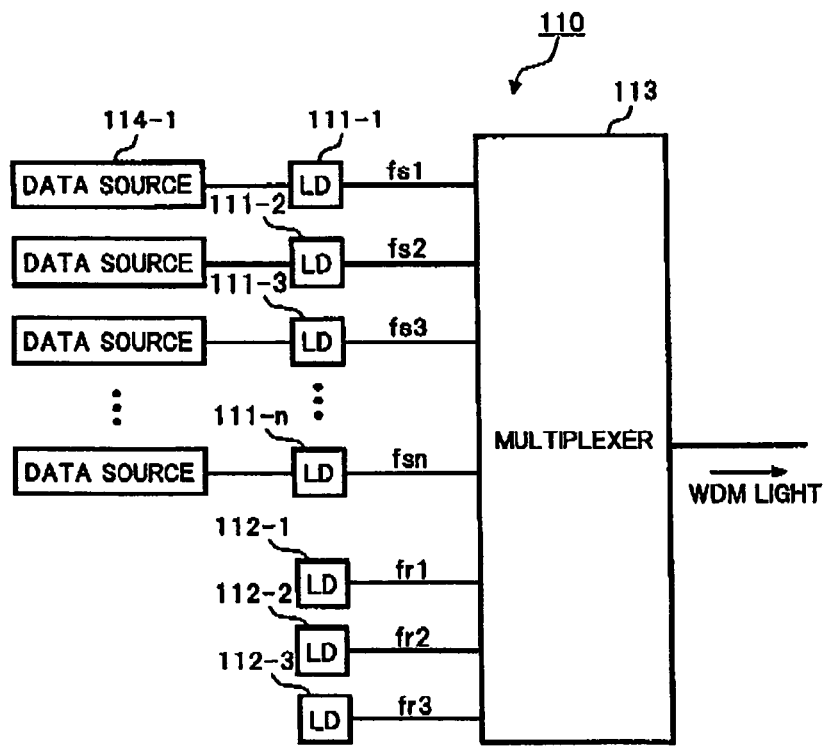
FIG. 3 is a block diagram of a transmission in the embodiment 1-1.

FIG. 3 is a block diagram of the transmission station 110. Herein, only a function necessary for generating the WDM light is illustrated. The mission station 110 comprises: light sources (LD) 111-1 to 111-n for generating the signal lights fs1 to fsn; light sources (D) 112-1 to 112-3 for generating the reference lights fr1 to fr3; and a multiplexer 113 multiplexing the signal lights fs1 to fsn and the reference lights fr1 to fr3, to generate the WDM light. The frequencies (or wavelengths) of the reference lights fr1 to fr3 are determined as described in the above.

The light sources 111-1 to 111-n are driven when data (or information) is transmitted to the reception station 120. For example, the light source 111-1 is driven when data generated by a data source 114-1 is transmitted to the reception station 120. On the other hand, basically, the light sources 112-1 to 112-3 always generate the reference lights fr1 to fr3 to output them. Here, the light sources 112-1 to 112-3 may output continuous wave (CW) lights or may transmit signals of predetermined pattern.

Figure 4:
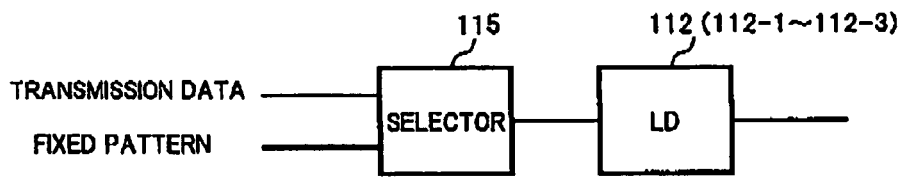
FIG. 4 is an example of a transmission circuit in the case where data is transmitted utilizing the reference light in the embodiment 1-1.

Note, the signal light fs1 to fs3 are used for transmitting the data (or information), whereas the reference lights fr1 to fr3 are used primarily for controlling a Raman amplification operation in each repeater station 130. However, in the optical transmission system of the embodiment 1-1, the reference lights fr1 to fr3 may be utilized for transmitting the data (or information). However, since the reference lights fr1 to fr3 are used for controlling the Raman amplification operation in each repeater station 130, it is not basically permissible to stop the reference lights fr1 to fr3. Therefore, in a system permitting the data (or information) transmission utilizing the reference lights fr1 to fr3, as shown in FIG. 4 for example, there is provided a function of selecting "data to be transmitted" or "fixed pattern data" using a selector 15. Although FIG. 4 shows the case of direct modulation by the LD, it is supposed that such selection can be performed on the presence or absence of the data, as described above, and furthermore on whether or not the modulation is to be performed, also in the case of external modulation by an optical modulator. Then, in this case, the light source 112 (112-1 to 112-3), when received data to be transmitted, transmits the data, and when did not received data to be transmitted, transmits the fixed pattern data (or non-modulation).

Figure 5:
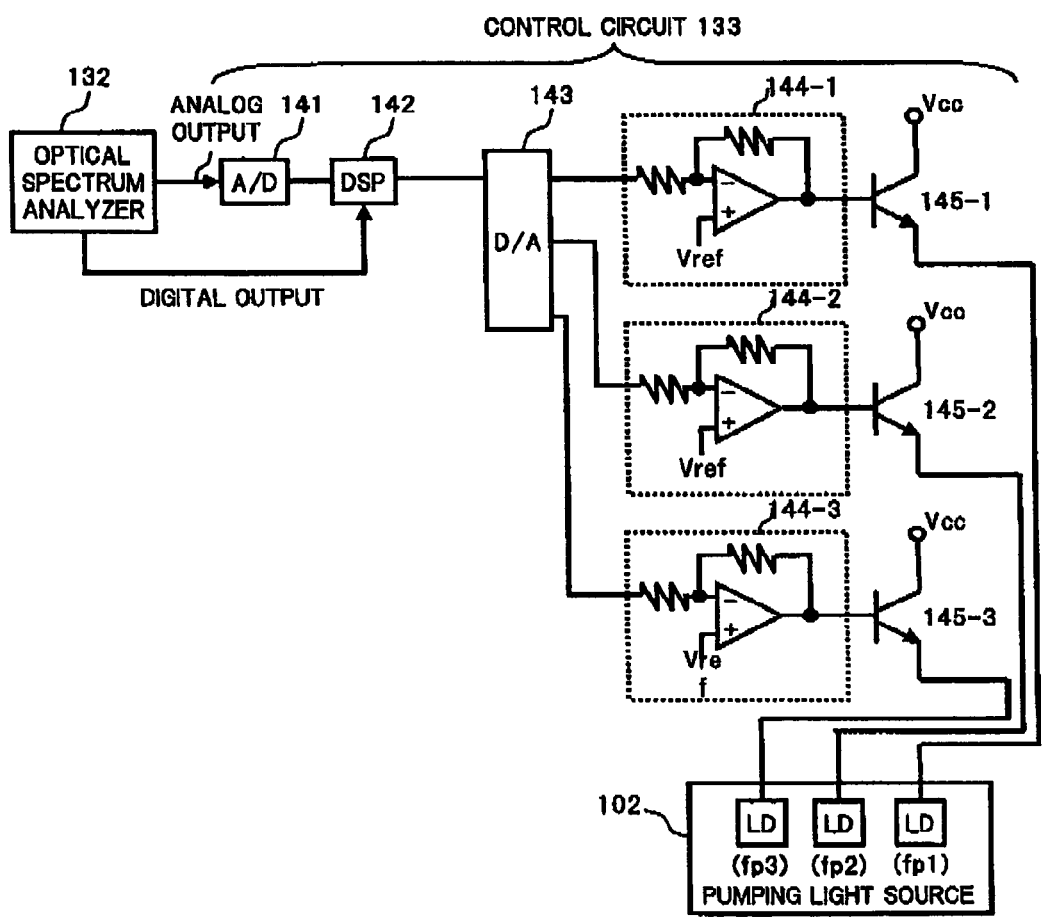
FIG. 5 is a block diagram of a control circuit provided in each repeater station in the embodiment 1-1.

FIG. 5 is a block diagram of the control circuit 133 provided in each repeater station 130. The control circuit 133 comprises an A/D converter 141, a DSP 142, a D/A converter 143, amplifiers 144-1 to 144-3 and power transistors 145-1 to 145-3. The A/D converter 141 converts optical power values of the reference lights fr1 to fr3, detected by the optical spectrum analyzer 132, into digital data, to send it to the DSP 142. In the case when the optical spectrum analyzer 132 is provided with a digital output interface, the A/D converter 141 is unnecessary, and the optical power values of the reference lights fr1 to fr3, detected by the optical spectrum analyzer 132, are sent to the DSP 142 just as they are.

The DSP 142 calculate a command value necessary for controlling the pumping light source 102 in accordance with the previously determined algorithm. Here, the algorithm executed by the DSP 142 follows the next relational expression (1.1), for example, if a control loop is formed using three pumping lights fp1 to fp3 and three reference lights fr1 to fr3.

$$\begin{pmatrix} \Delta P_{p1} \\ \Delta P_{p2} \\ \Delta P_{p3} \end{pmatrix} = \begin{pmatrix} A_{11} & A_{12} & A_{13} \\ A_{21} & A_{22} & A_{23} \\ A_{31} & A_{32} & A_{33} \end{pmatrix} \begin{pmatrix} P_{r1} - P_{sref} \\ P_{r2} - P_{sref} \\ P_{r3} - P_{sref} \end{pmatrix} \quad (1.1)$$

In this relational expression (1.1), "Pr1" to "Pr3" represent the optical power values of the reference lights fr1 to fr3, detected by the optical spectrum analyzer 132. Further, "Psref" represents the output level to be objective (object optical power). Note, "Psref" is a previously determined fixed value. Each element in a matrix A (A11 to A33) is a gain factor previously calculated by means of simulation or the like. And, "ΔPp1" to "ΔPp3" represent variation amounts of the pumping lights fp1 to fp3, respectively.

The DSP 142 feedback controls the pumping lights fp1 to fp3 using the relational expression (1.1). Then, when "Pr1" to "Pr3" are in a predetermined error range relative to "Psref", respectively, it is deemed that the control loop converged.

When the variation amounts "ΔPp1" to "ΔPp3" are obtained in accordance with the relational expression (1.1), the DSP 142 calculates settling values for setting the optical powers of the pumping lights fp1 to fp3 using the variation amounts. Namely, the DSP 142 performs the following calculation. Note, "Pp1 (n)" to "Pp3 (n)" are previous time setting values, and "Pp1 (n+1)" to "Pp3 (n+1)" are new setting values.

Pp1 (n+1)=Pp1 (n)+ΔPp1

Pp2 (n+1)=Pp2 (n)+ΔPp2

Pp3 (n+1)=Pp2 (n)+ΔPp3

The D/A converter 143 converts the setting values (setting values indicating the optical powers of the pumping lights fp1 to fp3) calculated by the DSP 142 into analog values, respectively, to give them to the corresponding amplifiers 144-1 to 144-3. The amplifiers 144-1 to 144-3 amplify the analog values given from the DSP 142, respectively. Then, the power transistors 145-1 to 145-3 generate currents corresponding to outputs from the amplifiers 144-1 to 144-3, respectively.

The pumping list source 102 is driven with the currents generated by the amplifiers 144-1 to 144-3. Namely, the laser diode for generating the pumping light fp1 is driven with the current generated by the amplifier 144-1. Similarly, the laser diodes for generating the pump light fp2 and fp3 are driven with the currents generated by the amplifiers 144-2 and 144-3, respectively.

Thus, the control circuit 133 controls the optical powers of the pumping lights fp1 to fp3 utilizing the reference lights fr1 to fr3. At this time, the optical powers of the pumping lights fp1 to fp3 are adjusted so that, for example, the optical powers of the reference lights fr1 to fr3 are equalized. Accordingly, in the optical transmission system of the embodiment 1-1, proper Raman amplification is always performed, irrespective of the arrangement of signal lights fs1 to fsn.

Figure 6:
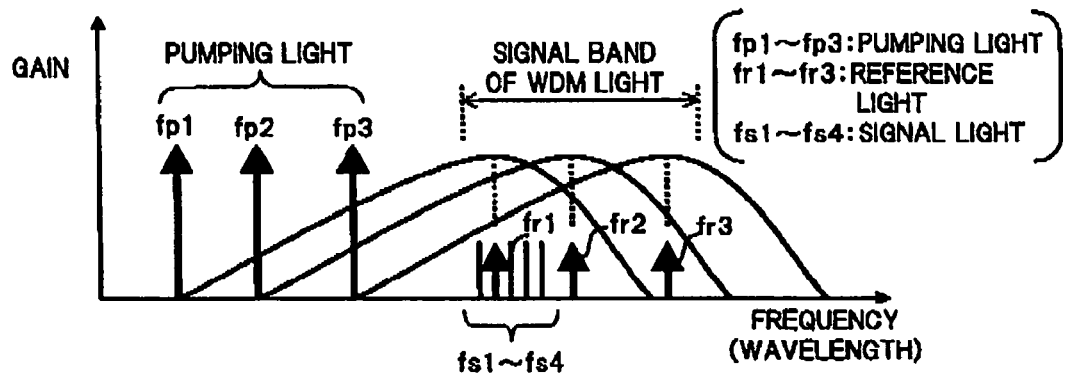
FIG. 6 is a diagram for explaining an effect of the optical transmission system of the embodiment 1-1.

In order to efficiently obtain a wide signal band in the optical transmission system utilizing the Raman amplification, generally, a plurality of pumping lights fp1 to fp3 is arranged at proper frequency intervals or proper wavelength spacing. Therefore, if a plurality of reference lights fr1 to fr3 is arranged in the wavelengths at which the Raman gains caused by the pumping lights fp1 to fp3 reach as shown in FIG. 6, the reference lights fr1 to fr3 are resultantly arranged at the proper frequency intervals or the proper wavelength spacing over the substantially entire signal band of the WDM light Then, in the optical transmission system of the embodiment 1-1, the Raman amplification is controlled utilizing the reference lights fr1 to fr3. Accordingly, even in the case where the number of signal lights contained in the WDM light is less (in FIG. 6, only four signal lights fs1 to fs4 are used) or the case where the arrangement of signal lights contained in the WDM light are biased (in FIG. 6, signal lights are arranged only in a shorter wavelength region in the signal band), the suitable Raman amplification can be obtained. Namely, it is possible to equalize gains over the entire signal band.

Further, in the system of the embodiment 1-1, since the reference lights fr1 to fr3 are arranged in the wavelength at which the Raman gains caused by the pumping lights fp1 to fp3 reach peaks, it is possible to obtain relatively easily a desired gain tilt by adjusting the pumping lights fp1 to fp3.

Figure 7:
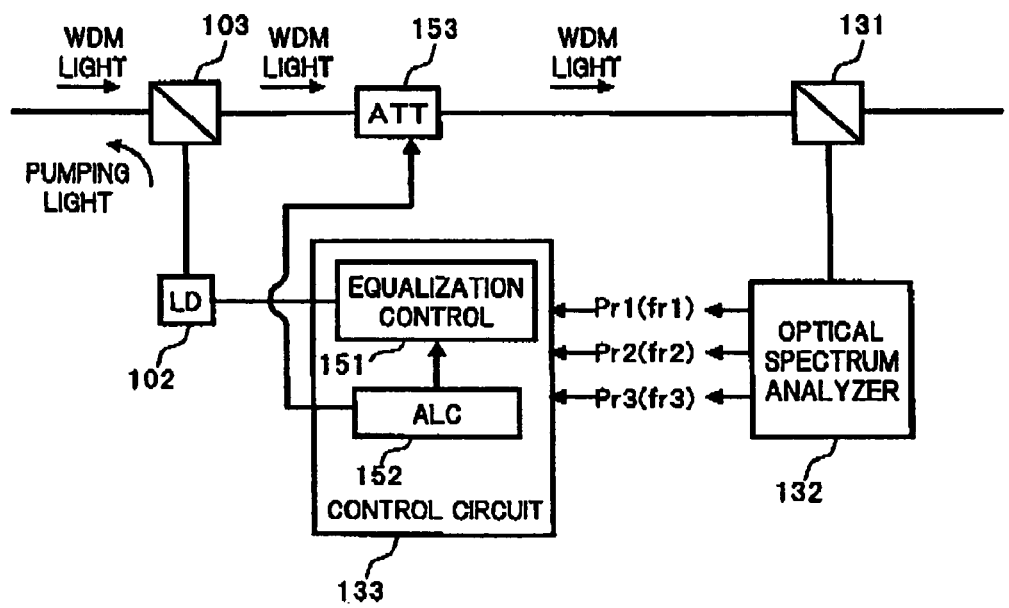
FIG. 7 shows an embodiment of the repeater station operating based on the optical power of a WDM light in the embodiment 1-1.

Moreover, in the embodiment 1-1, the control for equalizing the gains in the signal band of the WDM light is performed utilizing the reference lights fr1 to fr3. These reference lights may be used for controlling the total output power of the WDM light. In this case, the control circuit 133, as shown in FIG. 7 for example, comprises an equalization control section 151 and an ALC (automatic level control) section 152. Here, the equalization control section 151 controls the pumping lights fp1 to fp3 generated by the pumping light source 102 as described above. On the other hand, the ALC section 152 calculates an average value of the respective optical powers of the reference lights fr1 to fr3, detected by the optical spectrum analyzer 132.

Further, the ALC section 152 may corrects the calculation result of the equalization control section 151 based on the average value. In this case, the control circuit 133 controls not only the respective optical powers of the reference lights fr1 to fr3, but also the pumping lights fp1 to fp3 based on the average value. As a result at the same time when the gains of Raman amplification are equalized, the output power of the WDM light is held to the desired level.

The ALC section 152 may controls attenuation in an optical attenuator (ATT) 153, so that, for example, the average value of the respective optical powers of the reference lights fr1 to fr3 coincides with a previously determined target output power per 1 channel.

In such a manner, according to the system in which only the reference lights fr1 to fr3 are extracted from the WDM light and the total output power of the WDM light (or the optical power of each signal light contained in the WDM light) is estimated utilizing these reference lights, the optical power of the WDM light can be monitored with high accuracy, even in the case where the number of signal lights contained in the WDM light is less.

Namely, as in the conventional system, if the optical power of the WDM light is to be detected using a single photodiode, not only the optical power of the signal light but also the optical power caused by a noise of ASE or the like, are detected over the entire band. For example, in an example shown in (a) of FIG. 8, since all the optical power of a slanted line region is detected even in the case where only a signal light exist Therefore, it is impossible to detect even the optical power of the signal light.

Contrary to the above, in the system of the embodiment 1-1, since the optical power of a narrow band including the respective reference lights is detected, the system is hardly influenced by a noise. Namely, in the system of the embodiment 1-1, only the optical power in a slanted line region shown in (b) of FIG. 8 is detected, and therefore, the optical powers of the reference lights can be accurately detected. Thus, the optical power of the WDM light (or each signal light contained in the WDM light) can be accurately detected.

Next, an embodiment 1-2 of the present invention will be described.

Figure 9:
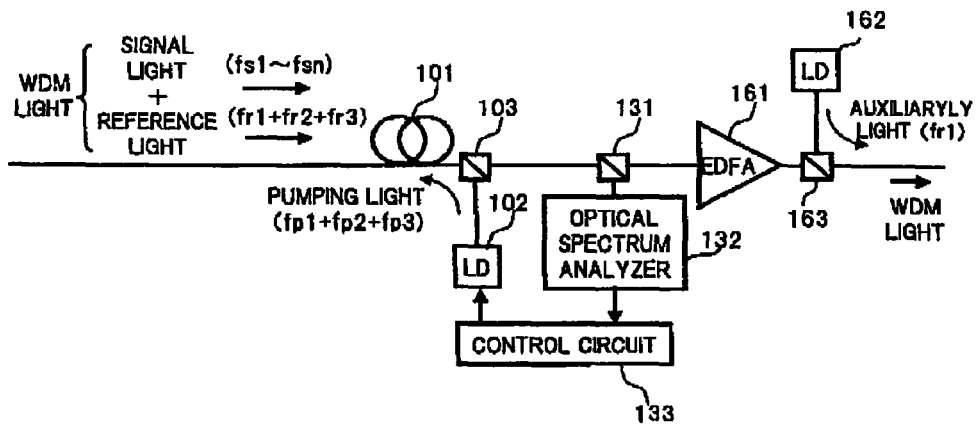
FIG. 9 is a block diagram of a repeater section of an optical transmission system of an embodiment 1-2.

FIG. 9 is a block diagram of a repeater station of the optical transmission system according to the embodiment 1-2 of the present invention. This repeater station comprises an erbium-doped fiber optic amplifier (EDFA) 161 for amplifying the signal band. Namely, in this system, the Raman amplifiers and the erbium-doped fiber optical amplifiers are mixed. Further, a relationship between the Raman amplifier and the erbium-doped fiber optical amplifier 161 is shown in FIG. 10.

Figure 10:
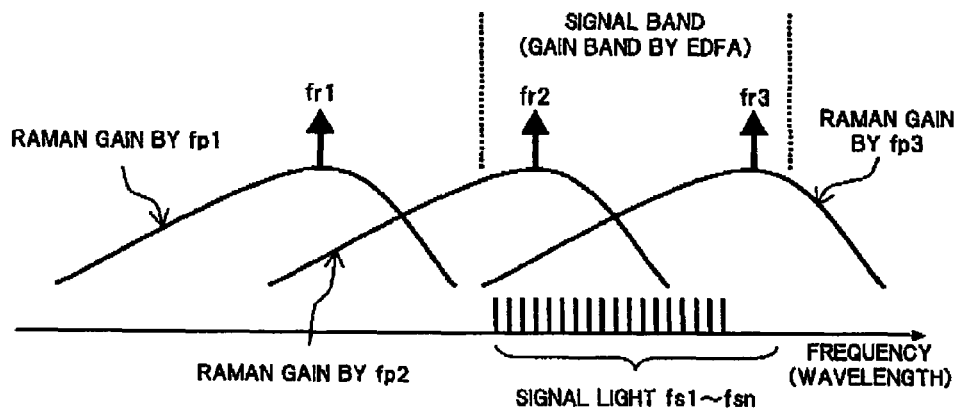
FIG. 10 is a diagram for explaining a relationship between a Raman amplifier and an erbium-doped fiber optical amplifier in the embodiment 1-2.

The erbium-doped fiber optical amplifier 161 and the Raman amplifier are designed so as to amplify the signal light as shown in FIG. 10. Here, the gain by the Raman amplifier is obtained by the pumping lights fp1 to fp3. Further, if a flat Raman gain is to be obtained over the entire signal band, sometimes the frequency at which the Raman gain caused by a certain pumping light among the plurality of pumping lights reaches a peak, is located outside the signal band. In the example of FIG. 10, the frequency at which the Raman gain caused by the pumping light fp1 reaches the peak is located outside the signal band.

However, in the optical transmission system of the embodiment 1-2, the reference lights fr1 to fr3 are set respectively at the frequencies at which the Raman gains caused by the pumping lights fp1 to fp3 reach peaks, respectively. Namely, in the example shown in FIG. 10, since the reference light fr1 is located outside the signal band, the amplification is not effected or an amplification amount is insufficient, by the erbium-doped fiber optical amplifier 161. Accordingly, if nothing is done, the optical power of the reference light fr1 is reduced compared with the other reference lights fr2 and fr3. Therefore, in the system of the embodiment 1-2, an auxiliary light source (LD) 162 for generating an auxiliary light of a frequency the same that of the reference light fr1 and a WDM coupler 163 multiplexing the auxiliary light generated by the auxiliary light source 162 with the WDM light are provided in each repeater station (or some repeater stations among all the repeater stations). Then, the auxiliary light of the frequency the same as that of the reference light fr1 is supplied, so that the optical power of the reference light fr1, which is not amplified by the erbium-doped fiber optical amplifier 161, is adjusted so as to be the same level as those of the other reference lights fr2 and fr3.

Further, a WDM coupler 171 is disposed between the optical spectrum analyzer 132 and the optical branching coupler 131. Thus, a part of the power of the reference light fr1 outside the signal band is selected, to be led to a photodiode 172, and when repeatedly amplified by a supervisory signal repeater 173, it is superimposed with coupler story signal data at the auxiliary light source 162 to pass through via the WDM coupler 163 for the multiplexing. As a result, it is also possible to superimpose a supervisory signal light on the reference light outside the signal band In the example shown in FIG. 1 or FIG. 9, as a circuit (detecting means) for detecting the optical powers of the reference lights fr1 to fr3, the optical spectrum analyzer 132 is used. However, the present invention is not limited thereto.

Figure 11:
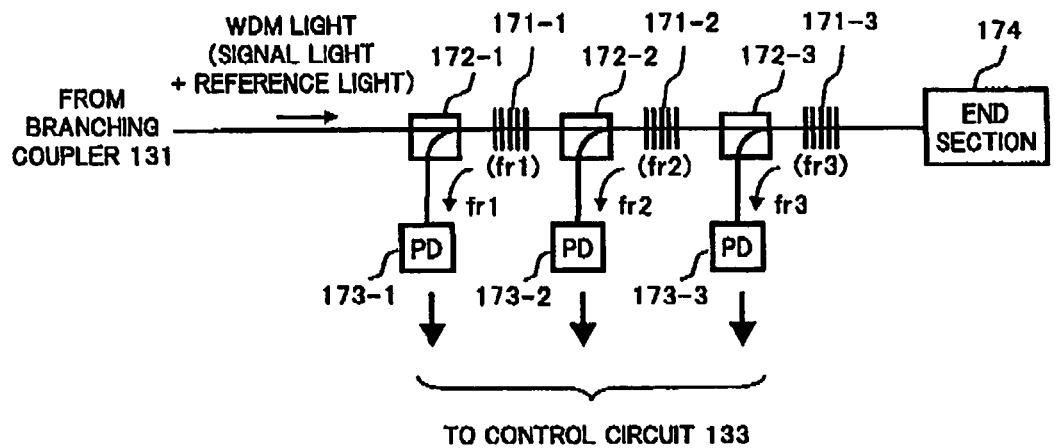
FIG. 11 is a diagram showing an embodiment of an apparatus for detecting the optical powers of the reference lights in the embodiments 1-1 and 1-2.

FIG. 11 shows an embodiment of a circuit for detecting the optical powers of the reference lights. Here, a detecting circuit 170 is provided instead of the optical spectrum analyzer 132 shown in FIG. 1 or FIG. 9. Namely, the detecting circuit 170 receives the WDM light branched by the branching coupler 131, and detects the optical powers of the reference lights fr1 to fr3 contained in the WDM light, to notify the detection result to the control circuit 133.

The detecting circuit 170 comprises reflector elements 171-1 to 171-3 selectively reflecting the reference lights fr1 to fr3. The reflector elements 171-1 to 171-3 are realized by, for example, fiber Bragg gratings. The reflector element 171-1 reflect only the light of the frequency at which the reference light fr1 is set. Similarly, the reflector elements 171-2 and 171-3 reflect only the lights of frequencies at which the reference lights fr2 and fr3 are set, reflectively. The detecting circuit 170 ends by means of a reflection-free termination section 174.

The light reflected by the reflector element 171-1 (that is, the reference light fr1) is led to a photodiode 173-1 by an optical device 172-1. This optical device 172-1 can be realized by, for example, an optical branching coupler, an optical circulator or the like. Then, the optical power of the light fr1 is detected by the photodiode 173-1. Similarly, the reference lights fr2 and fr3 reflected by the reflector elements 171-2 and 171-3 are led to diodes 173-2 and 173-3 by optical devices 172-2 and 172-4, respectively. Then, the optical powers of the reference lights fr2 and fr3 are detected by the photodiodes 173-2 and 173-3.

In this manner, the detecting circuit shown in FIG. 11 is realized by combining simple optical devices. Therefore, it is possible to achieve the lower cost compared with the configuration utilizing the optical spectrum analyzer 132.

Figure 12:
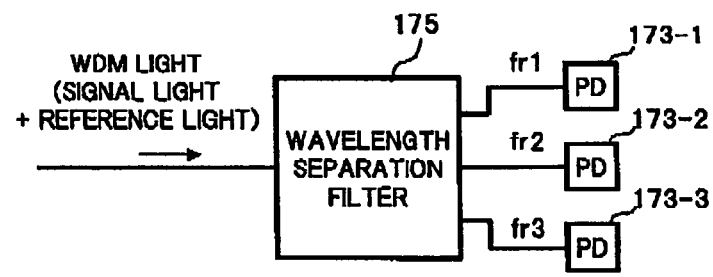
FIG. 12 is a diagram showing a modified example of a detection circuit of FIG. 11.

FIG. 12 is a modified example of the detecting circuit shown in FIG. 11. This detecting circuit comprises a wavelength separation filter 175 selectively passing therethrough previously determined wavelengths. In this example, the wavelength separation filter 175 passes therethrough only the reference lights fr1 to fr3. Then, these reference lights fr1 to fr3 a led to the corresponding photodiodes 173-1 to 173-3, respectively.

In the embodiments shown in FIG. 1 to FIG. 12, the Raman amplification is realized with the pumping light fp1 to fp3 of three waves. However, the present invention is not limited thereto, and is applicable to any system utilizing a plurality of pumping lights of wavelength different from each other.

Next an embodiment 2-1 of the present invention will be described.

Figure 13:
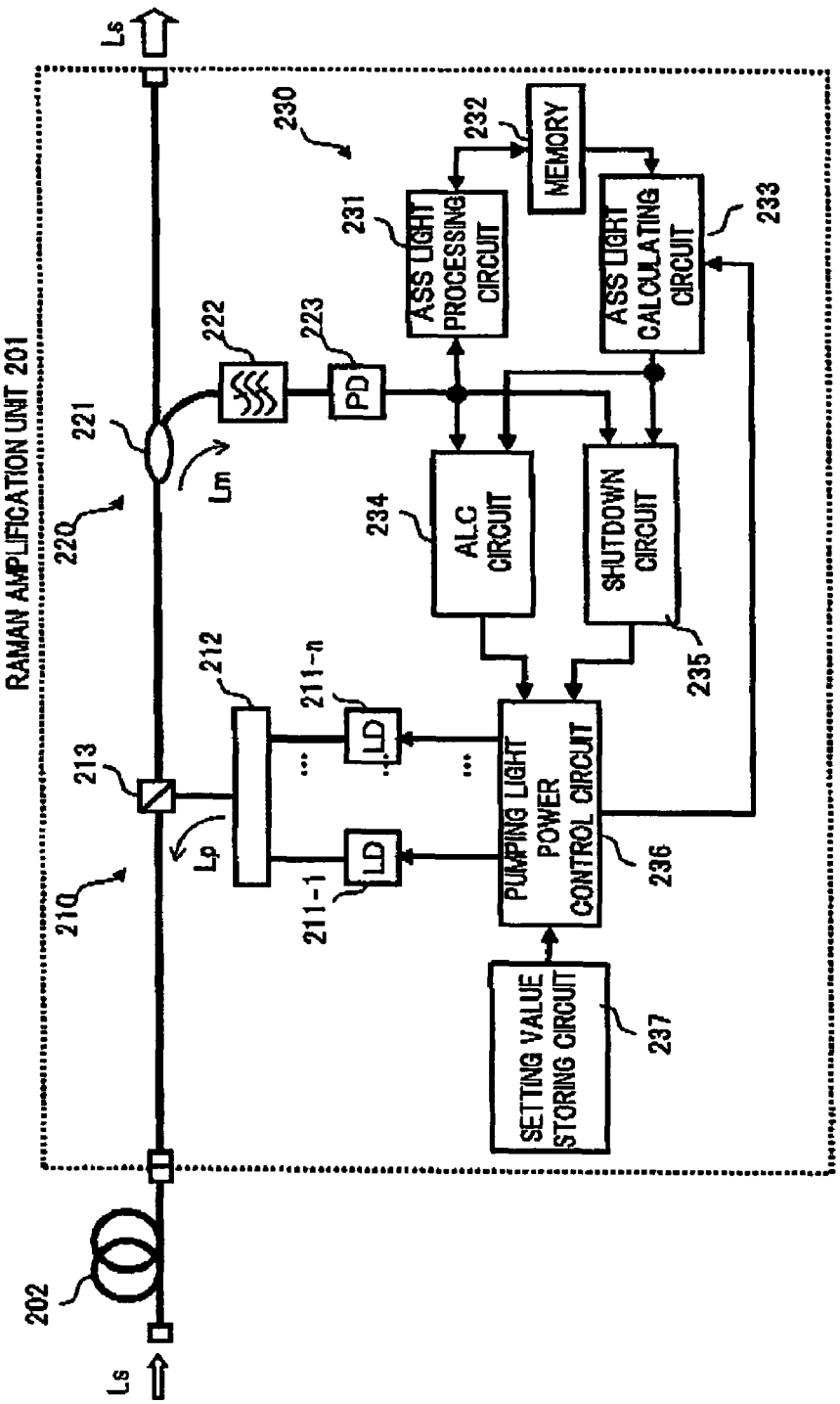
FIG. 13 is a block diagram showing a configuration of a Raman amplifier according to an embodiment 2-1 of the present invention.

FIG. 13 is a block diagram showing a configuration of a Raman amplifier according to the embodiment 2-1 of the present invention.

In FIG. 13, the Raman amplifier of the embodiment 2-1 comprises, for example, a Raman amplification unit 201 supplying a pumping light Lp for Raman amplification to an optical transmission path 202 as an optical amplification medium. The Raman amplification unit 201 comprises a pumping light supply section 210, an output light monitoring section and a control section 230.

The pumping light supply section 210 comprises, for example, n pumping light sources (LD) 211-1 to 211-n, a combining device 212 and a WDM coupler 213. The respective pumping light sources 211-1 to 211-n generate lights of required wavelength bands capable of Raman amplifying a signal light Ls transmitted over the optical transmission path 202, to output them to the combining device 212. The combining device 212 combines output lights from the respective pumping light sources 211-1 to 211-n, to generate a pumping light Lp, and outputs the pumping light Lp to the WDM coupler 213. The WDM coupler 213 outputs the pumping light Lp output from the combining device 212, to the optical transmission path 202 connected with a signal light input end of the Raman amplification unit 201, and also transmits the signal light Ls input from the optical transmission path 202, to the output light monitoring section 220 at a latter stage. Thus, the present Raman amplifier has a backward pumping configuration in which a propagation direction of the pumping light Lp is opposite to a propagation direction of the signal light Ls.

Wavelengths of the lights output from the pumping light sources 211-1 to 211-n are set to correspond to a wavelength band of the signal light Ls. For example, in the case where a silica-based optical fiber is used for the optical transmission path 202, output wavelengths of the respective pumping light sources 211-1 to 211-n are respectively set within a wavelength band of 1450 nm, which is shifted by about 100 nm to a shorter wavelength side relative to the signal light of 1550 nm. Note, the output wavelengths of the signal light Ls and the respective pumping light sources 211-1 to 211-n in the present invention are not limited to the above example. It is possible to apply the wavelength settings in known Raman amplifiers to the present invention.

The output light monitoring section 220 comprises, for example, a branching device 221, an optical filter 222 and a light receiving element (PD) 223. The branching device 221 branches a part of the light that has been propagated through the optical transmission path 202 and then has passed through the WDM coupler 213, as a monitor light Lm, to send the monitor light Lm to the optical filter 222. The optical filter 222, which is a bandpass filter having a transmission band corresponding to the wavelength band of the signal light Ls, extracts the light in the signal light wavelength band from the monitor light Lm sent from the branching device 221, to output the extracted light to the light receiving element 223. The light receiving element receives the monitor light Lm passed through the optical filter 222, and generates an electric monitor signal the level of which is changed according to the power of the monitor light Lm, to output the electric monitor signal to the control section 230.

The control section 230 comprises, for example, an ASS light processing circuit 231, a memory 232, an ASS light calculating circuit 233, an ALC circuit 234, a shutdown circuit 235, a pumping light power control circuit 236 and a setting value storing circuit 237. Here, the ALC circuit 234, the shutdown circuit 23 and the pumping light power control circuit 236 function as a pumping light supply section.

The ASS light processing circuit 231 receives the monitor signal output from the light receiving element 223 of the output light monitoring section 220, and in the preparation stage before starting the operation of the present Raman amplifier as described later, detects the power of an ASS light generated by supplying the pumping light Lp to the optical transmission path 202, based on the monitor signal, and then, using the detected ASS light power, obtains a coefficient of a modeling formula to be used for the calculation of the ASS light power after the operation of the Raman amplifier, to store the obtained coefficient in the memory 232. The ASS light calculating circuit 233 reads out storage information in the memory 232, to calculate a correction value of the ASS light power corresponding to a supply condition of the pumping light Lp after starting the operation, in accordance with the modeling formula. The calculation result in the ASS light calculating circuit 233 is transmitted to the ALC circuit 234 and the shutdown circuit 235.

The ALC circuit 234 generates a signal for controlling the supply condition of the pumping light Lp so that the power of the signal light Ls output from the present Raman amplifier becomes fixed at the required level, based on the monitor signal output from the light receiving element of the output light monitoring section 220 and the correction value of the ASS light power calculated by the ASS light calculating circuit 233, to output the control signal to the pumping light power control circuit 236. The shutdown circuit 235 judges whether or not the signal light Ls to be input to the Raman pumping unit 201 from the optical transmission path 202 is interrupted, based on the monitor signal from the light receiving element 223 and the correction value of the ASS light power calculated by the ASS light calculating circuit 233, and if the signal light Ls is interrupted, stops the supply of the pumping light Lp or generates a control signal for suppressing the power of the pumping light Lp to the safe level at which the pumping light does not harmfully affect a human body to output the control signal to the pumping light power control circuit 236.

The pumping light power control circuit 236 is for adjusting drive conditions of the respective pumping light sources 211-1 to 211-n to control the power of the pumping light Lp to be supplied to the optical transmission path 202. This pumping light power control circuit 236 drives the respective pumping light sources 211-1 to 211-n in accordance with a setting value of the pumping light power previously stored in the setting value storing circuit 237, when starting the operation of the Raman amplifier, and thereafter, controls the respective pumping light sources 211-1 to 211-n in accordance with the control signals respectively output from the ALC circuit 234 and the shutdown circuit 235. Further, the pumping light power control circuit 236 is provided with a function of outputting a signal indicating a setting condition of the present pumping light power to the ASS light calculating circuit 233.

Next, an operation of the Raman amplifier in the embodiment 2-1 will be described.

Figure 14:
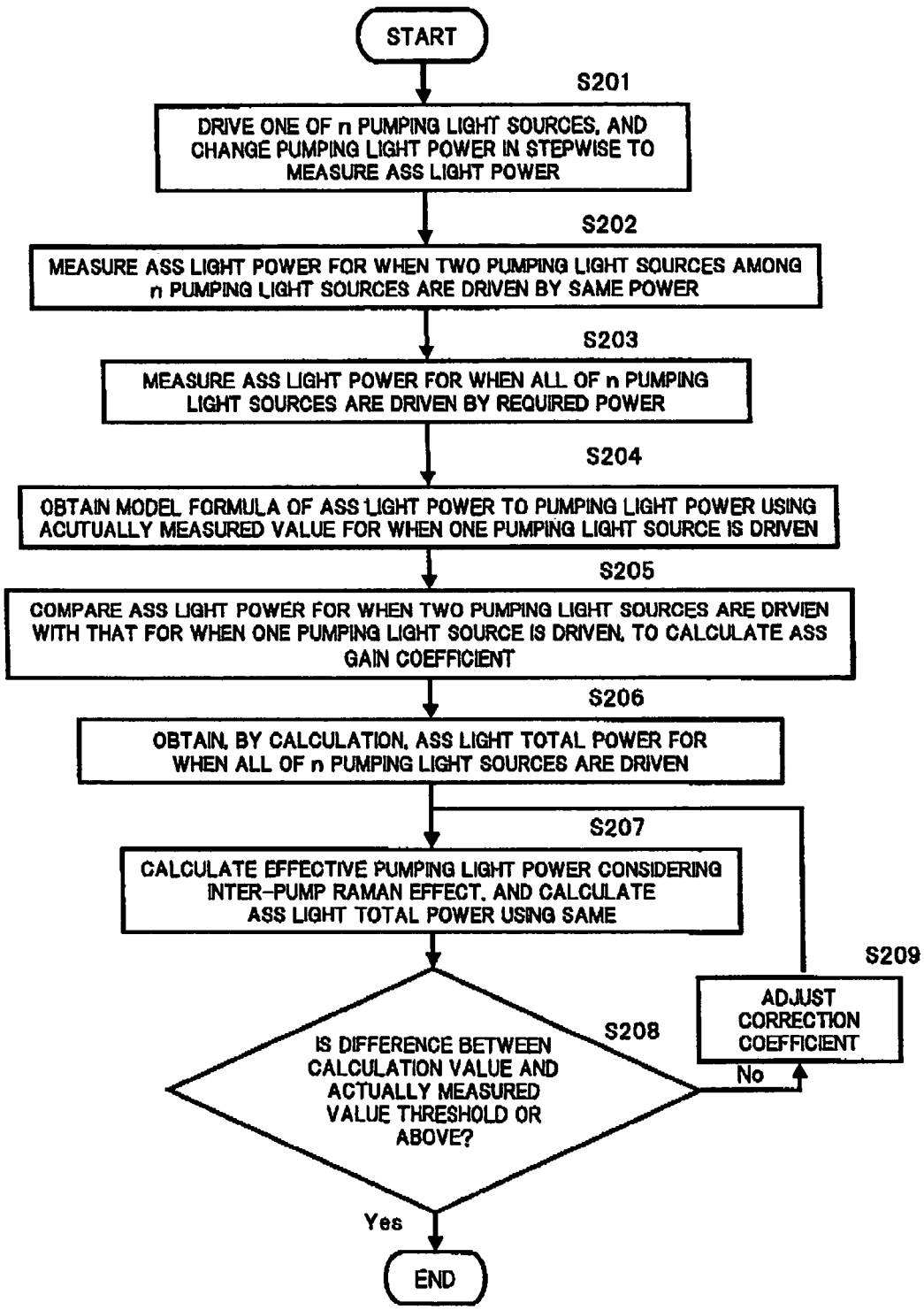
FIG. 14 is a flowchart for explaining an operation in the preparation stage before starting the operation.

FIG. 14 is a flowchart for explaining the operation in the preparation stage before starting the operation.

In the present Raman amplifier, as the processing in the preparation stage before starting the operation, such as, field adjustment performed when the optical transmission system is assembled or the like, a series of processing for obtaining the coefficient of the modeling formula for calculating the ASS light power is executed. To be specific, first in step 201 (S201 in the figure, and the same rule is applied herein below) of FIG. 14, one of the n pumping light sources 211-1 to 211-n is driven, and the power of the ASS light generated when the pumping light Lp output from the driven pumping source is supplied to the optical transmission path 202, is measured by the output light monitoring section 220. The measurement of this ASS light power is performed by changing in stepwise the supply power of the pumping light Lp, such as, 50 mW, 100 mW, 150 mW, 200 mW, 250 mW and the like, as exemplified by black circles in FIG. 15. Specifically, when the pumping light Lp, the supply power of which is set corresponding to each of the above measuring points, is given to the optical transmission path 202 (to which the pumping light Lp is not input in the preparation stage) from the Raman amplification unit 201, the ASS light is generated due to a Raman effect by the pumping light Lp; the ASS light being propagated in a direction opposite to the propagation direction of the pumping light Lp, is input to the Raman amplification unit 201 from the optical transmission path 202; a part of the ASS light is branched by the branching device 221 as the monitor light Lm, and then received by the light receiving element 223 via the optical filter 222; and a photo-electrically converted monitor signal is output to the ASS light processing circuit 231. In the ASS light processing circuit 231, the power of the ASS light is detected based on the monitor signal from the light receiving element 223, and the detection result is stored in the memory 233 so as to correspond to the supply power of the pumping light Lp. The measurement of the ASS light power performed by driving one pumping light source as described above, is sequentially performed on each of the n pumping light sources 211-1 to 211-n, and when all the measurements are completed, control proceeds to step 202.

In step 202, arbitrary two pumping light sources among n pumping light sources 211-1 to 211-n are combined with each other to be driven by the same power, and the pumping light Lp obtained by combining output lights of the combined pumping light sources, is supplied to the optical transmission path 202, so that the ASS light power generated by the pumping light Lp is measured. The output power of the two pumping light sources is set so as to correspond to at least one or more of the plurality of measuring points in the case where the one pumping light source described above is driven (for example, 100m or the like). The measurement of the ASS light power for when two pumping light sources are combined with each other, is performed similarly to step 201, and the ASS light power detected by the ASS light processing circuit 231 is stored in the memory 232, so as to correspond to the combination of the two pumping light sources and the setting value of the output power. The measurement of the ASS light power by the combination of two pumping light sources is performed sequentially for all the combinations of n pumping light sources 211-1 to 211-n. When the measurements in all of the combinations are completed, then control proceeds to step 203.

In stop 203, the ASS light power generated when all of n pumping light sources 211-1 to 211-n are driven by the same power, is measured. Measurement data in this case is acquired as data for verifying the coefficient of the modeling formula for the ASS light power calculation, which is to be determined in the succeeding steps based on the measurement results in stops 201 and 202. Note, in the case the verification is not needed, it is possible to omit the processing in stop 203.

Figure 15:
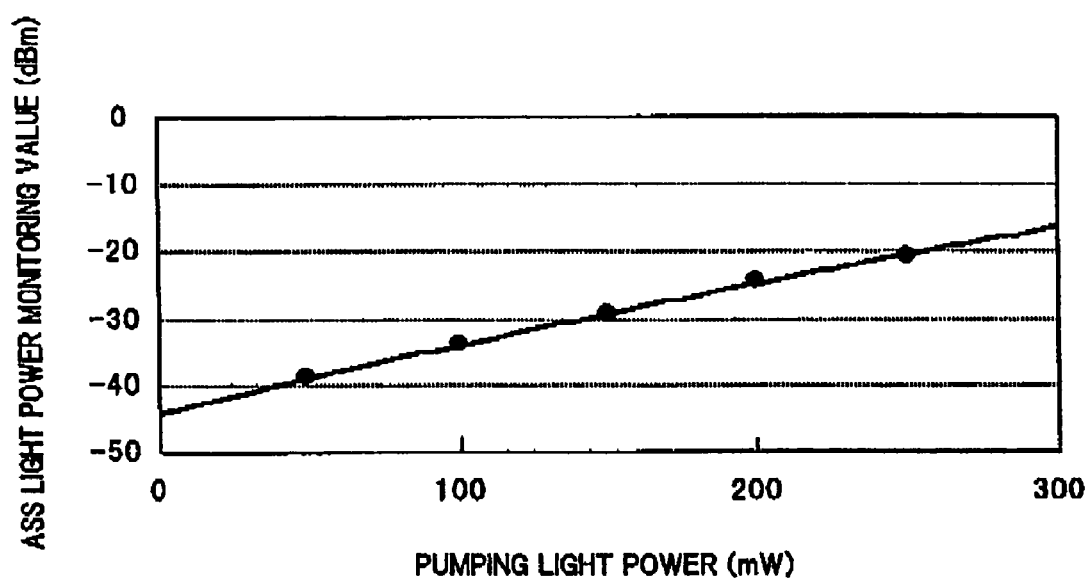
FIG. 15 is a diagram showing an example of an ASS optical power measurement in step 201 of FIG. 14.

In step 204, the storage data in the memory 232 is read out by the ASS light processing circuit 231, and a modeling formula expressing the ASS light power generated when one pumping light source is driven, is prepared using the data actually measured in 201 (refer to solid line in FIG. 15). Here, a quadratic function shown in the next (2.1) formula is adopted as the modeling formula expressing a relationship of the ASS light power $P_{ASS}$ to the pumping light power $P_P$, and the actually measured value read out from the memory 232 is substituted for the quadratic function to obtain coefficients a, b and c, so that modeling formulas corresponding to the respective pumping light sources 211-1 to 211-n are prepared, and the preparation results are stored in the memory 232.

$$P_{ASS} = aP_P^2 + bP_P + c \quad (2.1)$$

In step 205, the ASS light power generated when two pumping light sources are driven is compared with the ASS light power generated when one pumping light source is driven. The ASS light power generated when the plurality of pumping light sources is driven is not equal to the simple sum of each ASS light power generated when one pumping light source is driven. This is because the ASS light generated by a pumping light of a certain wavelength receives a gain by a pumping light of another wavelength.

For example, consideration is made on a Raman amplifier amplifying a signal light of 1550 nm band (C-band) by three pumping light sources of different wavelengths. Here, it is assumed that the power of pumping light output of each of the three pumping light sources is 100 mW, the ASS light powers corresponding to C-band by the respective pumping lights are $P_{A1}$, $P_{A2}$ an $P_{A3}$, by the ASS light powers by the combination of arbitrary two waves pumping lights are $P_{A12}$, $P_{A23}$ and $P_{A31}$. In this case, the ASS light powers by the two waves pumping lights are such that the ASS light power by one of the pumping lights receives a gain by the other pumping light, that is, the sum of each ASS light power influenced by both of the pumping lights is obtained. Therefore, the ASS light powers $P_{A12}$, $P_{A23}$ and $P_{A31}$ by the two waves pumping lights can be expressed by relational expressions shown in the (2.2) formula $$G_2 P_{A1} + G_1 P_{A2} = P_{A12}$$

$$G_3 P_{A2} + G_2 P_{A3} = P_{A23}$$

$$G_1 P_{A3} + G_3 P_{A1} = P_{A31} \quad (2.2)$$

$G_1$, $G_2$ and $G_3$ are gains of the respective pumping lights in C-band (especially, gains to be given to ASS light), and will be referred to as ASS gains hereinbelow.

The ASS gains $G_1$, $G_2$ and $G_3$ are expressed by the next (2.3) formula based on the (2.2) formula.

$$G_1 = \frac{P_{A31}}{2P_{A3}} + \frac{P_{A12}}{2P_{A2}} - \frac{P_{A1}P_{A23}}{2P_{A2}P_{A3}}$$

$$G_2 = \frac{P_{A12}}{2P_{A1}} + \frac{P_{A23}}{2P_{A3}} - \frac{P_{A2}P_{A31}}{2P_{A3}P_{A1}}$$

$$G_3 = \frac{P_{A23}}{2P_{A2}} + \frac{P_{A31}}{2P_{A1}} - \frac{P_{A3}P_{A12}}{2P_{A1}P_{A2}} \quad (2.3)$$

As shown in (2.3) formula, the ASS gains $G_1$, $G_2$ and $G_3$ can be calculated using the actually measured values $P_{A1}$, $P_{A2}$ and $P_{A3}$ of the ASS light powers for when one pumping light source is driven, and the actually measured $P_{A12}$, $P_{A23}$ and $P_{A31}$ of the ASS light powers for when two pumping light sources are combined with each other to be driven. Note, the case where three pumping light sources are disposed has been exemplarily shown. However, for the case where four or more pumping light sources are disposed, the ASS gain corresponding to each pumping light source can be obtained, if the actually measured value for when each pumping light source is driven individually and the actually measured value for when two pumping light sources are combined with each other to be driven, have been obtained.

Provided that a decibel (dB) value of the be ASS gain follows a direct function, it becomes possible to calculate a coefficient of the ASS gain. To be specific, if ASS gain are $\gamma_1$, $\gamma_2$ and $\gamma_3$, the ASS gain coefficients $\gamma_1$, $\gamma_2$ and $\gamma_3$ in the case where, for example, each pumping light power is 100 mW, can be expressed by the net (2.4) formula.

$$\gamma_1 = \frac{10\log(G_1)}{100}, \gamma_2 = \frac{10\log(G_2)}{100}, \gamma_3 = \frac{10\log(G_3)}{100} \quad (2.4)$$

The ASS gain coefficients $\gamma_1$, $\gamma_2$ and $\gamma_3$ obtained in accordance with (2.4) formula are stored in the memory 232 as of the modeling formula for calculating the ASS light power.

In step 206, using the ASS gain coefficients obtained in step 205, the ASS light power generated when all of n pumping light sources are driven. Specifically, the total power $P_{ASS\_total}$ (mW) of the ASS light generated in C-band when three pumping light sources are driven, can be calculated by next (2.5) formula.

$$P_{ASS\_total} = 10^{\{P_{ASS1} + \gamma_2 P_{P2} + \gamma_3 P_{P3}\}/10} + \\ 10^{\{P_{ASS2} + \gamma_3 P_{P3} + \gamma_1 P_{P1}\}/10} + 10^{\{P_{ASS3} + \gamma_1 P_{P1} + \gamma_2 P_{P2}\}/10} \quad (2.5)$$

In the above formula, the respective values $P_{ASS1}$, $P_{ASS2}$ and $P_{ASS3}$ are the ASS light powers calculated based on the coefficients a, b and c of (2.1) formula obtained in step 204, and setting values of pumping light powers $P_{P1}$, $P_{P2}$ and $P_{P3}$ corresponding to the respective $P_{ASS1}$, $P_{ASS2}$ and $P_{ASS3}$.

In step 207, the effective pumping light powers considering the Raman effect (inter-pump Raman effect) occurring between pumping lights of respective wavelengths are obtained, and the ASS light total power is calculated using the effective pumping light powers. To be specific, for example, an energy transmission coefficient due to the inter-pump Raman effect is r, and pumping light frequencies output from three pumping light sources are $f_1$, $f_2$ and $f_3$, then effective intensity increasing rates of the respective pumping light powers $\Delta_1$, $\Delta_2$ and $\Delta_3$ are expressed by the next (2.6) formula.

$$\Delta_1 = r\{P_2(f_2 - f_1) + P_3(t_3 - t_1)\}$$

$$\Delta_2 = r\{P_3(f_3 - f_2) + P_1(f_1 - f_2)\}$$

$$\Delta_3 = r\{P_1(f_1 - f_3) + P_2(f_2 - f_3)\} \quad (2.6)$$

Therefore, the effective pumping light powers considering the inter-pump Raman effect can be expressed in accordance with the next (2.7) formula.

$$P_{P1\_eff} = P_{P1}(1 + \Delta_1)$$

$$P_{P2\_eff} = P_{P2}(+\Delta_2)$$

$$P_{P3\_eff} = P_{P3}(1 + \Delta_3) \quad (2.7)$$

Accordingly, if the ASS light total power is calculated using the effective pumping light powers $P_{P1\_eff}$, $P_{P2\_eff}$ and $P_{P3\_eff}$ obtained by (2.7) formula, then the next (2.8) formula is obtained.

$$P_{ASS\_total} = 10^{\{P_{ASS1} + \gamma_2 P_{P2\_eff} + \gamma_3 P_{P3\_eff}\}/10} + \\ 10^{\{P_{ASS2} + \gamma_3 P_{P3\_eff} + \gamma_1 P_{P1\_eff}\}/10} + \\ 10^{\{P_{ASS3} + \gamma_1 P_{P1\_eff} + \gamma_2 P_{P2\_eff}\}/10} \quad (2.8)$$

In step 208, the ASS light total power calculated in accordance with (2.8) formula is compared with the ASS light power measured by driving all the pumping light sources in step 203. Here, it is judged whether or not a difference between the calculation value using the modeling formula and the actually measured value, is a threshold (for example, 0.5 dB or the like) or above. If the difference is the threshold or above, control proceeds to step 209, where the energy transition coefficient r used in step 207 is reexamined, and the correction of the effective pumping light powers is performed, and thereafter, the ASS light total power is again calculated. Then, until the difference between the calculation value and the actually measured value becomes smaller, the correction of the effective pumping light powers is repeatedly performed.

By performing the series of processing shown in step 201 to 209, in the preparation stage before starting the operation, the coefficient of the modeling formula used for the calculation of the ASS light power after starting the operation is obtained, based on the measurement using the optical transmission path 202 to be used actually, and the obtained coefficient is stored in the memory 232.

Figure 40:
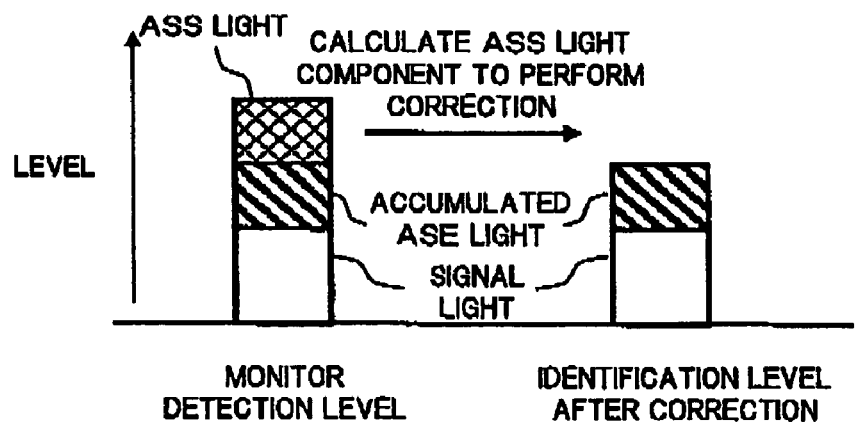
FIG. 40 is a diagram for explaining an example of a monitoring system of the signal light output power in a conventional Raman amplifier.
Figure 41:
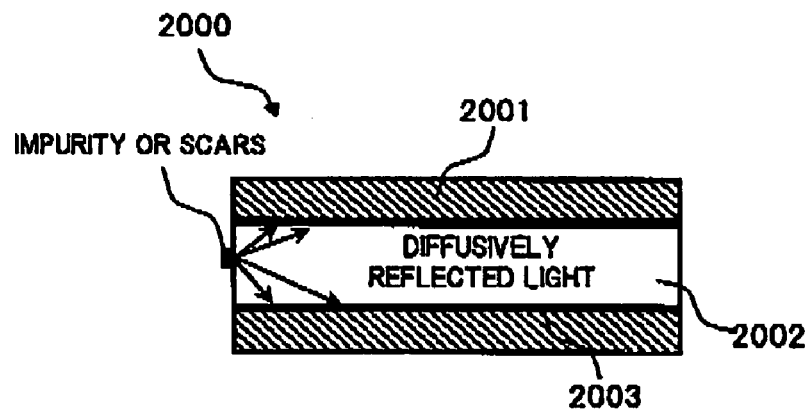
FIG. 41 is a diagram for explaining a fiber fuse (FF) phenomenon.

When reaching the stage to start the actual operation, in the present Raman amplifier, the pumping light power control circuit 236 reads out from the setting value storing circuit 237, an initial setting value of the pumping light power according to the signal light Ls to be transmitted, so that the respective pumping light sources 211-1 to 211-n are driven in accordance with the initial setting value. Thus, the pumping light Lp having the predetermined power is supplied from the pumping light supply section 210 to the optical transmission path 202, and the signal light Ls being propagated through the optical transmission path 202 is Raman amplified. This Raman amplified signal light Ls, as shown in FIG. 40 described above, includes the ASS light generated due to Raman amplification and accumulated ASE light. The signal light Ls propagated through the optical transmission path 202 is input to the Raman pumping unit 21, to pass through the WDM coupler 213, and then a part thereof is branched by the branching device 221 of the output light monitoring section 220, as the monitor light Lm. The monitor light Lm is eliminated therefrom, optical components within a band other than the signal light band, by the optical filter 222, to be converted into an electric monitor signal. The monitor signal output from the light receiving element 223 is sent to the ALC circuit 234 and also to the shutdown circuit 235.

In the ALC circuit 234, the signal light output power is judged based on the monitor signal from the light receiving element 223, and is subjected to the correction of the ASS light as shown in FIG. 40, in accordance with a correction value indicated by a signal output from the ASS light calculating circuit 233. To be specific, in the ASS light calculating circuit 233, the coefficient obtained in the preparation stage is read out from the memory 232, and the ASS light power corresponding to the present supply power of the pumping light Lp transmitted from the pumping light power control circuit 236, is calculated using (2.8) formula. Then, the calculation result is transmitted to the ALC circuit 234 as the correction value. Note, this correction value is also output to the shutdown circuit 235. In the ALC circuit 234 to which the correction value of the ASS light power is transmitted, the signal light output power is obtained, in which the ASS light component is corrected by subtracting the correction value of the ASS light power from the signal light output power judged based on the monitor signal from the light receiving element 223. Then, a signal for controlling the pumping light supply state so that the post-corrected signal light output power becomes fixed at the required level, is output from the ALC circuit 234 to the pumping light power control circuit 236. Thus, the drive conditions of the respective pumping light sources 211-1 to 211-n are feedback controlled, so that the output constant control of the Raman amplifier is performed.

Further, in the shutdown circuit 235, in the same manner as in the ALC circuit 234, the signal light output power in which the ASS light component is corrected, is obtained, and it is judged whether or not the post-corrected signal light output power is a previously set threshold or below. If the post-corrected signal light output power is the threshold or below, it is judged that the signal light Ls is interrupted, and the supply of the pumping light Lp is stopped, or a control signal for suppressing the power of the pumping light Lp to a predetermined level or below, is output from the shutdown circuit 235 to the pumping light power control circuit 236. Thus, the drive conditions of the respective pumping light sources 211-1 to 211-n are controlled so that the shutdown control of the Raman amplifier is performed. For the accuracy of this shutdown control, since the coefficient of the modeling formula for calculating the ASS light power is determined so as to enable the calculation of the ASS light power within the error of 0.5 dB or less, as shown in the processing in step 208 and step 209, it is possible to detect the signal light even if a value of a ratio between the signal light power and the ASS light power becomes about 1/10. This means that, for example, in the case where a generation amount of the ASS light is −20 dBm, the signal light power can be detected even in the case where the signal light power becomes smaller to about −30 dBm (equivalent to the signal light power for one wave in the transmission path power).

According to the Raman amplifier in the embodiment 2-1, as the field adjustment processing in the preparation stage before starting the operation, the ASS light power is measured using the optical transmission path 202 to be actually used at the operation time, and based on the measurement result, the coefficient of the modeling formula for calculating the ASS light power is determined, so that the correction of the ASS light power at the operation time can be performed with high accuracy. Thus, it becomes possible to execute reliably the output constant control or the shutdown control of the Raman amplifier.

Next, an embodiment 2-2 of the present invention will be described.

Figure 16:
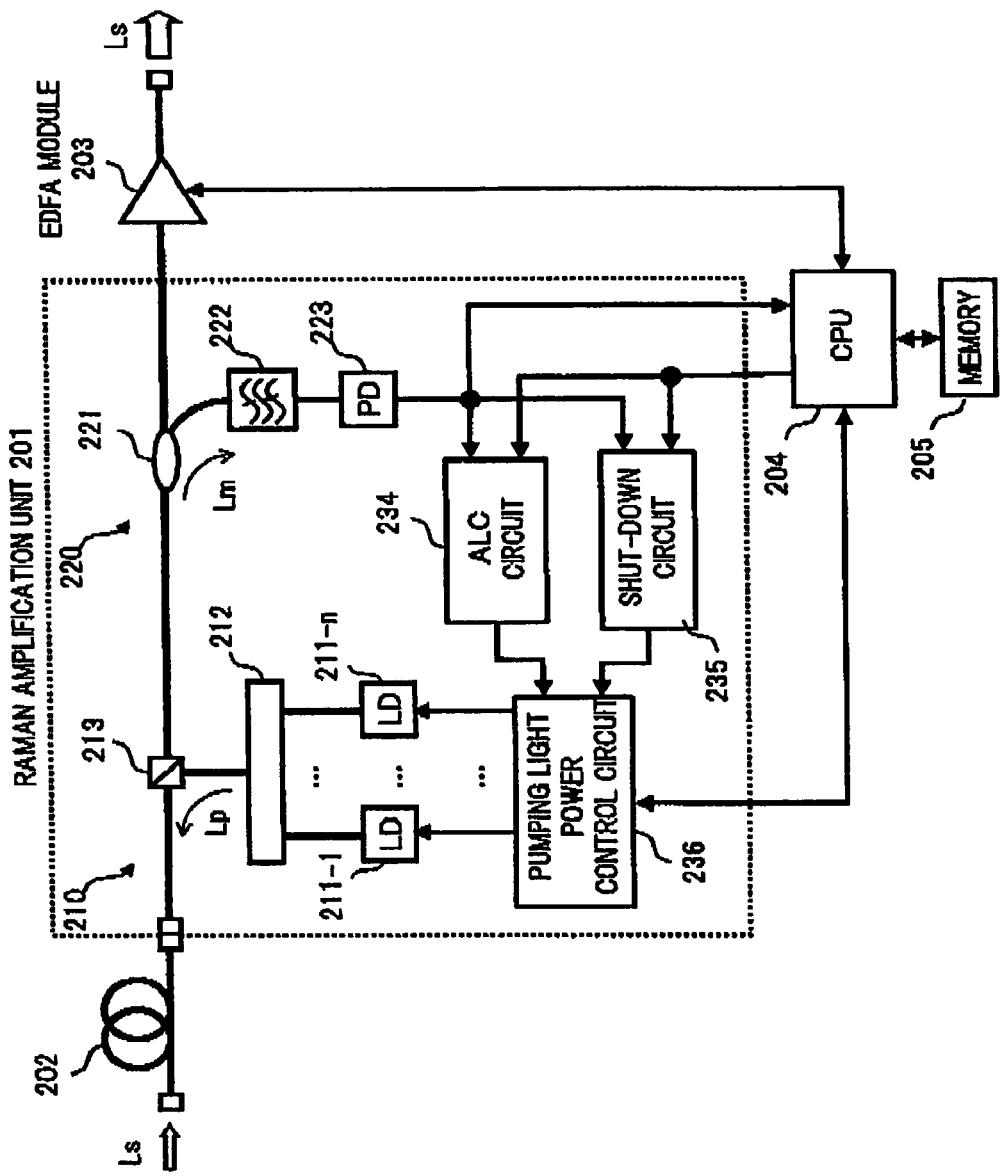
FIG. 16 is a block diagram showing a configuration of an optical amplifier according to an embodiment 2-2 of the present invention.

FIG. 16 is a block diagram showing a configuration of an optical amplification system according to the embodiment 2-2 of the present invention.

In FIG. 16, the optical amplification system of the embodiment 2-2 is constituted such that, in the optical amplification system having a known constitution in which a Raman amplifier and an erbium-doped fiber amplifier (EDFA) are cascade connected, the constitution similar to that in the embodiment 2-1 shown in FIG. 13 is adopted as a former stage Raman amplifier, and also a part of the function of the control section 230 constituting the Raman amplification unit 201 and a function of controlling a latter stage EDFA module 203 are realized by common CPU 204 and memory 205, so that the Raman amplifier and the EDFA are collectively managed.

The CPU 204 executes the processing corresponding to that of the ASS light processing circuit 231 in the embodiment 2-1, according to the monitor signal output from the light receiving element 223 of the Raman amplification unit 201, and obtains a coefficient of a modeling formula for calculating the ASS light power, to store the obtained coefficient in the memory 205. Further, the CPU 204 executes the processing corresponding to that of the ASS light calculating circuit 233 in the embodiment 2-1, according to the signal indicating the pumping light supply state output from the pumping light power control circuit 236, and calculates a correction value of the ASS light power at the operation time, to output the calculation result to the ALC circuit 23 and also the shutdown circuit 235, of the Raman amplification unit 201. Moreover, the CPU 204 is also provided with a function of executing the signal processing for a known control of the EDFA module 203, and therefore, is capable of performing the EDFA control utilizing the correction value of the ASS light power generated in the former stage Raman amplifier.

Note, the information relating to the initial setting value of the pumping light power that has been stored in the setting value storing circuit 237 in the embodiment 2-1, is stored in the memory 205, in this embodiment. Other components and operations other than the above, are the same as those in the embodiment 2-1, and therefore, the descriptions thereof are omitted.

According to the optical amplification system in the embodiment 2-2, the apparatus configuration in which the Raman amplifier and the EDFA are combined with each other, can also achieve an effect similar to that in the embodiment 2-1, and also the CPU 204 and the memory 205 are provided, which are common to the Raman amplifier and the EDFA, to execute the respective controls. Thus, it becomes possible to simplify the apparatus configuration.

Next, there will be described an embodiment 2-3 of the present invention.

Figure 17:
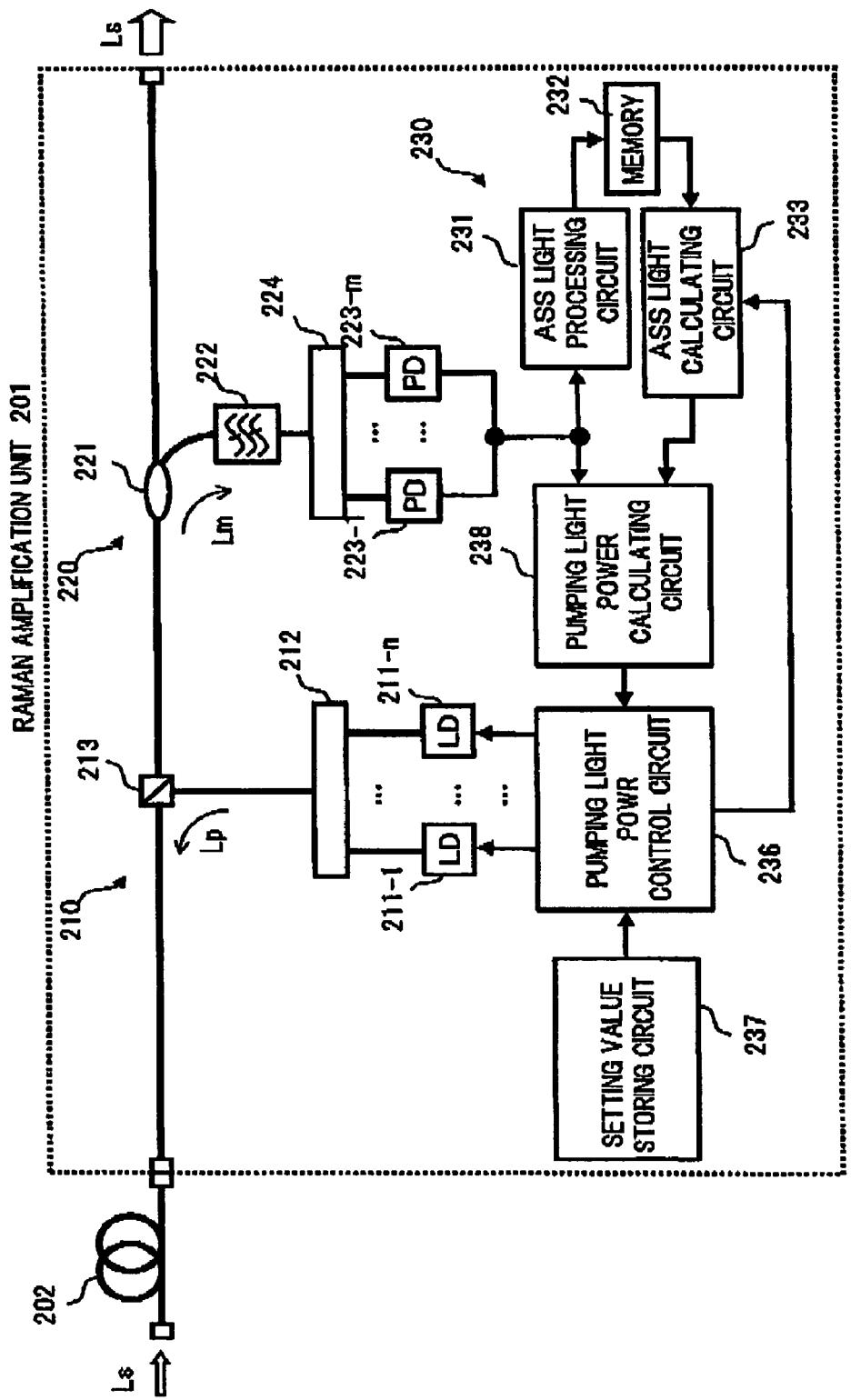
FIG. 17 is a block diagram showing a configuration of a Raman amplifier according to an embodiment 2-3 of the present invention.

FIG. 17 is a block diagram showing a configuration of a Raman amplifier according to the embodiment 2-3 of the present invention.

In FIG. 17, the Raman amplifier in the embodiment 2-3 is constituted such that, in the Raman amplifier in the embodiment 2-1, there is provided a function of controlling the supply condition of the pumping light Lp so that the Raman amplified signal light Ls has a desired wavelength characteristic. To be specific, the configuration of the present Raman amplifier differs from that of the embodiment 2-1 in that, in the output light monitoring section 220, a demultiplexer 224 and m light receiving elements 223-1 to 223-m are provided so that the monitor light Lm passed through the optical filter 221 can be divided into m wavelength blocks to be monitored, and also a pumping light power calculating circuit 238 is provided instead of the ALC circuit 234 and the shutdown circuit 235 that have been used in the embodiment 2-1. Note, other components other than the above are similar to those of the embodiment 2-1, and therefore, the descriptions thereof are omitted here.

The demultiplexer 224 provided in the output light monitoring section 220 receives, at one input port thereof, the monitor light Lm passed through the optical filter 221, and demultiplexes the monitor light Lm into m wavelength blocks, to output the lights of the wavelength blocks via corresponding output ports thereof, to the light receiving elements 223-1 to 223-m. The respective light receiving elements 223-1 to 223-n, which are connected with the respective output ports of the demultiplexer 224, each converts the monitor light Lm demultiplexed for each wavelength block by the demultiplexer 224 into an electric monitor signal, to output it. The monitor signal output from each of the respective light receiving elements 223-1 to 223-m is sent to the ASS light processing circuit 231 and also the pumping light power calculating circuit 238.

The pumping light power calculating circuit 238 receives the monitor signal corresponding to each wavelength block output from each of the respective light receiving elements 223-1 to 223-m, and the signal indicating the correction value of the ASS light power calculated by the ASS light calculating circuit 233, and based on these signals, calculates the setting value of the pumping light power capable of achieving the output signal light Ls having the desired wavelength characteristic, to transmit the calculation result to the pumping light power control circuit 238.

In the Raman amplifier of the above configuration, similarly to the embodiment 2-1, in the preparation stage before starting the operation, the ASS light power is measured using the optical transmission path 202 to be actually used, and based on the measurement result, the coefficient of the modeling formula for calculating the ASS light power is obtained by the ASS light processing circuit 231, and the obtained coefficient is stored in the memory 232. Then, by utilizing the correction value of the ASS light power, which is calculated by the ASS light calculating circuit 233 using the coefficient obtained in the preparation stage, the setting value of the pumping light power for obtaining the output signal light Ls having the desired wavelength characteristic is calculated.

Here, a specific setting method of the pumping light power will be described referring to a flowchart of FIG. 18. In the following description, consideration is made on the case where the output signal light Ls is divided into three wavelength blocks, to calculate the setting value of the pumping light power. However, the number of divided wavelength blocks is not limited to the above example.

Figure 18:
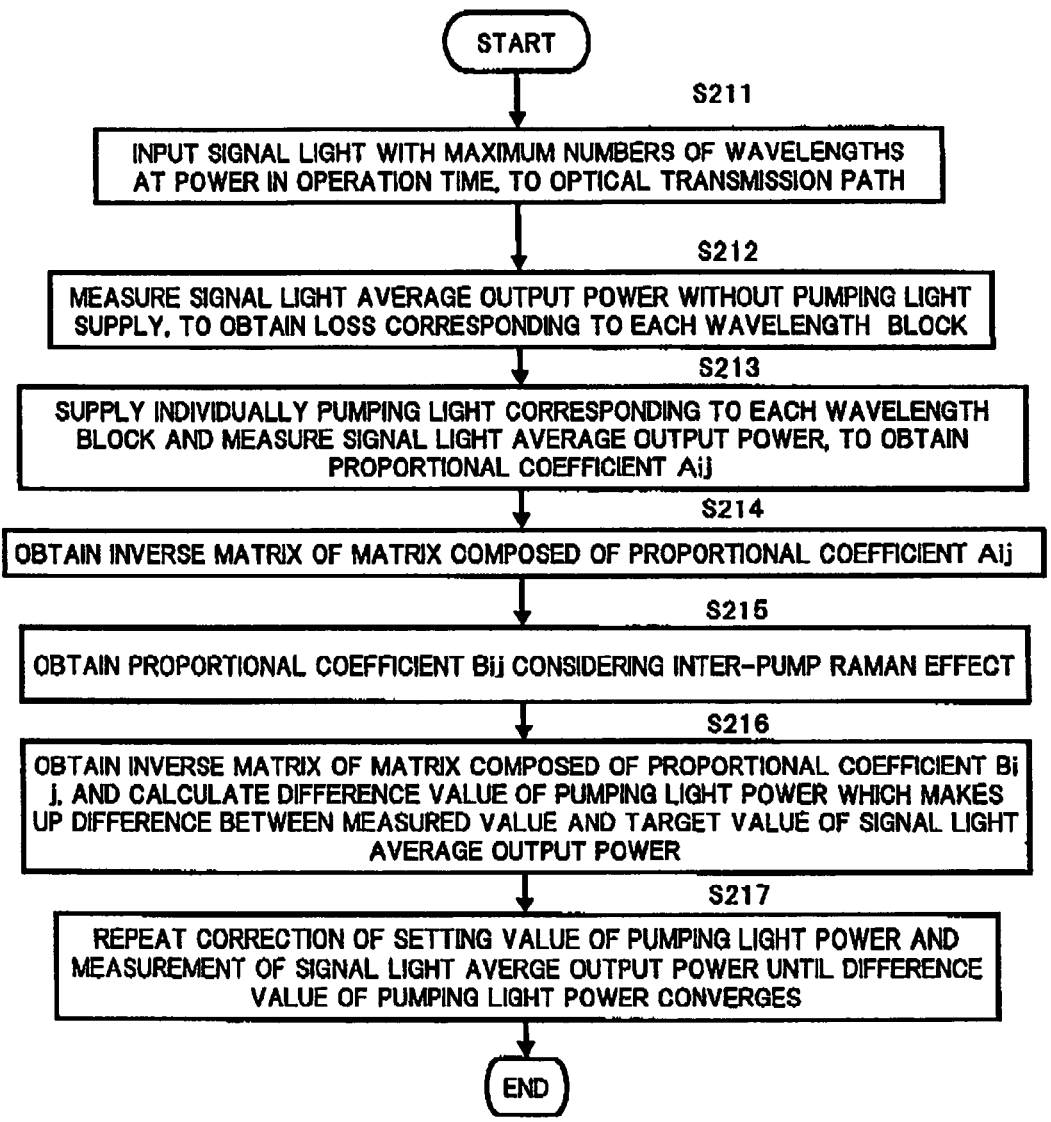
FIG. 18 is a flowchart for explaining a pumping light power setting method related to the embodiment 2-3.

First, in step 211 of FIG. 18, the signal light Ls of a maximum number of wavelengths that can be transmitted, is input to the optical transmission path 202 at the same power as that at the actual operation time.

In step 212, in a state where the pumping light Lp is not supplied to the optical transmission path 202, respective powers of the output signal light Ls divided into three wavelength blocks are measured by the output light monitoring section 220. Then, using the input power of the signal light Ls in step 211 and the measured signal light average output power, average losses $L_1$, $L_2$ and $L_3$ in the optical transmission path 202 corresponding to the respective wavelength blocks are calculated.

In step 213, the pumping light sources 211-1 to 211-n are driven for each group corresponding to each wavelength block, and the signal light average output power for each wavelength block is measured. Here, the pumping light powers corresponding to the respective wavelength blocks are $P_{P1}$, $P_{P2}$, $P_{P3}$. Then, a correction value of the ASS light power corresponding to each of the pumping light powers $P_{P1}$, $P_{P2}$ and $P_{P3}$ is calculated by the ASS light calculating circuit 233, and the calculation result is transmitted to the pumping light power calculating circuit 238. In the pumping light power calculating circuit 238, in accordance with the correction value calculated by the ASS light calculating circuit 233, the correction of the ASS light component is performed on the signal light average output power of each wavelength block measured by the output light monitoring section 220. Here, the signal light average output powers subjected the ASS light correction are $P_{S1}$, $P_{S2}$ and $P_{S3}$. These signal light average output powers $P_{S1}$, $P_{S2}$ and $P_{S3}$ can be expressed by a relationship shown in the next (2.9) formula, using the pumping light powers $P_{P1}$, $P_{P2}$ and $P_{P3}$ corresponding to the respective wavelength blocks and the losses $L_1$, $L_2$ and $L_3$ calculated in step 212.

$$\begin{bmatrix} P_{S1} \\ P_{S2} \\ P_{S3} \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} P_{P1} \\ P_{P2} \\ P_{P3} \end{bmatrix} + \begin{bmatrix} L_1 \\ L_2 \\ L_3 \end{bmatrix} \quad (2.9)$$

Accordingly, by giving the respective values obtained by the above measurement to (2.9) formula, a matrix composed of a proportional coefficient $A_{ij}$ (i, j=1, 2, 3) corresponding to each wavelength block is obtained.

In step 214, an inverse matrix of the matrix composed of the proportional coefficient $A_{ij}$ obtained in step 213 is calculated, to lead out a relational expression for calculating the pumping light powers $P_{P1}$, $P_{P2}$ and $P_{P3}$ necessary for realizing desired signal light average output powers $P_{S1}$, $P_{S2}$ and $P_{S3}$ as shown in the next (2.10) formula.

$$\begin{bmatrix} P_{P1} \\ P_{P2} \\ P_{P3} \end{bmatrix} = \begin{bmatrix} A_{11} & A_{12} & A_{13} \\ A_{21} & A_{22} & A_{23} \\ A_{31} & A_{32} & A_{33} \end{bmatrix}^{-1} \begin{bmatrix} P_{S1} - L_1 \\ P_{S2} - L_2 \\ P_{S3} - L_3 \end{bmatrix} \quad (2.10)$$

For example, if the signal light average output powers $P_{S1}$, $P_{S2}$ and $P_{S3}$ have the same value in the above (2.10) formula, it becomes possible to obtain the setting value of the pumping light power corresponding to each wavelength block, that is necessary for flattening the wavelength characteristic of the Raman amplified signal light Ls.

In step 215, for (2.10) formula, a proportional coefficient considering the inter-pump Raman effect is obtained. That is, the proportional coefficient $A_{ij}$ is a gain coefficient for each wavelength block, but does not include the inter-pump Raman effect. Since the Raman amplification is actually performed by driving simultaneously the pumping light sources corresponding to a plurality of wavelengths blocks, it is necessary to obtain a gain coefficient considering the inter-pump Raman effect. Therefore, the pumping light powers $P_{P1}$, $P_{P2}$ and $P_{P3}$ of the respective wavelength blocks are obtained in accordance with (2.10) formula shown in the above, to supply the pumping light corresponding to all of the wavelength blocks in the power setting described above, to the optical transmission path 202. Then, the power of the pumping light corresponding to all of the wavelength blocks is changed by 10 mW, for example, and a change amount of the signal light average output power relative to the change amount of the pumping light power, is measured. By this measurement, as shown in the next (2.11) formula, a proportional coefficient $B_{ij}$ (i, j=1, 2, 3) expressing a relationship of the change amounts $\Delta P_{S1}$, $\Delta P_{S2}$ and $\Delta P_{S3}$ of the signal light average output powers to the change amounts $\Delta P_{P1}$, $\Delta P_{P2}$ and $\Delta P_{P3}$ of the pumping light powers, is obtained.

$$\begin{bmatrix} \Delta P_{S1} \\ \Delta P_{S2} \\ \Delta P_{S3} \end{bmatrix} = \begin{bmatrix} B_{11} & B_{12} & B_{13} \\ B_{21} & B_{22} & B_{23} \\ B_{31} & B_{32} & B_{33} \end{bmatrix} \begin{bmatrix} \Delta P_{P1} \\ \Delta P_{P2} \\ \Delta P_{P3} \end{bmatrix} \quad (2.11)$$

In step 216, an inverse matrix of a matrix composed of the proportional coefficient $B_{ij}$ obtained in step 215, is calculated, to lead out a relational expression considering the inter-pump Raman effect as shown in (2.12) formula.

$$\begin{bmatrix} \Delta P_{P1} \\ \Delta P_{P2} \\ \Delta P_{P3} \end{bmatrix} = \begin{bmatrix} B_{11} & B_{12} & B_{13} \\ B_{21} & B_{22} & B_{23} \\ B_{31} & B_{32} & B_{33} \end{bmatrix}^{-1} \begin{bmatrix} \Delta P_{S1} \\ \Delta P_{S2} \\ \Delta P_{S3} \end{bmatrix} \quad (2.12)$$

Figure 19:
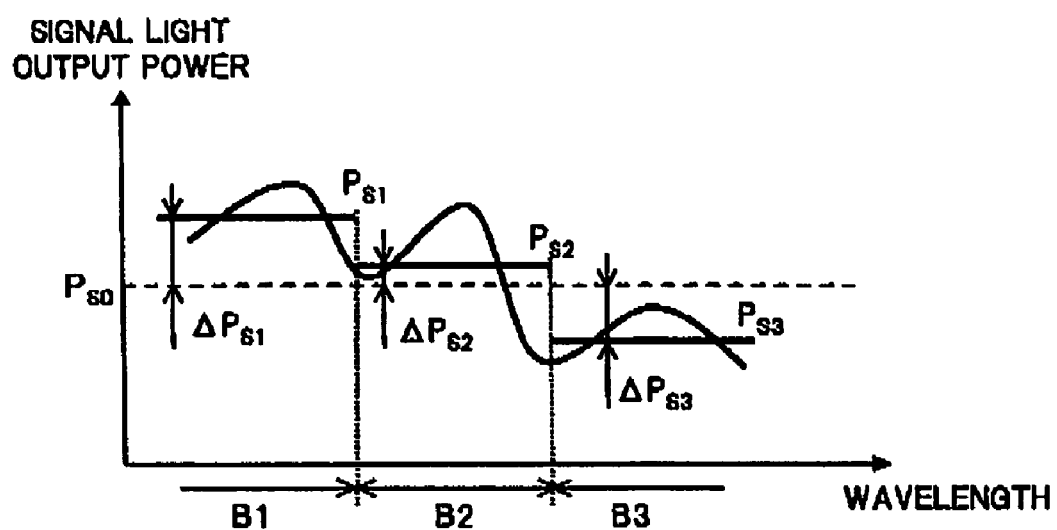
FIG. 19 is a diagram showing a specific example of a wavelength characteristic control of signal light in the embodiment 2-3.

To be specific, the reduction of wavelength characteristic deviation of the Raman amplified WDS signal light means that, as shown in FIG. 19 for example, the signal light average output powers $P_{S1}$, $P_{S2}$ and $P_{S3}$ corresponding to the respective wavelength blocks B1, B2 and B3 approach a desired target power level $P_{S0}$. If differences between the signal light average output powers $P_{S1}$, $P_{S2}$ and $P_{S3}$ and the target power level $P_{S0}$ are $\Delta P_{S1}$, $\Delta P_{S2}$ and $\Delta P_{S3}$ differences of the pumping light power necessary for making up the differences $\Delta P_{S1}$, $\Delta P_{S2}$ and $\Delta P_{S3}$ are $\Delta P_{P1}$, $\Delta P_{P2}$ and $\Delta P_{P3}$.

In step 217, the correction of the setting values of the pumping light powers calculated using (2.12) formula and the measurement of the signal light average output powers $P_{S1}$, $P_{S2}$ and $P_{S3}$ are repeatedly performed until the differences $\Delta P_{P1}$, $\Delta P_{P2}$ and $\Delta P_{P3}$ converge.

By performing the series of processing shown in step 211 to step 217, based on the measurement result using the optical transmission path 202 to be actually used, the setting values of the pumping light powers for obtaining the output signal light Ls having the desired wavelength characteristic are obtained. Such calculation processing of the setting values of the pumping light powers can be executed before starting the operation of the present Raman amplifier, to store the calculation result in a memory or the like. Further, it is also possible that the calculation processing of the setting values of the pumping light powers is executed after starting the operation, and then the wavelength characteristic of the output signal light Ls is controlled sequentially.

As described in the above, according to the Raman amplifier of the embodiment 2-3, before starting the operation, the correction value of the ASS light power is calculated in accordance with the modeling formula for which the coefficient is determined using the optical transmission path 202 to be actually used, and using the correction value, the setting value of the pumping light power corresponding to each wavelength block is calculated. Thus, it becomes possible to execute reliably the control of the wavelength characteristic of the output signal light Ls with excellent accuracy.

Figure 20:
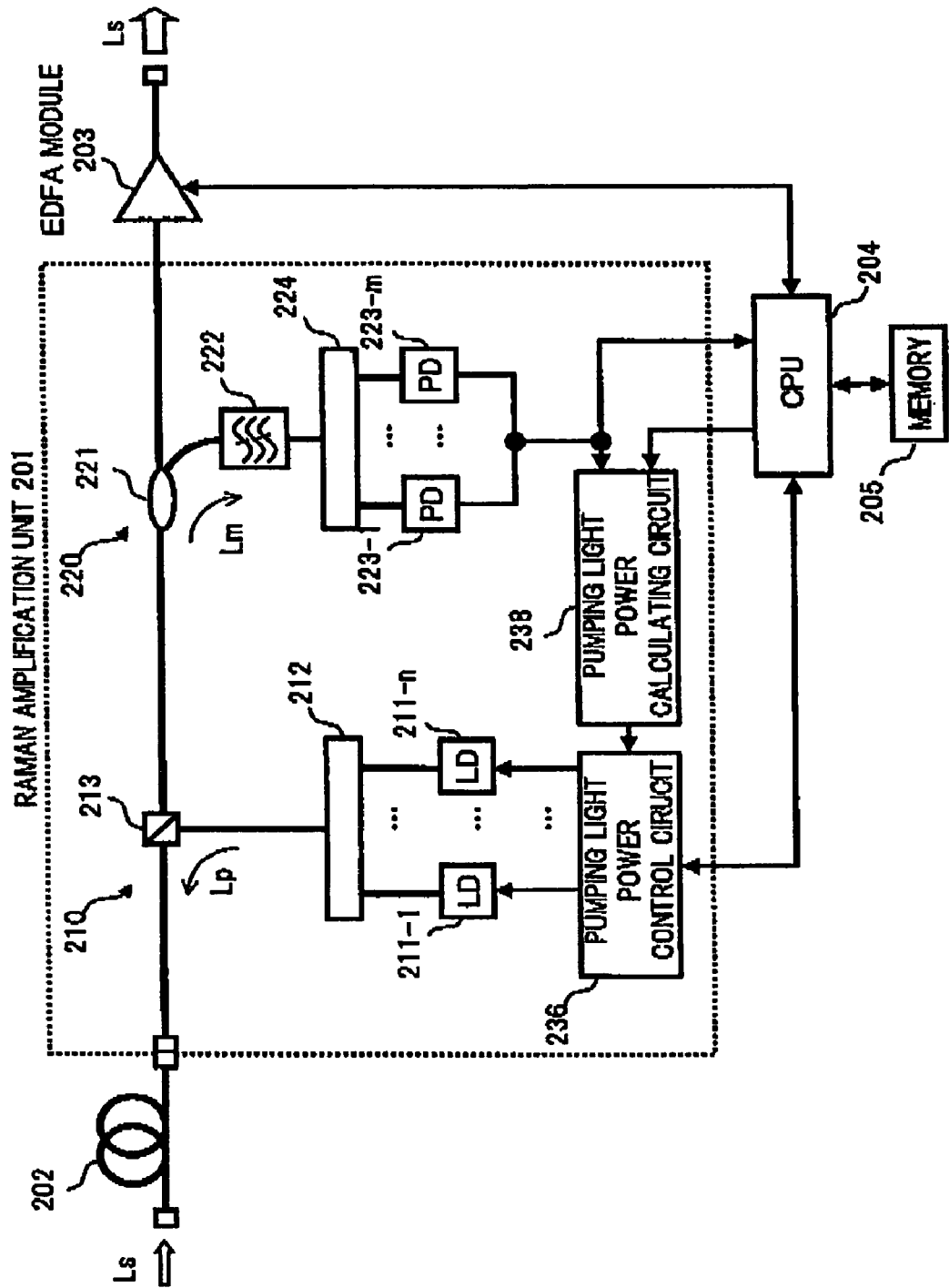
FIG. 20 is a block diagram showing another configuration example related to the embodiment 2-3.

Note, in the embodiment 2-3, there has been shown the configuration example in which the pumping light power calculating circuit 238 is provided instead of the ALC circuit 234 and the shutdown circuit 235. However, it is surely possible that the ALC circuit 234 and the shutdown circuit 235 are provided as well as the pumping light power calculating circuit 238, to perform the respective controls simultaneously. Further, similarly to the embodiment 2-2 shown in FIG. 16, it is also possible to apply the Raman amplifier to the embodiment 2-3 to the optical amplification system in which the Raman amplifier and the EDFA are cascade connected. The apparatus configuration in this case is shown in FIG. 20.

Next, an embodiment 2-4 of the present invention will be described.

Figure 21:
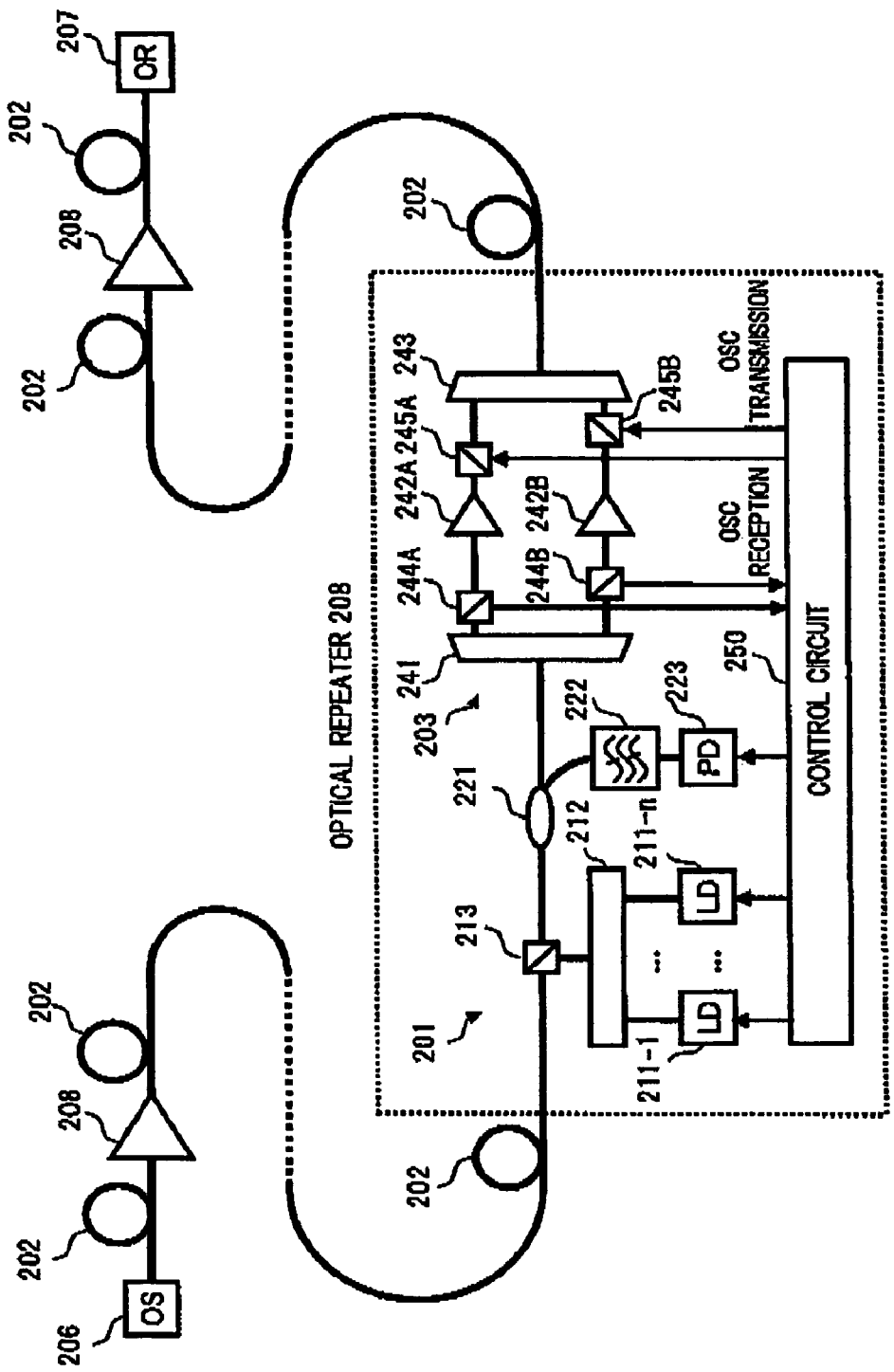
FIG. 21 is a diagram showing a configuration of an optical transmission system according to an embodiment 2-4.

FIG. 21 is a diagram showing a configuration of an optical transmission system according to the embodiment 2-4 of the present invention.

The optical transmission system of FIG. 21 is constituted such that, in a system transmitting a WDM signal light from a signal light transmission apparatus (OS) 206 to a signal light reception apparatus (OR) 207, the above described Raman amplifier, in which the correction processing of the ASS light power is performed, is applied to a plurality of optical repeaters 208, which are arranged required repeating intervals on the optical transmission path 202 connecting the signal light transmission apparatus 206 and the signal light reception apparatus 207.

Here, each optical repeater 208 comprises the cascade connected Raman amplification unit 201 and EDFA module 203 as in the embodiment 2-2. Further, in the latter stage EDFA 203, the WDM signal light is demultiplexed to required wavelength bands by a demultiplexer 241, and the demultiplexed signal lights are amplified by EDFAs 242A and 242B corresponding to the respective wavelength bands, respectively, to be multiplexed by a multiplexer 243. Moreover, demultiplexers 244A and 244B each taking out a subsidiary signal light (OSC) transmitted together with the signal light from the former stage optical repeater 208, are arranged before the EDFAs 242A and 242B corresponding to the respective wavelength bands, and multiplexers 245A and 245B multiplexing the subsidiary signal lights to be transmitted to the latter stage optical repeater 208 are arranged after the EDFAs 242A and 242B. A control circuit 250 is provided with, in addition to the functions corresponding to the CPU 204 and the memory 205 in the embodiment 2-2, a function of receiving the subsidiary signal light from the former stage optical repeater 208, which is taken out by each of the demultiplexers 244A and 244B, and a function of generating a subsidiary signal light to be transmitted to the latter stage optical repeater 208, to output to each of the multiplexer 245A and 245B.

In the optical transmission system as described in the above, utilizing the subsidiary signal light, which is transmitted together with the signal light, for controlling each optical repeater 208, timing of the coefficient creating processing for corrective calculation of the ASS light in the preparation stage before starting the operation and of the setting processing of the pumping light power as described in the above embodiments, is notified to each optical repeater.

As a specific process of field adjustment using the subsidiary signal light, for example, if the assembling of the optical transmission system has been completed and a power source of the entire system is turned on, an operation confirmation is made as to whether or not the subsidiary signal light is normally transmitted between each optical repeater 208. Then, if the operation of the subsidiary signal light is confirmed, the coefficient creating processing for corrective calculation of the ASS light is executed in the first stage optical repeater 208 closest to the signal light transmission apparatus 206. When the coefficient creating processing is completed, the subsidiary signal light for notifying the completion of the coefficient creating processing is transmitted to the latter stage (second stage) optical repeater 208. In the second stage optical repeater 208, when the reception of the subsidiary signal light from the first stage optical repeater 208, is confirmed, the coefficient creating processing for corrective calculation of the ASS light is executed. In the similar manner to the above, in each of the succeeding optical repeaters 208, the coefficient creating processing is executed sequentially. Then, when the coefficient creating processing is completed in all of the optical repeaters 208, signal lights of all wavelengths rises in the signal light transmission apparatus 206, and the WDM signal light obtained by wavelength division multiplexing the respective signal lights is transmitted to the optical transmission path 202.

When the start of transmission of WDM signal light from the signal light transmission apparatus 206 to the optical transmission path 202 is notified to the first stage optical repeater 208 by means of the subsidiary signal light, in the first optical repeater 208, the calculation processing of the setting value of each pumping light power is executed. Then, when the pumping light power setting value is calculated, the Raman amplification unit 201, and the EDFAs 242A and 242B of the respective wavelength bands in the first stage optical repeater 208 are started up. When the start up of the first stage optical repeater 208 is completed, the subsidiary signal light notifying the completion of the start up is transmitted to the latter stage (second stage) optical repeater 208. Also, in the second stage optical repeater 208 received the subsidiary signal light, the calculation processing of the pumping light power setting value and the start up of the optical amplifier, are executed. In the similar manner to the above, in each of the succeeding optical repeaters 208, the calculation processing of the pumping light power setting value and the start up of the optical amplifier, are executed sequentially. Then, when the calculation processing of the pumping light power settling value has been completed in all of the optical repeaters 208, the field adjustment before starting the operation is ended.

As described in the above, according to the optical transmission system of the embodiment 2-4, utilizing the subsidiary signal light, the timing of executing the field adjustment processing before starting the operation is notified among the plurality of optical repeaters 208 arranged on the optical transmission path 202 between the signal light transmission apparatus 206 and the signal light reception apparatus 207. Thus, it becomes possible to perform smoothly the field adjustment in the entire optical Note, in the embodiment 2-4, there has been shown the example of the optical repeater provided with the Raman amplifier and the EDFA. However, the present invention is not limited thereto, and can be applied to such an optical repeater constituted to amplify a WDM signal only by a Raman amplifier. Further, in the above example, in the state where the WDM signal light is demultiplexed to the respective wavelength bands by the EDFA module 203 in the optical repeater 208, the reception of the subsidiary signal light from the former stage optical repeater 208 and the transmission of the subsidiary signal light to the latter stage optical repeater 208 are performed. However, the reception and transmission of the subsidiary signal light can be performed at arbitrary positions in the optical repeater 28.

Next, an embodiment 3 of the present invention will be described.

Figure 22:
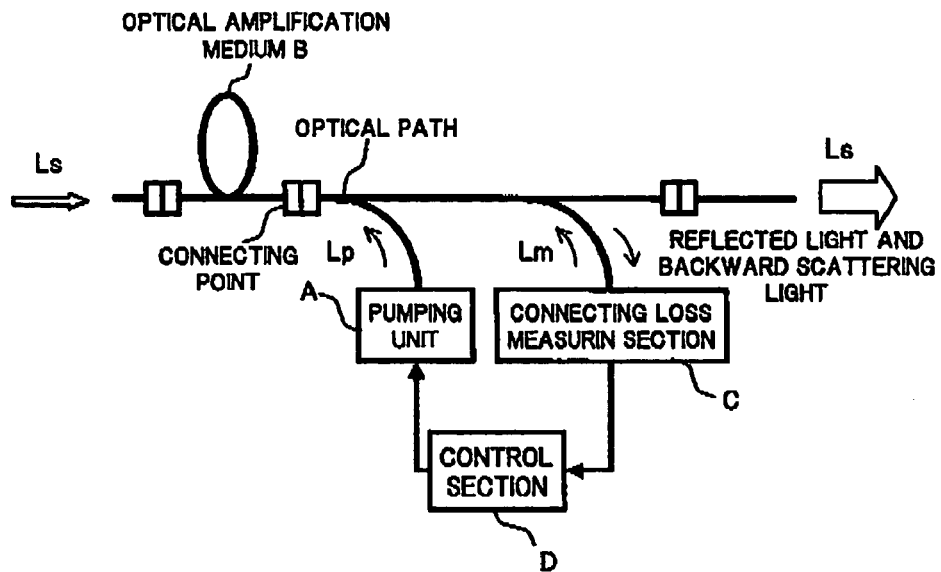
FIG. 22 is a block diagram showing a basic configuration of an optical amplifier according to an embodiment 3 of the present invention.

FIG. 22 is a block diagram showing a basic configuration of an optical amplifier provided with a connecting loss detecting function according to the embodiment 3 of the present invention.

As shown in FIG. 22, according to the basic configuration of the embodiment 3, the optical amplifier supplying a pumping light Lp generated in a pumping unit A to an optical amplification medium B to amplify a signal light Ls, comprises: a connecting loss measuring section C that inputs the measuring light Lm, which is different from the signal light Ls, to an optical path between the pumping unit A and the optical amplification medium B, and based on a reflected light and a backward scattering light of the measuring light Lm, which are generated in the optical path, measures connecting losses at one or more connecting points existing on the optical path; and a control section D that controls the supply condition of the pumping light Lp by the pumping unit A according to the connecting losses measured by the connecting loss measuring section C.

Figure 23:
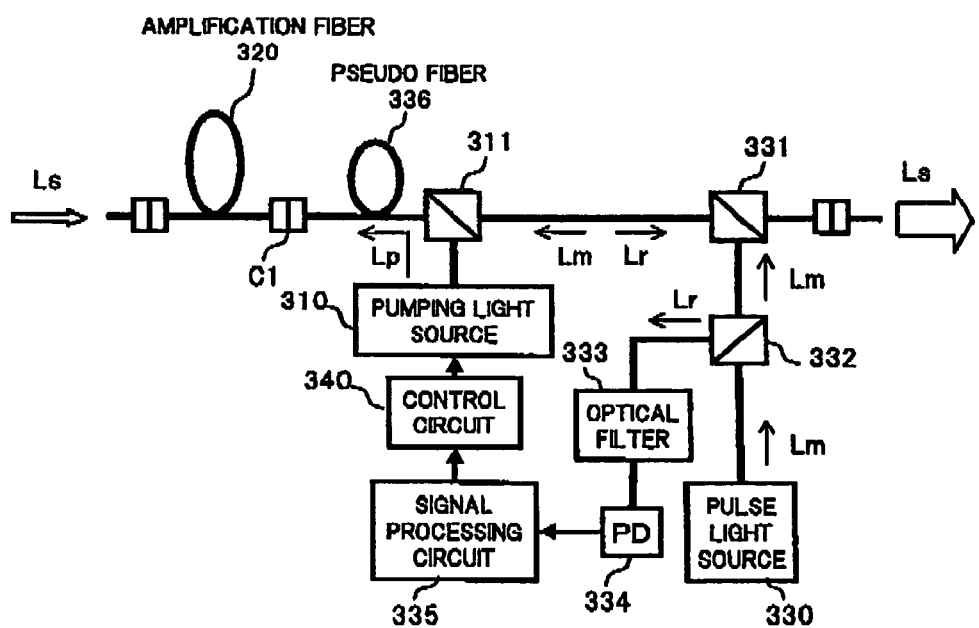
FIG. 23 is a block diagram showing a specific example of an optical amplifier according to an embodiment 3-1.

FIG. 23 is a block diagram showing a specific example of the basic configuration of FIG. 22. In the specific example of FIG. 23, an optical amplifier of an embodiment 3-1 comprises: a pumping light source 310 and a WDM coupler, as the pumping unit A in the basic configuration of FIG. 22; an amplification fiber 320 as the optical amplification medium B in the basic configuration of FIG. 22; a pulse light source 330, a WDM coupler 331, an optical 333, a light receiving element (PD) 334, a signal processing circuit 335 and a pseudo fiber 336, as the connecting loss measuring section C in the basic configuration of FIG. 22; and a control circuit 340 as the control section D in the basic configuration of FIG. 22.

The pumping light source 310 generates the pumping light Lp capable of Raman amplifying the signal light Ls being propagated through the amplification fiber 320, to output it to the WDM coupler 311. A wavelength of the pumping light source 310 is set so as to correspond to the wavelength band of the signal light Ls. To be specs the central wavelength of the pumping light Lp is set within a range of 1450 nm band, which is shifted by about 100 nm to a shorter wavelength side relative to the signal light Ls of 1550 nm band, for example. Note, the respective wavelengths of the signal light Ls and the pumping light Lp in the present invention are not limited to the above, and it is possible to apply the wavelength setting in a known Raman amplifier.

The WDM coupler 311 supplies the pumping light Lp output from the pumping light source 310 towards the amplification fiber 320. Here, the pumping light Lp is propagated through an optical path connected from the WDM coupler 311 up to the amplification fiber 320 via the pseudo fiber 336 (hereunder, to be referred to as an optical path to be measured, in a direction opposite to the propagation direction of the signal light Ls. Further, the WDM coupler 311 transmits the signal light Ls sent from the amplification fiber 320 via the pseudo fiber 336, to the WDM coupler 331 on an output side, and also transmits a measuring light (optical pulse signal) sent from the WDM coupler side, to the amplification fiber 320 side. Note, three ports of the WDM coupler 311 are fusion connected with the optical paths.

The amplification fiber 320 is connected at one end thereof with one end of the pseudo fiber 336 via an optical connector C1 of PC connection type, and input with the signal light Ls via the other end thereof. As the amplification fiber 320, for example, there is used a transmission fiber such as a single mode fiber or the like, a Raman amplification fiber or the like with a high nonlinear coefficient.

Figure 24:
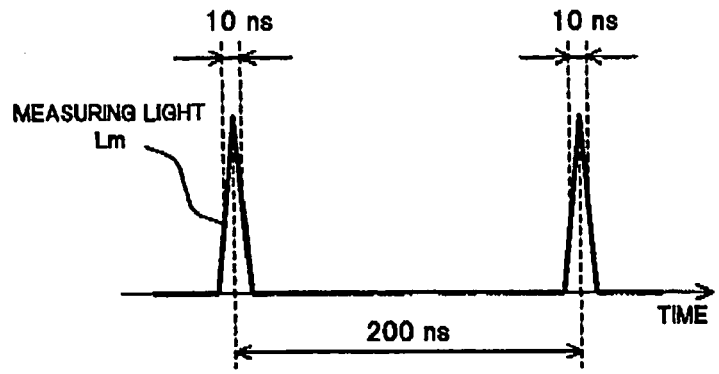
FIG. 24 is a diagram showing an example of waveform of a measuring light in the embodiment 3-1.

The pulse light source 330 is for generating the measuring light Lm, which is used for measuring the loss distribution in a longitudinal direction of the optical path to be measured, utilizing the optical time domain reflectometry (OTDR), to output the optical pulse signal as shown in FIG. 24, for example, as the measuring light Lm. Note, in FIG. 24, there is shown an example in which the pulse width of the optical pulse signal is set to 10 ns, and the pulse interval thereof is set to 200 ns. However, the setting of the optical pulse signal is not limited thereto, and appropriate values may be set according to a distance of the optical path to be measured (in the above setting example, 20 m is assumed). Further, a wavelength of the optical pulse signal is preferable to be set in a band different from the wavelength bands of the signal light Ls and the pumping light Lp, so as to enable the distinction of the optical pulse signal from the signal light Ls and the pumping light Lp. Specifically, for example, it is possible to set the wavelength of the optical pulse signal to 1410 nm or the like, relative to the wavelength setting of the signal light Ls and the pumping light Lp.

Figure 25:
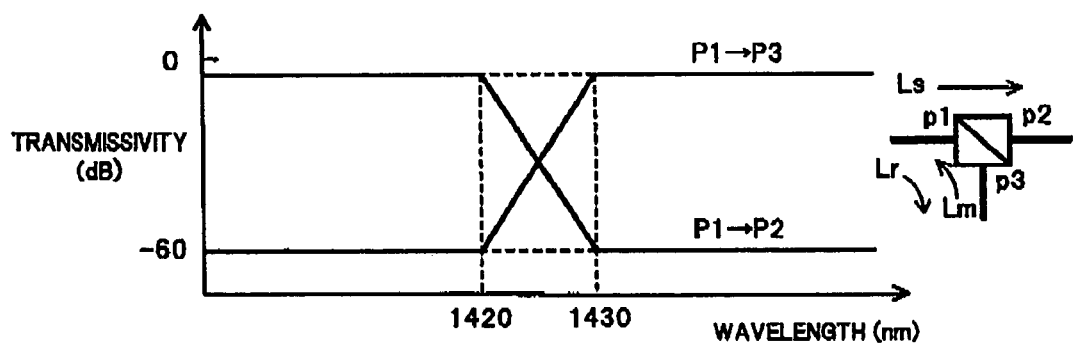
FIG. 25 is a diagram showing an example of wavelength transmission characteristic of a WDM coupler to be used for multiplexing the measuring light in the embodiment 3-1.

The WDM coupler 331 has a wavelength transmission characteristic among ports p1 to p3 as shown in FIG. 25, for example, and transmits the measuring light Lm sent to the port p3 from the pulse light source 330 via a branching coupler 332, to the port 1 connected up to the WDM coupler 311 side. The WDM coupler 331 is input with, at the port p1, the signal light Ls sent via the WDM coupler from the optical path to be measured, and the reflected light and backward scattering light (hereunder, to be described as a reflected scattering light Lr) of the measuring light Lm output from the port 1 to be propagated towards the optical path to be measured, to output the signal light Ls to the port p2, and the reflected scattering light Lr to the port p3.

The branching coupler 332 branches the reflected scattering light Lr output from the port p3 of the WDM coupler 331, to send the branched light to the optical filter 333. The optical filter 333 is a narrow band bandpass filter having a transmission central wavelength approximately coincident with 1410 nm or the like corresponding to a wavelength of the reflected scattering light Lr, that is, the wavelength of the optical pulse signal. In this optical filter 333, a noise light other than the reflected scattering light Lr contained in the light branched by the branching coupler 332, is eliminated. The light receiving element 334 receives the reflected scattering light Lr passed through the optical filter 334 to photo-electrically convert it, and outputs a signal the level of which is changed according to the power of the reflected scattering light Lr, to the signal processing circuit 335.

The signal processing circuit 335 obtains the loss distribution in the longitudinal direction of the optical path to be measured, based on the output signal from the light receiving element 334, and detects a connecting loss at a connecting point existing on the optical path to be measured, to output the detection result to the control circuit 340.

The pseudo fiber 336 is an optical fiber with required length disposed for narrowing a region (dead zone) in which the loss distribution is unable to be measured in a measuring system utilizing the optical time domain reflectometry, and is arranged between the WDM coupler 311 and the amplification fiber 320, here. Note, the optical time domain reflectometry and the dead zone will be described later.

The control circuit 340 judges, according to the output signal from the signal processing circuit 335, whether or not the connecting loss at the connecting point is a previously set threshold (for example, 1.0 dB or the like) or above, and if the connecting loss is the threshold or above, controls a drive condition of the pumping light source 310 so that the supply of the pumping light Lp is stopped or reduced to a predetermined power level or less.

Here, the summary of the optical time domain reflectometry (OTDR) is described.

Figure 26:
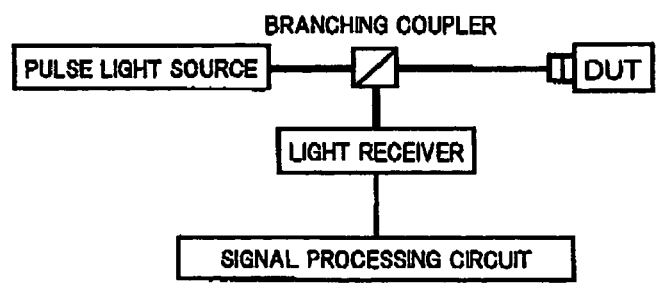
FIG. 26 is a diagram showing an example of a typical OTDR measuring system.

The OTDR is widely utilized as one method for measuring the loss distribution in a longitudinal direction of an optical fiber. FIG. 26 shows an example of a typical OTDR measuring system. In this OTDR measuring system, an optical pulse signal generated in a pulse light source is input into a device to be measured (DUT), and a reflected scattering light (a reflected light and a backward scattering light) of the optical pulse signal is branched by a branching coupler to be photo-electrically converted. In a signal processing circuit, a reflection amount generated in the device to be measured is detected according to an output signal from a light receiving element, and also a position of reflecting point is detected based on a time delay of the reflected scattering light to the pulse signal. As a result, the loss distribution in the device to be measured, is measured.

Figure 42:
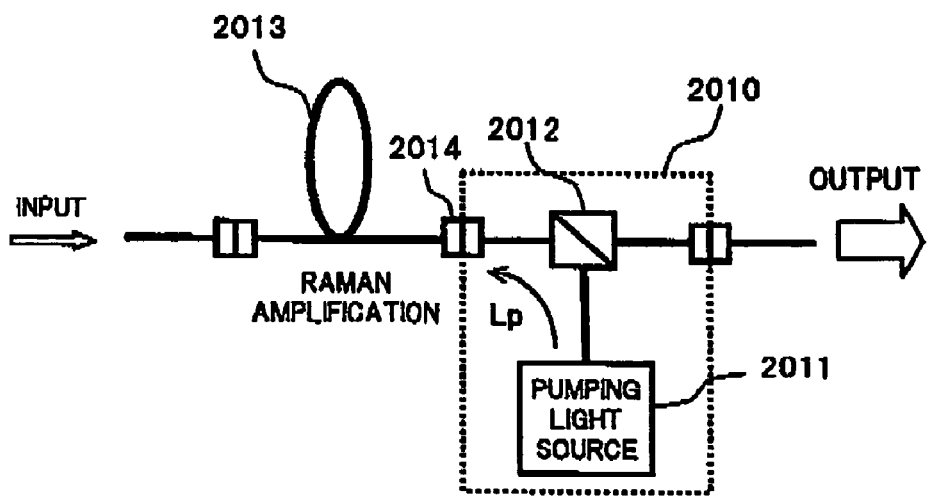
FIG. 42 is a block diagram showing a configuration example of a conventional Raman amplifier.

For example, consideration is made on the case where the loss distribution is measured by applying the OTDR measuring system as described above to the typical Raman amplifier as shown in FIG. 42, a measurement result as shown in (B) of FIG. 27 can be obtained for configuration of measuring system shown in (A) of FIG. 27. Note, it is assumed here that a pumping unit 410 and an amplification fiber 413 are PC connected via two optical connectors 414A and 414B.

To be specific, in the measurement result of (B) of FIG. 27, heights of respective peaks indicated respective reflection amounts in an optical connector 500A, a WDM coupler 412, and the optical connectors 414A and 414B, which are arranged sequentially in a longitudinal direction of an optical fiber connected with the OTDR measuring system 600. Further, an inclination of the reflection amounts represents a Rayleigh scattering coefficient of a fiber to be measured. When such loss distribution is obtained, the connecting loss in each of the optical connectors 414A and 414B positioned at a measuring point encircled by a dotted line in (A) of FIG. 27 can be led out based on a difference between reflection amounts before and after the corresponding peak in (B) of FIG. 27. In detail, the difference between the reflection amounts before and after the peak corresponds to twice the connecting loss in each of the optical connectors 414A and 414B.

In the measurement of loss distribution utilizing the OTDR as described above, there is a possibility that saturation occurs in an electrical system if the large reflection is caused in the vicinity of an input end of the fiber to be measured. Therefore, a dead zone where the measurement of loss distribution becomes unable is generated in such a region. The length of this dead zone is determined according to the pulse width of the optical pulse signal. For example, if the pulse width is set to 10 ns or less, the dead zone has the length of about several meters. In order to avoid that the measurement of loss distribution becomes unable in a desired measuring point, due to the generation of such a dead zone, in the optical amplifier of the embodiment 3-1, the pseudo fiber 33 is inserted between the WDM coupler 311 and the amplification fiber 320.

Next an operation of the optical amplifier according to the embodiment 3-1 will be described referring to a flowchart of FIG. 28.

Figure 28:
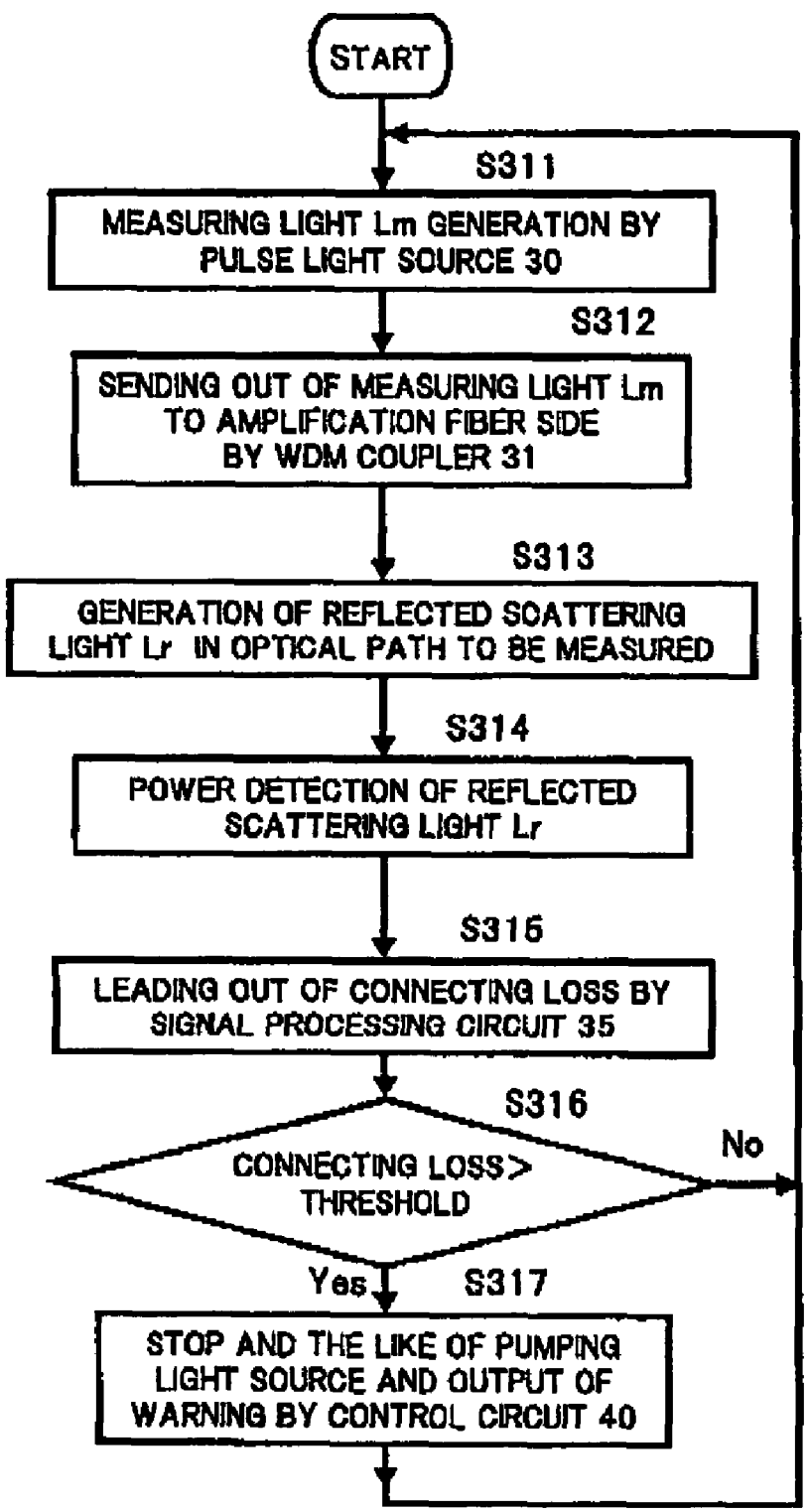
FIG. 28 is a flowchart for explaining an operation of the embodiment 3-1.

When the present optical amplifier is started up at the initial installation time or the operation starting time, the optical pulse signal of waveform as shown in FIG. 24 is generated in the pulse light source 330, to be output as the measuring light Lm (S311 in FIG. 28). The measuring light Lm passes through the branching coupler 332 to be input to the WDM coupler 331, and sent to the optical path to be measured, which is and up to the amplification fiber 320 (S312). The measuring light Lm is propagated through the optical path to be measured, towards the amplification fiber 320, so that the reflected scattering light Lr composed of the reflected light and backward scattering light of the measuring light Lm, is generated in the optical path to be measured (S313).

The reflected scattering light Lr is taken out by the WDM coupler 331 and the branching coupler 332, to be sent to the optical filter 333. The reflected scattering light passed through the optical filter 333 is received by the light receiving element 334, and the power thereof is detected (S314). The signal indicating the detection result in the light receiving element 334, is set to the signal processing circuit 335, to be subjected to the processing in accordance with the OTDR. Thus, the loss distribution in the longitudinal direction of the optical path to be measured is obtained and the connecting loss in the connecting point (in the configuration of FIG. 23, the optical connector C1) existing on the optical path to be measured is led out (S315).

The connecting loss led out by the signal processing circuit 335 is transmitted to the control circuit 340, where it is judged whether or not the connecting loss reaches the previously set threshold or above (S316). In the case where the connecting loss is less than the threshold, it is judged that a good connection condition of the optical connector C1 is realized, and the supply of the pumping light Lp from the pumping light source 340 to the amplification fiber 320 is started at the power level in the normal operation time. On the other hand, in the case where the connecting loss reaches the threshold or above, it is judged that the optical connector C1 is in an insufficient connection condition where the breakage or the like of the optical fiber due to the FF phenomenon may occur, the supply of the pumping light Lp is stopped or reduced to the predetermined power level or lower, and also the warning indicating that the connection condition of the opt connector C1 is abnormal is output (S317).

As described above, according to the optical amplifier of the embodiment 3-1, the connection condition of the optical connector C1 existing between the pumping unit and the amplification fiber is supervised by the OTDR measuring system using the measuring light Lm different from the signal light Ls. Thus, it becomes possible to perform not only the detection of the detachment of the optical connector as in the conventional technique but also the accurate detection of the abnormality in the connection condition of the optical connector C1, which leads the breakage of the optical fiber due to the FF phenomenon, thereby reliably enabling the control of the power of the pumping light Lp passing through the optical connector C1.

Next, an embodiment 3-2 of the present invention will be described.

Figure 29:
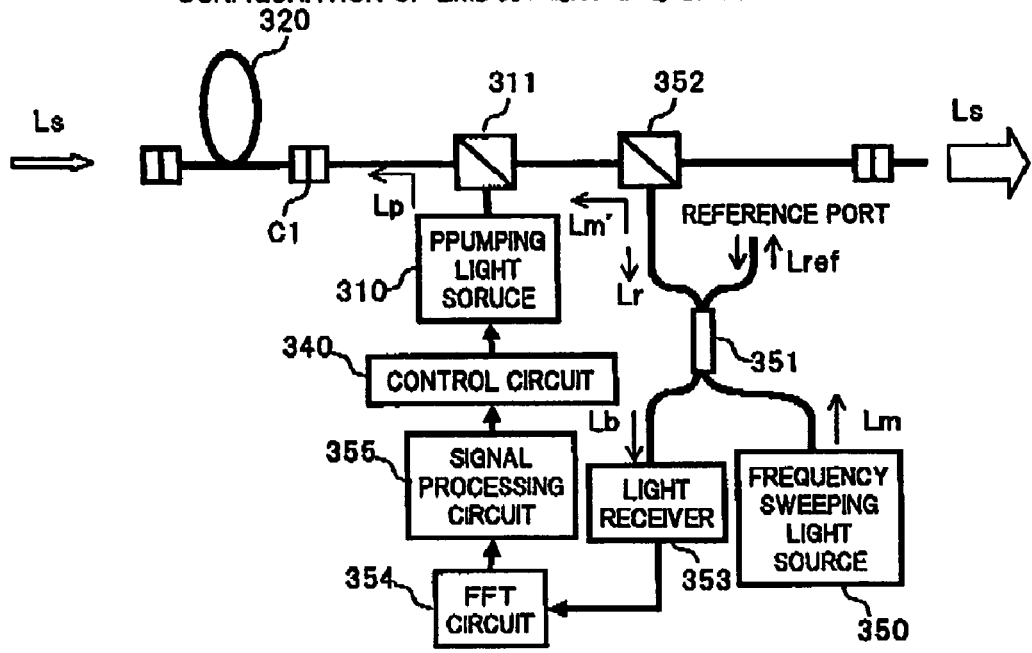
FIG. 29 is a block diagram showing a configuration of an optical amplifier according to an embodiment 3 of the present invention.

FIG. 29 is a block diagram showing a configuration of an optical amplifier provided with a connecting loss detecting function of the embodiment 3-2.

In FIG. 29, the optical amplifier of the present embodiment is constituted such that a configuration utilizing the optical frequency domain reflectometry (OFDR) is adopted as the connecting measuring section C in the basic configuration shown in FIG. 22. To be specific, the connecting loss is measured by a measuring system comprising a frequency sweeping light source 350, a branching coupler 351, a WDM coupler 352, a light receiver 353, an FFT circuit 354 and a signal processing circuit 355. Note, the configurations corresponding the pumping unit A, the optical amplification medium C and the control section D in the basic configuration of FIG. 22 are the same as those in the embodiment 3-1, and therefore the descriptions thereof are omitted here.

The frequency sweeping light source 350 is for generating a measuring light Lm of which frequency is linearly swept in temporal. It is possible to use, for example, a three electrodes DFB laser, as the frequency sweeping light source 350. In the case where the three electrodes DFB laser is used, a modulated voltage is applied to a center electrode, so that the frequency of the measuring light Lm can be changed linearly to time. The sweeping width of the frequency is a parameter for determining the spatial resolution in the measurement, and for example, in order to obtain the spatial resolution of 10 cm, it is necessary to sweep the frequency at 1 GHz. A wavelength of the measuring light Lm output from the frequency sweeping light source 350 is set in a band different from the wavelength bands of the signal light Ls and the pumping light Lp, so as to enable the distraction of the measuring light Lm from the signal light Ls and the pumping light Lp. Specifically, the wavelength of the output measuring light Lm can be set to 1410 nm band or the like, relative to the signal light Ls of 1550 nm band and the pumping light Lp of 1450 nm band, for example.

The branching coupler 351 branches the measuring light Lm output from the frequency sweeping light source 350 into two, to output a measuring light Lm to a port connected up to the WDM coupler 352, and a reference light Lref to a reference port (open port). Further, the branching coupler 351 multiplexes a reflected scattering light Lr, composed of a reflected light and a backward scattering light of the measuring light Lm', with a reflected light of the reference light Lref, to generate a beat signal light Lb, and outputs the beat signal light Lb to a port connected up to the light receiver 353.

The WDM coupler 352 has a wavelength transmission characteristic the same as that of the WDM coupler 331 used in the embodiment 3-1 (refer to FIG. 25), and transmits the measuring light Lm' sent from the branching coupler 351 to the WDM coupler 311 side, and also demultiplexes the reflected scattering light Lr of the measuring light Lm', being propagated through the optical path to be measured, from the signal light Ls being propagated in the same direction, to output the demultiplexed light to the branching coupler 351 side.

The light receiver 353 receives the beat signal light Lb sent from the branching coupler 351, to D a photo-electrically converted electric signal to the FFT circuit 354. Note, the light receiver 353 may be provided with an optical filter eliminating a noise light other than the beat signal light Lb, similarly to the embodiment 3-1.

The FFT circuit 354 is for performing the high speed Fourier transform on the output signal from the light receiver 353, to output the calculation result to the signal processing circuit 355. The signal processing circuit 355 obtains the loss distribution in the longitudinal direction of the optical path to be measured, based on the output signal from the FFT circuit 354, and detects the connecting loss at the connecting point existing on the optical path to be measured, to output a signal indicating the detection result to the control circuit 340.

Here, the summary of the optical frequency domain reflectometry (OFDR) will be described.

The OFDR is known as one method for measuring the loss distribution in a longitudinal direction of an optical fiber, as well as the OTDR described in the embodiment 3-1 (refer to M. Wegmuller et al., "Distributed Gain Measurements in Er-Doped Fibers with High Resolution and Accuracy Using an Optical Frequency Domain Reflectometer", Journal of Lightwave Technology, Vol. 18, No. 12, pp.2127-2132, December, 2000; and J. P. von der Weld et al., "On the Characterization of Optical Fiber Network Components with Optical Frequency Domain Reflectometry", Journal of Lightwave Technology, Vol. 15 No. 17, pp.1131-1141, July, 1997).

In this OFDR, differently from the OTDR described above, a dead zone is not generated, and therefore, it is possible to measure the loss distribution in the vicinity of an input end of a fiber to be measured. However, in this OFDR, since the coherency of a reflected light should be kept, a measuring distance becomes shorter to about several tens meters, compared with the OTDR capable of measuring over the maximum several hundreds kilometers.

Figure 30:
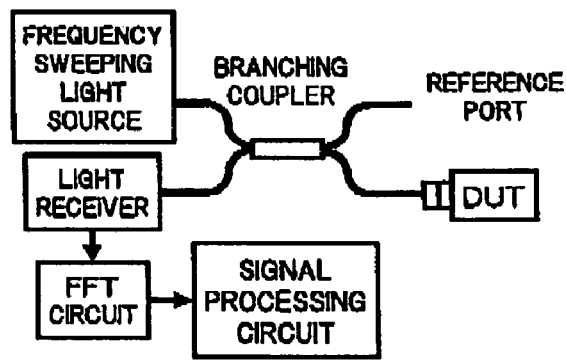
FIG. 30 is a diagram showing an example of a typical OFDR measuring system.

FIG. 30 is an example of a known OFDR measuring system. In this OFDR measuring system, an out light from a frequency sweeping light source is branched by a branching coupler to a measuring light and a reference light, and then, the measuring light is input to a device to be measured (DUR) and also the reference light is given to a reference port. Then, respective reflected lights of the measuring light and the reference light are multiplexed by the branching coupler to generate a beat signal light and the beat signal light is photo-electrically converted by a light receiver. At this time, a frequency of the converted beat signal light is proportional to an optical path difference in respective reflecting points of the measuring light and the reference light. Therefore, by performing the high speed Fourier transform on the intensity of an output signal from the light receiver by an FFT circuit, the loss distribution in the device to be measured, is measured.

In the case where the loss distribution in the typical Raman amplifier shown in FIG. 42 is measured by applying the OFDR measuring system, a measurement result similar to that shown in FIG. 27 can be obtained, and based on the loss distribution, it becomes possible to lead out a connecting loss in an optical connector positioned on a measuring point.

Next, an operation of the optical amplifier according to the embodiment 3-2 will be described referring to a flowchart of FIG. 31.

Figure 31:
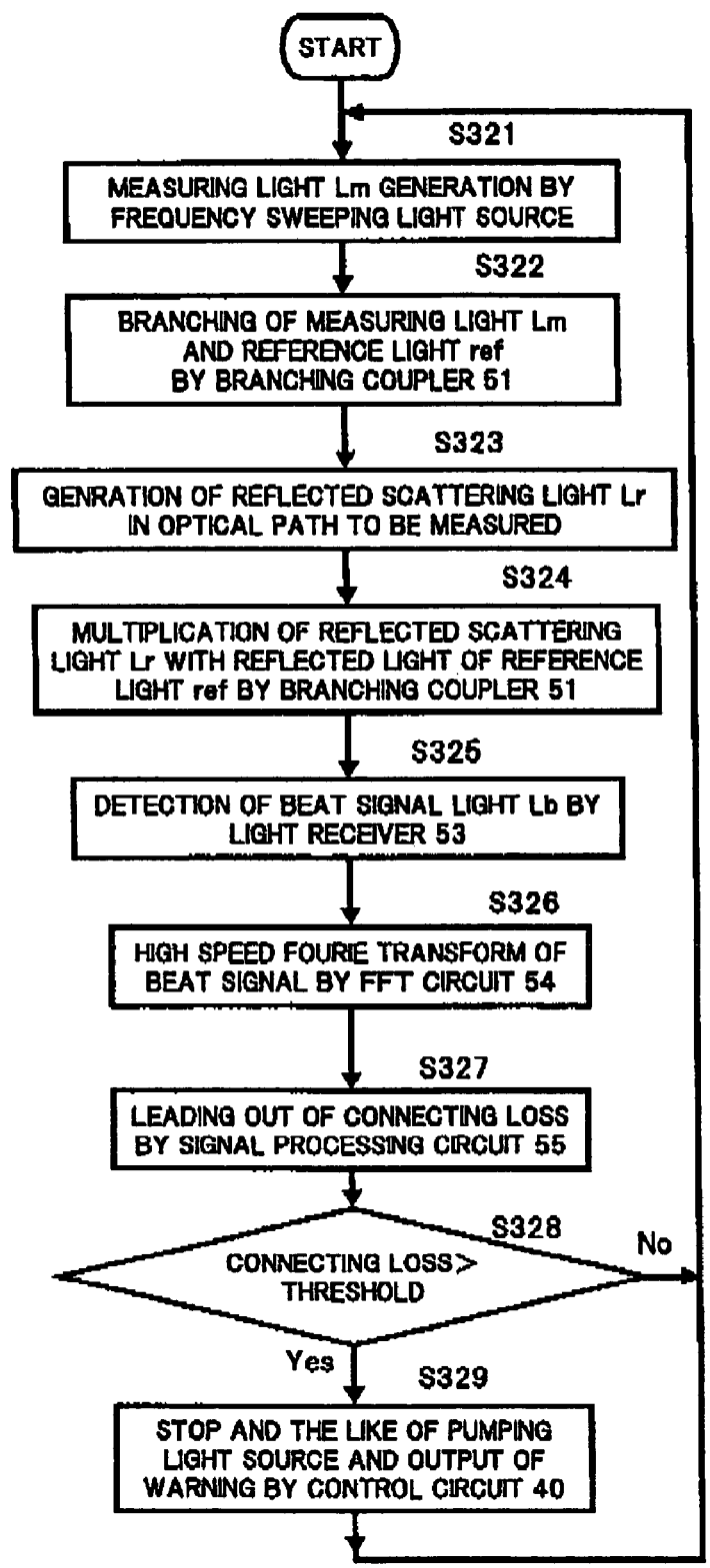
FIG. 31 is a flowchart for explaining an operation of the embodiment 2.

When the present optical amplifier is started up at the initial installation time or at the operation starting time, the measuring light Lm, the frequency of which is swept in the sweeping light source 350, is generated, to be output to the branching coupler 351 (321 in FIG. 31). The measuring light Lm' is branched by the branching coupler 351 to the measuring light Lm' and the reference light Lref, and then, the measuring light Lm' is sent via the WDM coupler 352 to the optical path to be measured, which is connected up to the amplification fiber 320, an the reference light Lref is sent to the reference port (S322). Then, the measuring light Lm' is propagated through the optical path to be measured, towards the amplification fiber 320, so that the reflected scattering light Lr composed of the reflected light and backward ring light of the measuring light Lm' is generated in the optical Path to be measured (S323). Further, simultaneously with this, the reference light Lref is fed by an open end of the reference port to be returned to the branching coupler 351.

The reflected scattering light Lr of the measuring light Lm' and the reflected light of the reference light Lref are multiplexed in the branching coupler 351, to generate the beat signal light Lb (S324). The beat signal light Lb is sent to the light receiver 353 to be photo-electrically converted (S325), and further, the output signal of the light receiver is sent to the FFT circuit 354 to be subjected to the high speed Fourier transform (S326). The signal indicating the calculation result in the FFT circuit 354 is sent to the signal processing circuit 355 to be subjected to the required processing, and the loss distribution in the longitudinal direction of the optical part to be measured is obtained thereby leading out the connecting loss in the optical connector C1 existing on the optical path to be measured (S327).

The connecting loss led out by the signal processing circuit 355 is transmitted to the control circuit 40, where it is judged whether or not the connecting loss readies the previously set threshold or above (S328). If the connecting loss is less than the threshold, the supply of the pumping light Lp at the power level in the normal operation is started, while if the connecting loss reaches the threshold or above, the supply of the pumping light Lp is stopped or reduced to the predetermined power level or less, a also the warning indicating the abnormality of connection condition of the optical connector C1 is output (S329).

As described above, according to the optical amplifier of the embodiment 3-2, even in the case where the connection condition of the optical connector C1 existing between the pumping unit and the amplification fiber is supervised by the OFDR measuring system, it is possible to obtain an effect similar to that in the embodiment 3-1. Further, in addition to the above effect comparing with the case where the OTDR measuring system is applied, since the dead zone is not generated, there is no longer necessary to provide the pseudo fiber, and also a wide dynamic range and the high spatial resolution can be obtained. Therefore, the connecting loss can be measured with higher and thus it becomes possible to reliably control the pumping light source.

Next, an embodiment 3-3 of the present invention will be described.

Figure 32:
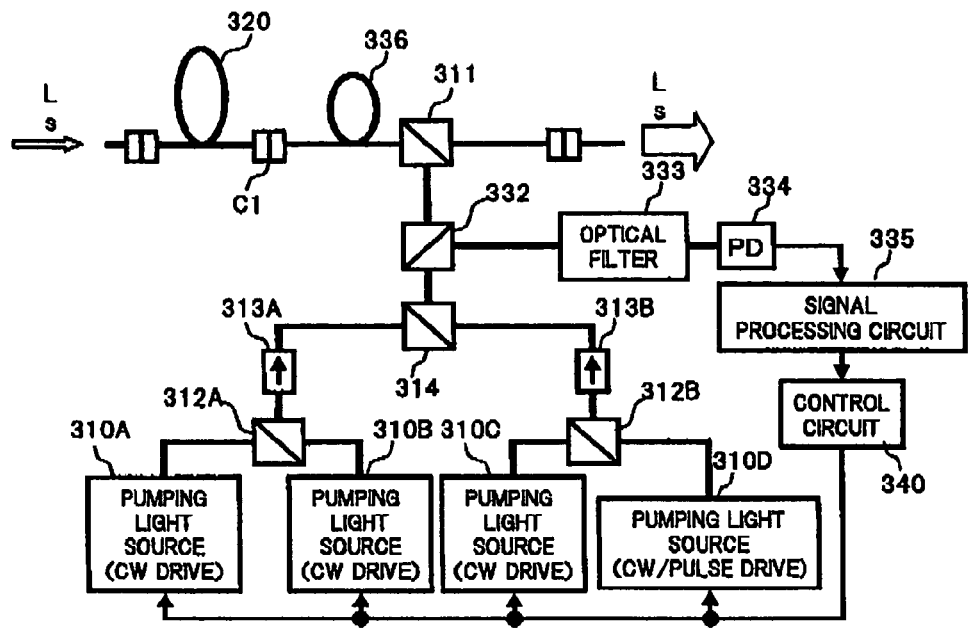
FIG. 32 is a block diagram showing a configuration of an optical amplifier according to an embodiment 3-3 of the present invention.

FIG. 32 is a block diagram showing a configuration of an optical amplifier provided with a connecting loss detecting function in the embodiment 3-3.

In FIG. 32, the optical amplifier of the embodiment 3-3 is an application example in which, for example, in the optical amplifier of the embodiment 3-1, a Raman amplification pumping light source is utilized as the pulse light source for generating the measuring light Lm. To be specific, the present optical amplifier includes: as the pumping unit A shown in FIG. 22, a plurality (here, for example, four) of pumping light sources 310A, 310B, 310 and 310D; a polarization beam multiplexer 312A multiplexing pumping lights output from the pumping light sources 310A and 310B, and a polarization beam multiplexer 312B multiplexing pumping lights output from the pumping light sources 310C and 310D; a WDM coupler 314 further multiplexing respective pumping lights sent from the polarization beam multiplexers 312A and 312B via optical isolators 313A and 313B, respectively; and the WDM coupler 311 giving the pumping light Lp sent via the branching coupler 332 from the WDM coupler 314, to the optical path to be measured. This optical amplifier pulse drives one of the four pumping light sources 310A to 310D (here, the pumping light source 310D), to generate the measuring light Lm of pulse waveform as shown in FIG. 24, thereby measuring the connecting loss by the OTDR method.

By measuring the connecting loss utilizing the pumping light source 310D as described above, the wavelength of the measuring light Lm coincides with the pumping light wavelength. Therefore, as the branching coupler 332 and the optical filter 333, which extract the reflected light Lr of the measuring light Lm, the ones having characteristics corresponding to the pumping light wavelength are used. Note, the components other than the above are similar to those in the embodiment 3-1, and therefore the descriptions thereof are omitted here.

In the optical amplifier of the above configuration, at the initial installation time or the operation starting time, the pumping light source 310D among the respective pumping light sources 310A to 310D which are continuously driven (CW drive) at the normal operation time, is pulse driven, and the other pumping light sources 310A to 310D are stopped. At this time, the measuring light Lm output from the pumping light source 310D through the polarization beam multiplexer 312B, the optical isolator 313B, the WDM coupler 314, the branching coupler 332 and the WDM coupler 311, in this order, to be sent to the optical path to be measured. Then, the reflected scattering light Lr of the measuring light Lm, generated in the optical path to be measured, Is received by the light receiving element 334 via the WDM coupler 311, the branching coupler 332 and the optical filter 333, and the electric signal which is changed according to the power of the reflected scattering light Lr is sent to the signal processing circuit 335.

In the signal processing circuit 335, similarly to the embodiment 3-1, based on the output light from the light receiving element 334, the loss distribution in the longitudinal direction of the optical path to be measured is obtained, the connecting loss of the optical connector C1 existing on the optical path to be measured, is led out, and the result thereof is transmitted to the control circuit 340. In the control circuit 340, if the connecting loss of the optical connector C1 reaches the threshold or above, th pumping light sources 310A to 310D are stopped or the like, and also the warning notifying the abnormality in connection is output. On the other hand, if the connecting loss is less than the threshold, the pumping light source 310D that has been pulse driven, is switched to the CW drive, and at the same time, the CW drive of each of the other pumping light sources 310A to 310C is started. Thus, the output lights from the respective pumping light sources 310A to 310D that are CW driven, are multiplexed by the polarization beam multiplexers 312A and 312B respectively, and further, by the WDM coupler, so that the pumping light Lp set at the power level in the normal operation time, is supplied to the amplification fiber 320 via the WDM coupler 311 and the pseudo fiber 336.

According to the optical amplifier of the embodiment 3-3, the measurement of the connecting loss of the optical connector C1 at the initial installation time or the operation starting time, is performed utilizing the Raman amplification pumping light source 310D. Thus, differently from the embodiment 3-1, it becomes unnecessary to provide a separate pulse light source for the OTDR, thereby enabling the simplification of the configuration and the low cost.

In the above embodiment 3-3, there has been shown, as an example, the configuration using the four pumping light sources 310A to 310D. However, even in the case where only one pumping light source is used, by switching the drive condition of to pumping light source between the CW drive and the pulse drive, the measurement of the connecting loss utilizing the pumping light source can be performed. Further, it is apparent that the optical amplifier of the embodiment 3-3 can be applied to the case where two or three pumping light sources, or five or more pumping light sources are used. Further, the description has been made on the case where the measurement of the connecting loss is performed by the OTDR. However, similar to the embodiment 3-3, an application can be made by using the light source capable of sweeping the frequency as the pumping light source, for the case where the measurement of the connecting loss is performed by the OFDR as in the embodiment 3-2.

Next, an embodiment 3-4 of the present invention will be described. Here, me description is made on an optical repeater node apparatus using the optical amplifier of each embodiment described above.

Figure 33:
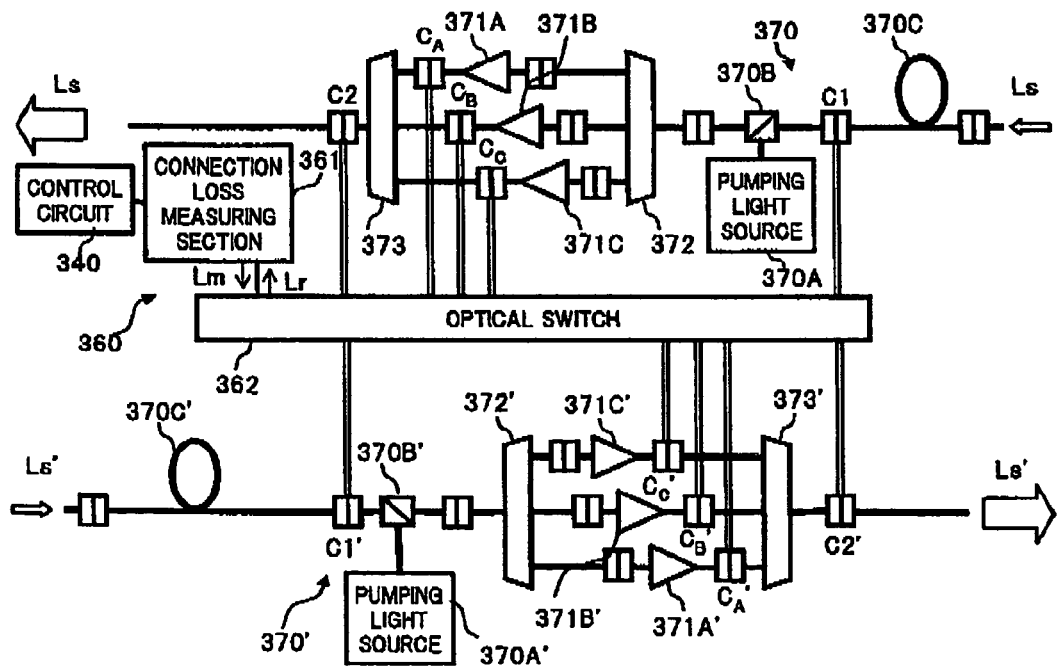
FIG. 33 is a block diagram showing a configuration of an optical repeater node apparatus according to an embodiment 3-4 of the present invention.

FIG. 33 is a block diagram showing a configuration of the optical repeater node apparatus according to the embodiment 3-4 of the present invention.

The optical repeater node apparatus shown in FIG. 33 is constituted such that, in a known configuration in which a WDM signal light Ls transmitted over an uplink is amplified by a combination of a Raman amplifier 370 and erbium-doped fiber amplifiers (EDFA) 371A to 371C, and also a WDM signal light Ls' transmitted over a downlink is amplified by a combination of a Raman amplifier 370' and EDFAs 371A' to 371C', there are incorporated a connecting loss measuring section 361 applied with the connecting loss measuring system by the OTDR as shown in the embodiments 3-1 and 3-3 or the connecting loss measuring system by the OFDR as shown in the embodiment 3-2; and a connecting loss supervisory unit 360 comprising an optical switch 382.

In the respective Raman amplifiers 370 and 370' on the uplink and the downlink pumping lights output from pumping light sources 370A and 370A' are supplied to amplification fibers 370C and 370C' via WDM couplers 370B and 370B', respectively. The respective amplification fiber 370C and 370C' are PC connected with signal light input sides of the present optical repeater node apparatus via optical connectors C1 and C1'

The EDFAs 371A to 371C on the uplink are respectively input with signal lights obtained by demultiplexing the WDM signal light Ls that has been Raman amplified by the Raman amplifier 370, to three wavelength bands different from each other (for example, S-band, C-band and L-band or the like) by a demultiplexer 372, and output the signal lights of respective wavelengths, which are amplified to required levels, to a multiplexer 373 via optical connectors $C_A$ to $C_C$. The EDFAs 371A' to 371C' on the downlink are respectively input with signal lights obtained by demultiplexing the WDM signal light Ls' that has been Raman amplified by the Raman amplifier 370, to three wavelength bands different from each other (for example, S-band, C-band and L-band or the like) by a demultiplexer 372', and output the signal lights of respective wavelengths, which are amplified to required levels, to a multiplexer 373' via optical connectors $C_A'$ to $C_C'$. The demultiplexer 373 multiplexes the signal lights output from the EDFAs 371A to 371C, and then, outputs the multiplexed light to the optical transmission path on the latter stage via an optical connector C2 on an output side. The demultiplexer 373' multiplexes the signal lights output from the EDFAs 371A' to 371C', and then, outputs the multiplexed light to the optical transmission path on the latter stage via an optical connector C2' on an output side.

According to the above configuration, the high power Raman amplification pumping lights power pass through the optical connector C1 existing between the WDM coupler 370B and the amplification on fiber 370C, and the optical connector C1' existing between the WDM coupler 370B' and the amplification fiber 370C', respectively. Further, the high power signal lights, which have been further amplified by the EDFAs 371A to 371C, pass through optical connectors $C_A$ to $C_C$ existing on an input side of the multiplexer 373 and the optical connector C2 existing on an output side of the multiplexer 373, and the high power signal lights, which have been further amplified by the EDFAs 371A' to 371C', pass through optical connectors $C_A'$ to $C_C'$ existing on an input side of the multiplexer 373' and the optical connector C2' existing on an W side of the multiplexer 373'. Therefore, in the present embodiment, the connecting loss supervisory unit 360 of a single system is provided, to supervise the connecting condition of each optical connector though which the high power light as described above passes. The connecting loss supervisory unit 360 switches in a required time, by means of the switch 362, between output determinations (corresponding to double lines in FIG. 33) of the measuring light Lm generated in the connecting loss measuring section 361, to sequentially measure the connecting loss of each optical connector. Note, the switching time of the optical switch 362 is set to a time sufficient for the scattering light Lr of the measuring light Lm to reach the connecting loss measuring section 361.

Figure 34:
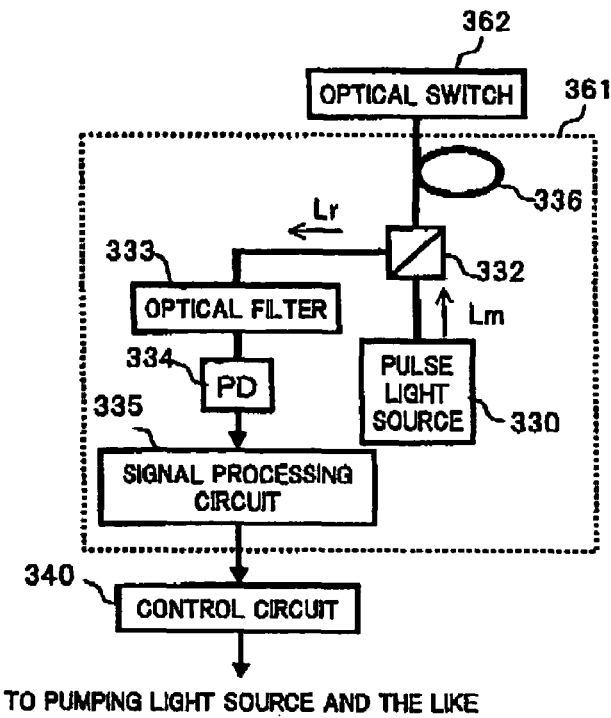
FIG. 34 is a diagram showing a configuration example of a connecting loss supervisory unit to which the OTDR measuring system is applied in the embodiment 3-4.

FIG. 34 is a diagram showing a configuration of the connecting loss supervisory unit 360 applied with the OTDR measuring system, for example. In this configuration example, the measuring light Lm output from the pulse light source 330 is given to the optical switch 362 via the branching coupler 332, and sent toward a required measuring point according to the switching operation of the optical switch 362. Further, the pseudo fiber 336 is provided between the branching coupler 332 and the switch 362, to narrow the dead zone generated at the measuring time by the OTDR, here.

The measurement result of the connecting loss by the connecting loss supervisory unit 360 is transmitted to the control circuit 340, to be compared with the previously set threshold. Then, if the connecting loss of the threshold or above is detected, it is judged there is a possibility of breakage of the optical connector, and the supply of the pumping light to the corresponding Raman amplifier or the corresponding EDFA is stopped or the power of light passing through this optical connector is suppressed to the predetermined value or less. Further, simultaneously with this, the warning notifying the connection abnormality together with information related to a position thereof is output to outside.

According to the optical repeater node apparatus of the embodiment 3-4, it becomes possible to supervise the connecting conditions of the plurality of optical connectors through which the high power lights passes, with a simple configuration using the connecting loss supervisory unit 360 of a single system, thereby enabling the control of the operation of the optical amplifier in the apparatus. Thus, it becomes possible to realize at a low cost the connecting loss detecting function in the optical repeater node apparatus in which the Raman amplifier and the EDFA are combined with each other.

Note, in the embodiment 3-4, there has been shown the example of the op repeater node apparatus in which one Raman amplifier and three EDFAs are combined for each of the uplink and downlink. However, the type and the number of the optical amplifiers applied to the optical repeater node apparatus are not limited to the above example. Further, there has been shown the configuration example of the measuring system by the OTDR in FIG. 34. However, it is surely possible to apply the configuration of the measuring system by the OFDR to the connecting loss supervisory unit 360.

Moreover, in the embodiments 3-1 to 3-4, there has been shown the configuration example in which the Raman amplification pumping light being propagated in the direction opposite to the propagation direction of the signal light, is supplied to the amplification fiber (oil amplification medium) connected to the signal input side of the optical amplifier. However, the present invention is also effective for such a configuration in which the pumping light being propagated in the same direction as the propagation direction of the signal light, is supplied to the optical amplification medium connected to the signal light output side of the optical amplifier.

Next, an embodiment 3-5 of the present invention will be described. Here, the description is made on an improved example in which a good connecting condition of an optical connector is readily obtained.

Figure 35:
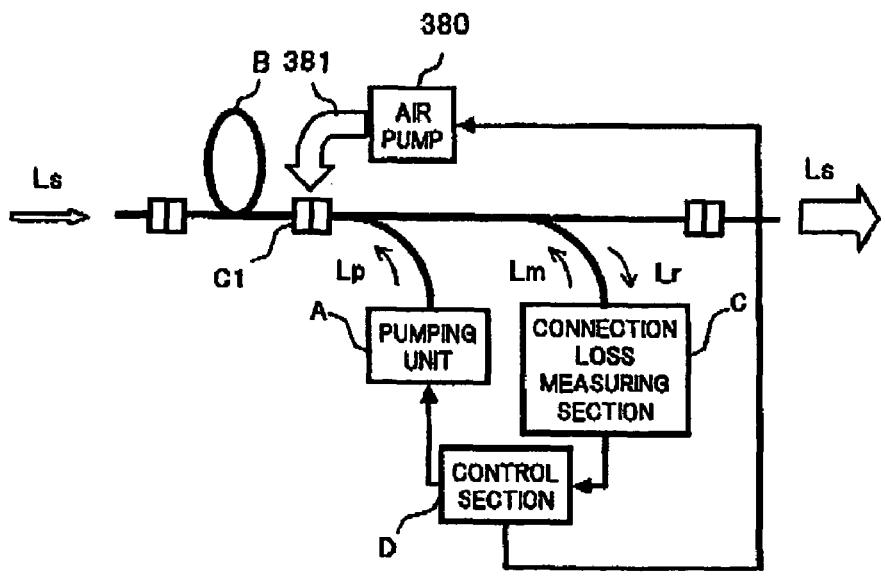
FIG. 35 is a block diagram showing a configuration of an optical amplifier according to an embodiment 3-5 of the present invention.

FIG. 35 is a block diagram showing a configuration of an optical amplifier in the embodiment 3-5.

The optical amplifier shown in FIG. 35 is constituted such that, in the basic configuration shown in FIG. 22, there is provided an air pump 380 as a dry gas supply section that sprays dry gas on the optical connector C1 through which the high power light passes, to prevent impurities from being adhered to the optical connector C1.

The air pump 380 sprays the dry gas on a connecting surface of the optical connector C1 via a blower tube 381 in accordance with a control signal output from the control section D, when the connecting loss of the optical connector C1 reaches the threshold or above.

Figure 36:
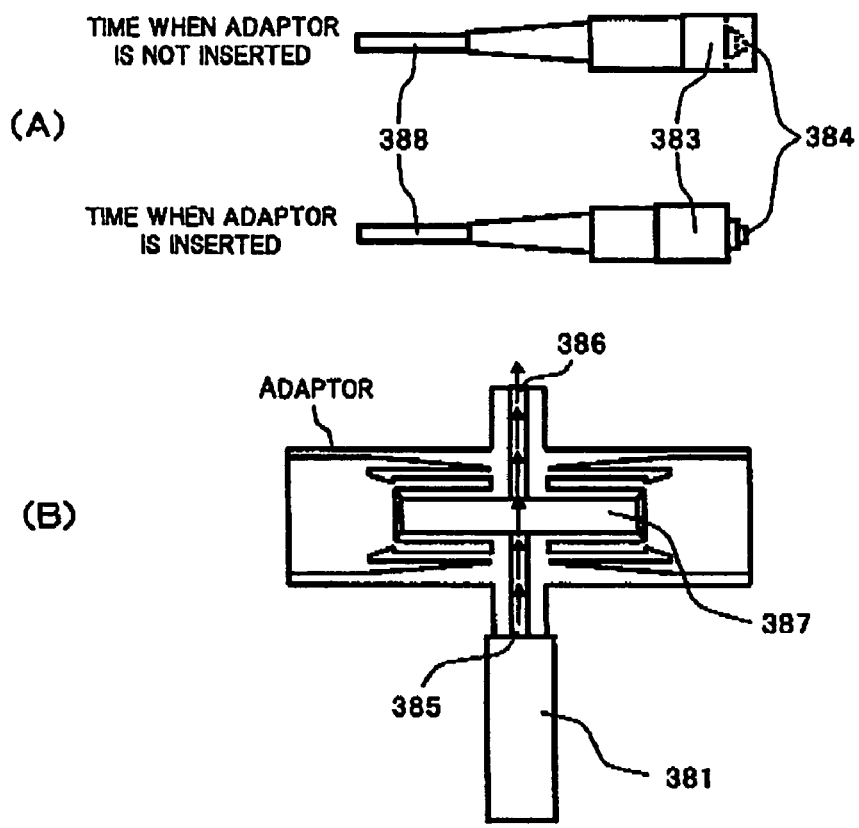
FIG. 36 is a diagram showing an example of an optical connector to be used in the embodiment 3-5.

FIG. 36 shows an example of the optical connector C1 on which the dry gas is sprayed from the air pump 380. As shown in (A) of FIG. 36, a dust cover 383 is provided on the optical connector C1. During the store where the optical connector C1 is not inserted into an adapter, the dust cover 383 is on a position to prevent an end surface of a ferule 384 from being exposed to outside, while when the optical connector C1 is inserted into the adaptor, the duct cover 383 is slid down by a projection in the adaptor, to enable the PC connection. The adaptor, as shown in (B) of FIG. 36, includes an intake hole 385 and an exhaust hole 386. The dry gas blown from the blower tube 381 is flown from the intake hole 385 towards the exhaust hole 386. The dry gas passes through a segment sleeve 387 in the adaptor, to blow away dust on the end surface of the ferule 384 when the optical connector C1 is connected. Note, as the dry gas sent from the air pump 380 to the blower tube 381, it is possible to use the gas such as air, nitrogen or the like.

In the optical amplifier of the above configuration, at the initial installation time or the operation starting time, if the PC connection of the optical connector is performed in an insufficient condition, the dry gas is sprayed on the optical connector C1 from the air pump 380 via the blower tube 383. As a result, impurities such as dust become hardly to be adhered on the end surface of the ferule 384, and thus, it becomes possible ID relatively readily realize a good PC connection.

Note, in the embodiment 3-5, there has been shown the example in which the structure of the optical connector is improved and the dry gas is sprayed on the optical connector, in order to obtain the good connection condition of the optical connector. In addition to this, it is also effective that, as the adhesive for adhering the ferule in the optical connector and the optical fiber, for example, such adhesive without optical absorption in the respective wavelength bands of the signal light Ls and the pumping light Lp is used, to adopt an optical connector, which is hardly to occur the breakage of the optical fiber due to the FF phenomenon.

Figure 37:
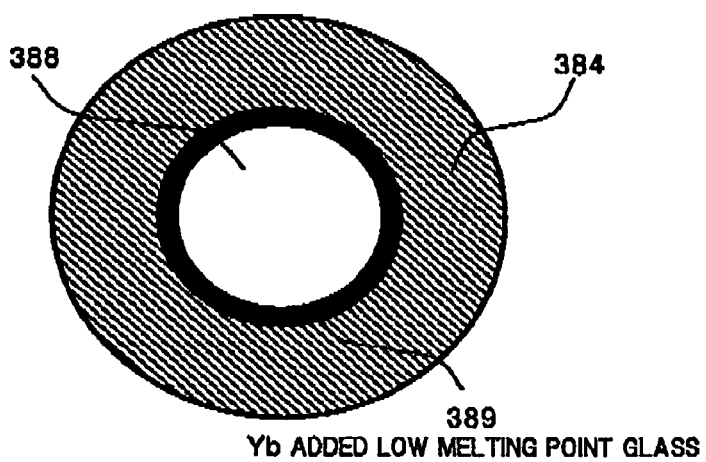
FIG. 37 is a diagram showing another structural example of the optical connector related to the embodiment 3-5.
Figure 38:
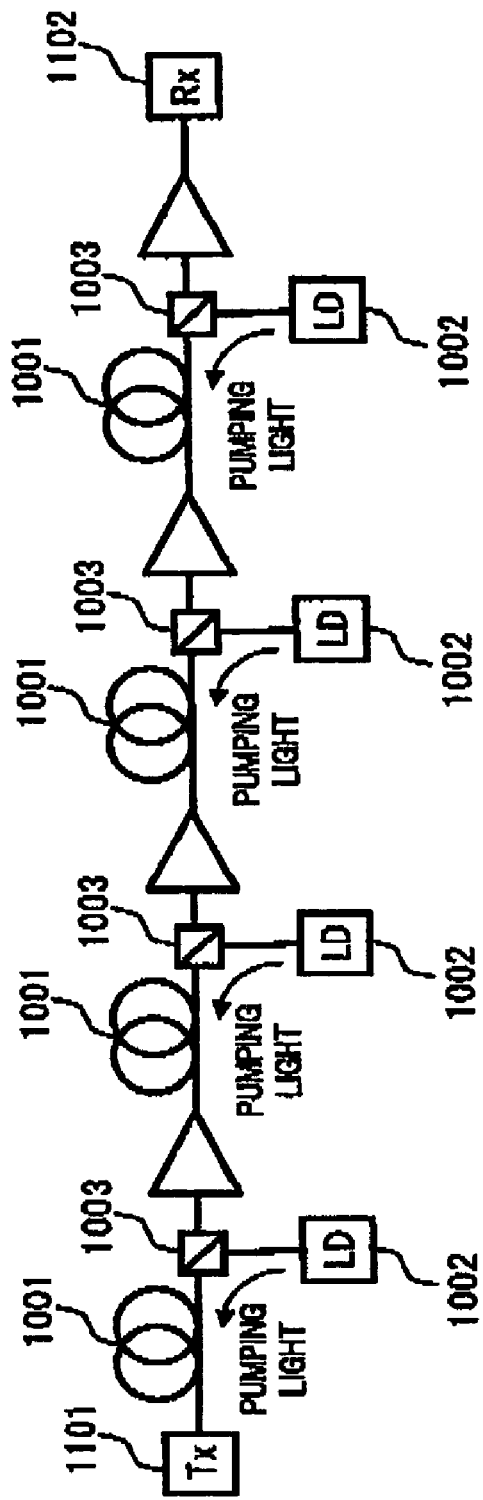
FIG. 38 is a block diagram of an optical transmission system using a typical Raman amplifier.
Figure 39:
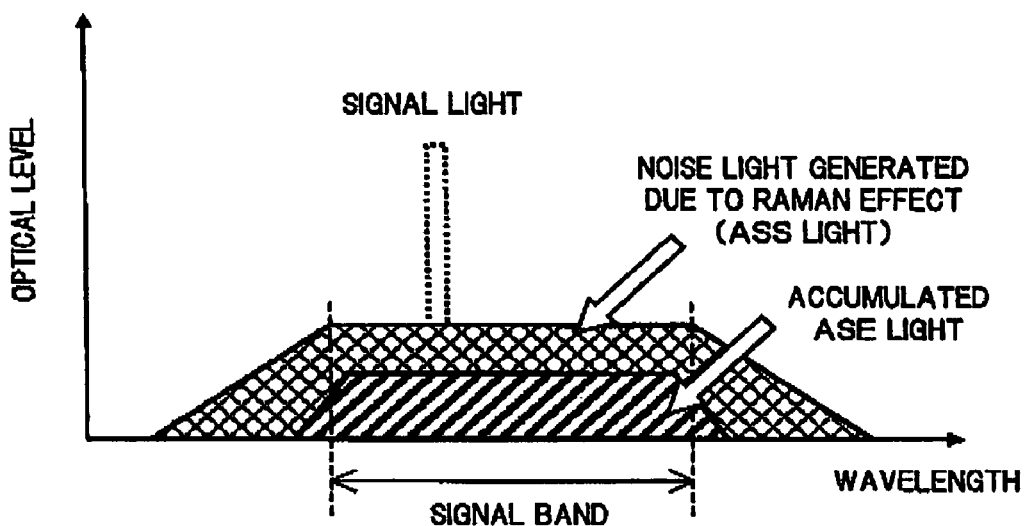
FIG. 39 is a diagram exemplarily showing a noise light contained in an output signal light of a typical Raman amplifier.

To be specific, for example, as shown in FIG. 37, it is preferable to use a low melting point glass 389 as the adhesive between the ferule 384 in the optical connector and the optical fiber 388. The low melting point glass 389 has a melting point (about 400° C.) lower than that of a normal glass, and therefore, it can be used as the adhere. Further, the low melting point glass 389 is transparent to the light passing through the optical connector, and also the melting point thereof is higher than that of the normally used adhesive, such as epoxy resin. Accordingly, if the low melting point glass is used as the adhesive, the temperature rise for when the high power light passes through the optical connector is less, and even if the temperature rises, the adhesive surface is hardly softened, thereby improving the durability to the high power light.

However, since the low melting point glass needs to be adhered at a higher temperature compared with the normal adhesive, there is a possibility to damage me ferule 384 or the optical fiber 388 at the adhesion time. Therefore, by adding an additive, which absorbs a wavelength different from that of the light passing through the optical connector, to the low melting point glass 389 used as the adhesive, it becomes possible to prevent such a damage at the adhesion time. As a specific example of the additive, ytterbium (Yb) absorbing 1 μm band can be taken. In the case where the low melting point glass 389 added with ytterbium is used, when the 1 μm band high power laser such as YAG laser or the like is incident at the adhesion time of the ferule 384 and the optical fiber 388, the low melting point glass being the adhesive absorbs the light of 1 μM band. Thus, it is possible to heat selectively only the adhesive joint. Since ytterbium does not absorb the signal light Ls and the pumping light Lp in the known Raman amplifier, it does not harmfully affect the Raman amplification. Thus, it is possible to improve the durability of the adhesive joint to the high power light.

What is claimed is:

1. An optical transmission system, comprising:
   a transmission station outputting a WDM light that includes a plurality of reference lights together with a plurality of main signal lights; and
   a Raman amplifier transmitting the WDM light from the transmission station to a reception station, wherein said Raman amplifier includes:
   an optical amplification medium;
   a pumping light source configured to generate a plurality of pumping lights having different wavelengths;
   an optical device capable of introducing said plurality of pumping lights to said optical amplifying medium;
   an equalization control section configured to control said pumping light source based on the optical powers of said plurality of reference lights such that the optical powers of said plurality of reference lights are equalized; and
   an automatic level control section configured to control the optical powers of the pumping lights so that the average optical power of the reference lights is held to a predetermined value, wherein
   the reference lights have wavelengths configured so that respective Raman gains obtained by said plurality of pumping lights reach peaks.

2. An optical transmission system, comprising:
   a transmission station sending out a WDM light that includes a plurality of reference lights together with a plurality of main signal lights; and
   a Raman amplifier transmitting the WDM light from the transmission station to a reception stations, wherein said Raman amplifier includes:
   an optical amplification medium;
   a pumping light source configured to generate a plurality of pumping lights at frequencies;
   an optical device capable of introducing said plurality of pumping lights to said optical amplifying medium;
   an equalization control section configured to control said pumping light source based on the optical powers of said plurality of reference lights such that the optical powers of said plurality of reference lights are equalized; and
   an automatic level control section configured to control the optical powers of the pumping lights so that the average optical power of the reference lights is held to a predetermined value, wherein
   the reference lights correspond to said plurality of pumping lights at frequencies shifted by a Raman shift frequency.

3. An optical transmission system according to claim 1 or claim 2,
   wherein said transmission station sends information to said reception station utilizing at least a part of said plurality of reference lights.

4. An optical transmission system according to claim 1,
   wherein, in the case where said WDM signal light is arranged on frequency grids in which a previously determined frequency interval is defined, said plurality of reference lights is arranged on grids closest to a frequency corresponding to a wavelength determined based on the pumping lights.

5. An optical transmission system according to claim 2,
   wherein, in the case where said WDM signal light is arranged on frequency grids in which a previously determined frequency interval is defined, said plurality of reference lights is arranged on grids closest to a frequency determined based on the pumping lights.

6. An optical transmission system according to claim 1 or claim 2, further comprising;
   detecting means for detecting the optical powers of said plurality of reference lights contained in said WDM light,
   wherein said equalization control section controls the optical powers of said plurality of pumping lights so that the optical powers of the plurality of reference lights detected by said detecting means are equalized.

7. An optical transmission system according to claim 6,
   wherein said detecting means is an optical spectrum analyzer.

8. An optical transmission system according to claim 6,
wherein said detecting means comprises reflecting means for selectively reflecting said plurality of reference lights, and light receiving means for converting the reference light reflected by said reflecting means into an electric signal.

9. An optical transmission system according to claim 1 or claim 2,
wherein said automatic level control section controls said plurality of pumping lights based on an average value of the respective optical powers of said plurality of reference lights.

10. An optical transmission system according to claim 1 or claim 2,
wherein said equalization control section controls the output power of said WDM light based on an average value of the respective optical powers of said plurality of reference lights.

11. An optical transmission system, comprising:
a repeater station transmitting a WDM light from a transmission station to a reception station, wherein said repeater station includes a Raman amplifier that includes:
a pumping light source configured to generate a plurality of pumping lights having different wavelengths;
an optical device capable of introducing said plurality of pumping lights to an optical amplifying medium;
an equalization control section configured to control said pumping light source based on the optical powers of said plurality of reference lights such that the optical powers of said plurality of reference lights are equalized; and
an automatic level control section configured to control the optical powers of the pumping lights so that the average optical power of the reference lights is held to a predetermined value; and
reference light generating means for generating a plurality of reference lights having wavelengths configured so that respective Raman gains obtained by said plurality of pumping lights reach peaks, and sending out the reference lights together with the WDM light, which includes the reference lights and main signal lights that are different from the reference lights.

12. A Raman amplifier for amplifying a WDM light in an optical transmission system for transmitting the WDM light containing a plurality of signal lights and a plurality of reference lights from a transmission station to a reception station, comprising:
an optical amplification medium;
a pumping light source configured to generate a plurality of pumping lights having different wavelengths;
an optical device introducing said plurality of pumping lights to said optical amplifying medium;
an equalization control section configured to control said plurality of pumping lights based on the respective optical powers of said plurality of reference lights such that the optical powers of the reference lights are equalized; and
an automatic level control section configured to control the optical powers of the pumping lights so that the average optical power of the reference lights is held to a predetermined value, wherein wavelengths of said plurality of reference lights are configured so that respective Raman gains obtained by said plurality of pumping lights reach peaks.

13. An optical transmission method comprising:
transmitting a WDM light from a transmission station to a reception station;
generating, using a Raman amplifier, a plurality of pumping lights having different wavelengths;
sending, by the transmission station, a WDM light that includes a plurality of reference lights together with a plurality of main signal lights, the reference lights being different from the main signal lights and having wavelengths configured so that respective Raman gains obtained by said plurality of pumping lights reach peaks;
controlling, by an equalization control section included in the Raman amplifier, said plurality of pumping lights based on the respective optical powers of said plurality of reference lights such that the optical powers of the reference lights are equalized; and
controlling, by an automatic level control section included in the Raman amplifier, the optical powers of the pumping lights so that the average optical power of the reference lights is held to a predetermined value.

14. An optical transmission system, comprising:
a transmission station for transmitting a WOM light that includes a plurality of reference lights together with a plurality of main signal lights to a reception station; and
a Raman amplifier, said Raman amplifier including:
a pumping light source to generate a plurality of pumping lights having different wavelengths;
an equalization control section configured to control said pumping light source based on the optical powers of said plurality of reference lights such that the optical powers of said plurality of reference lights are equalized; and
an automatic level control section configured to control the optical powers of the pumping lights so that the average optical power of the reference lights is held to a predetermined value, wherein
the reference lights have wavelengths configured so that respective Raman gains obtained by said plurality of pumping lights reach peaks.

15. An optical transmission system, comprising:
a transmission station for transmitting a WDM light that includes a plurality of reference lights together with a plurality of main signal lights to a reception station; and
a Raman amplifier, said Raman amplifier including:
a pumping light source to generate a plurality of pumping lights at frequencies;
an equalization control section configured to control said pumping light source based on the optical powers of said plurality of reference lights such that the optical powers of said plurality of reference lights are equalized; and
an automatic level control section configured to control the optical powers of the pumping lights so that the average optical power of the reference lights is held to a predetermined value, wherein
the reference lights correspond to said plurality of pumping lights at frequencies shifted by a Raman shift frequency.

* * * * *